US012082226B2

(12) United States Patent
Zhou et al.

(10) Patent No.: US 12,082,226 B2
(45) Date of Patent: Sep. 3, 2024

(54) UPLINK TRANSMISSION IN A WIRELESS COMMUNICATION SYSTEM

(71) Applicant: Ofinno, LLC, Reston, VA (US)

(72) Inventors: Hua Zhou, Vienna, VA (US); Esmael Hejazi Dinan, McLean, VA (US); Ali Cagatay Cirik, Chantilly, VA (US); Yunjung Yi, Vienna, VA (US); Hyoungsuk Jeon, Centreville, VA (US); Alireza Babaei, Fairfax, VA (US); Kyungmin Park, Vienna, VA (US); Kai Xu, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 259 days.

(21) Appl. No.: 17/841,714

(22) Filed: Jun. 16, 2022

(65) Prior Publication Data

US 2022/0322358 A1    Oct. 6, 2022

Related U.S. Application Data

(63) Continuation of application No. 16/833,522, filed on Mar. 28, 2020, now Pat. No. 11,388,723.
(Continued)

(51) Int. Cl.
*H04W 72/02* (2009.01)
*H04W 72/21* (2023.01)
(Continued)

(52) U.S. Cl.
CPC .......... *H04W 72/53* (2023.01); *H04W 72/02* (2013.01); *H04W 72/21* (2023.01); *H04W 72/23* (2023.01)

(58) Field of Classification Search
CPC ..... H04W 72/53; H04W 72/21; H04W 72/23; H04W 72/02
See application file for complete search history.

(56) References Cited

U.S. PATENT DOCUMENTS 10,771,214 B2 * 9/2020 Zhang ................ H04W 52/242
11,122,631 B2 * 9/2021 Gao ...................... H04L 5/0048
(Continued)

OTHER PUBLICATIONS

3GPP TS 38.212 V15.4.0 (Dec. 2018); Technical Specification; 3rd Generation Partnership Project; Technical Specification Group Radio Access Network; NR; Multiplexing and channel coding; (Release 15).
(Continued)

*Primary Examiner* — Michael J Moore, Jr.
(74) *Attorney, Agent, or Firm* — Jacob L. Mangan; Kavon Nasabzadeh; Philip R. Smith

(57) ABSTRACT

A wireless device receives power control parameters of a physical uplink shared channel (PUSCH) of a bandwidth part of a cell. The power control parameters indicate first power values and second power values, and each power value of the first power values and the second power values is associated with a respective index. A downlink control information (DCI) indicating a transmission via the PUSCH is received. Based on the DCI, one of the first power values and the second power values is determined as determined power values for transmission of a transport block. The transport block is transmitted, via the PUSCH, with a transmission power based on a power value with a lowest index among indexes associated with the determined power values.

20 Claims, 37 Drawing Sheets

Related U.S. Application Data

(60) Provisional application No. 62/825,301, filed on Mar. 28, 2019.

(51) Int. Cl.
  *H04W 72/23* (2023.01)
  *H04W 72/53* (2023.01)

(56) References Cited

U.S. PATENT DOCUMENTS

| | | | | |
|---|---|---|---|---|
| 11,388,723 | B2* | 7/2022 | Zhou | H04W 72/21 |
| 11,743,919 | B2* | 8/2023 | Cirik | H04W 52/242 |
| | | | | 370/329 |
| 2016/0338094 | A1* | 11/2016 | Faurie | H04W 72/542 |
| 2016/0338095 | A1* | 11/2016 | Faurie | H04W 72/02 |
| 2017/0019882 | A1* | 1/2017 | Nimbalker | H04W 72/23 |
| 2017/0127405 | A1* | 5/2017 | Agiwal | H04W 76/14 |
| 2017/0150330 | A1* | 5/2017 | Kim | H04W 76/10 |
| 2017/0208646 | A1* | 7/2017 | Siomina | H04W 76/14 |
| 2018/0049137 | A1* | 2/2018 | Li | H04W 52/242 |
| 2018/0123744 | A1* | 5/2018 | Nogami | H04W 52/248 |
| 2018/0132197 | A1* | 5/2018 | Lin | H04W 52/242 |
| 2018/0310257 | A1* | 10/2018 | Papasakellariou | H04W 52/367 |
| 2019/0174540 | A1* | 6/2019 | Yoshimura | H04L 27/26 |
| 2019/0191382 | A1* | 6/2019 | Zhang | H04W 52/146 |
| 2019/0215781 | A1* | 7/2019 | Jeon | H04W 76/32 |
| 2019/0297580 | A1* | 9/2019 | Huang | H04W 52/04 |
| 2019/0349964 | A1* | 11/2019 | Liou | H04W 76/27 |
| 2019/0387479 | A1* | 12/2019 | Gong | H04W 72/1268 |
| 2020/0008157 | A1* | 1/2020 | Dinan | H04W 52/34 |
| 2020/0044797 | A1* | 2/2020 | Guo | H04W 72/51 |
| 2020/0092685 | A1* | 3/2020 | Fehrenbach | H04W 76/14 |
| 2020/0205150 | A1* | 6/2020 | Cheng | H04W 72/21 |
| 2020/0229104 | A1* | 7/2020 | MolavianJazi | H04W 52/146 |
| 2020/0229143 | A1* | 7/2020 | Wei | H04L 43/0876 |
| 2020/0260475 | A1* | 8/2020 | Yoshimura | H04L 27/26025 |
| 2020/0267663 | A1* | 8/2020 | Xu | H04W 52/242 |
| 2020/0305168 | A1* | 9/2020 | Liou | H04W 76/11 |
| 2020/0314812 | A1* | 10/2020 | Xu | H04L 5/0051 |
| 2020/0314860 | A1* | 10/2020 | Zhou | H04W 72/23 |
| 2020/0351129 | A1* | 11/2020 | Kwak | H04W 76/27 |
| 2021/0022173 | A1* | 1/2021 | Nam | H04W 24/08 |
| 2021/0105726 | A1* | 4/2021 | Yao | H04W 52/242 |
| 2021/0105765 | A1* | 4/2021 | Cirik | H04W 76/18 |
| 2021/0168814 | A1* | 6/2021 | Chen | H04W 72/02 |
| 2021/0282167 | A1* | 9/2021 | Wang | H04L 5/0044 |
| 2022/0060293 | A1* | 2/2022 | Matsumura | H04L 1/1896 |
| 2022/0264475 | A1* | 8/2022 | Yi | H04W 72/046 |

OTHER PUBLICATIONS

3GPP TS 38.213 V15.4.0 (Dec. 2018); Technical Specification; 3rd Generation Partnership Project; Technical Specification Group Radio Access Network; NR;Physical layer procedures for control (Release 15).

3GPP TS 38.214 V15.4.0 (Dec. 2018); Technical Specification; 3rd Generation Partnership Project; Technical Specification Group Radio Access Network; NR; Physical layer procedures for data; (Release 15).

3GPP TS 38.331 V15.4.0 (Dec. 2018); Technical Specification; 3rd Generation Partnership Project; Technical Specification Group Radio Access Network; NR; Radio Resource Control (RRC) protocol specification; (Release 15).

R1-1805574; 3GPP TSG RAN WG1 Meeting #92b; Sanya, China, Apr. 16-20, 2018; Source: Ericsson; Title: Feature lead summary 2 on beam measurement and reporting.

R1-1901205; 3GPP TSG RAN WG1 Ad-Hoc Meeting 1901; Taipei, Taiwan, Jan. 21-25, 2019; Agenda Item: 7.2.8.6; Source: Ericsson; Title:UL beam selection improvements.

R1-1901568; 3GPP TSG RAN WG1 Meeting #96; Athens, Greece, Feb. 25-Mar. 1, 2019; Agenda Item: 7.2.8.3; Source: Huawei, HiSilicon; Title: Enhancements on multi-beam operation.

R1-1901635; 3GPP TSG RAN WG1 Meeting #96; Athens, Greece, Feb. 25-Mar. 1, 2019; Source: ZTE; Title: Enhancements on multi-beam operation; Agenda Item: 7.2.8.3; Document for: Discussion and Decision.

R1-1901639; 3GPP TSG RAN WG1 #96; Athens, Greece, Feb. 25-Mar. 1, 2019; Source: ZTE; Title: Additional considerations on beam management for multi-TRP; Agenda item: 7.2.8.6.

R1-1901640; 3GPP TSG RAN WG1 #96; Athens, Greece, Feb. 25-Mar. 1, 2019; Source: ZTE; Title: Additional details of latency and overhead reduction for beam management; Agenda item: 7.2.8.6.

R1-1901641; 3GPP TSG RAN WG1 Meeting #96; Athens, Greece, Feb. 25-Mar. 1, 2019; Source: ZTE; Title: Details and evaluation on UL simultaneous transmission for multi-panel operation; Agenda Item: 7.2.8.6; Document for: Discussion and Decision.

R1-1901642; 3GPP TSG RAN WG1 Meeting #96; Athens, Greece, Feb. 25-Mar. 1, 2019; Source: ZTE; Title: Details and evaluation on L1-SINR measurement and reporting; Agenda Item: 7.2.8.6; Document for: Discussion and Decision.

R1-1901643; 3GPP TSG RAN WG1 Meeting #96; Athens, Greece, Feb. 25-Mar. 1, 2019; Source: ZTE; Title: Discussion on UL power control for multi-panel operation; Agenda Item: 7.2.8.6; Document for: Discussion and Decision.

R1-1901703; 3GPP TSG RAN WG1 Meeting #96; Athens, Greece, Feb. 25-Mar. 1, 2019; Source: vivo; Title: Further discussion on Multi-Beam Operation; Agenda Item: 7.2.8.3.

R1-1901790; 3GPP TSG RAN WG1 #96; Athens, Greece, Feb. 25-Mar. 1, 2019; Agenda Item: 7.2.8.3; Source: MediaTek Inc.; Title: Enhancements on multi-beam operations.

R1-1901904; 3GPP TSG RAN WG1 Meeting # 96; Athens, Greece, Feb. 25-Mar. 1, 2019; Agenda Item: 7.2.8.3; Source: AT&T; Title: Enhancements on Multi Beam Operation; Document for: Discussion/Approval.

R1-1902020; 3GPP TSG RAN WG1 Meeting #96; Athens, Greece, Feb. 25-Mar. 1, 2019; Source: CATT; Title: Enhancements on multi-beam operation; Agenda Item: 7.2.8.3.

R1-1902092; 3GPP TSG RAN WG1 Meeting #96; Athens, Greece, Feb. 25-Mar. 1, 2019; Agenda item: 7.2.8.3; Source: LG Electronics; Title: Discussion on multi-beam based operations and enhancements; Document for: Discussion and Decision.

R1-1902162; 3GPP Tsg Ran WG1 #96; Athens, Greece, Feb. 25-Mar. 1, 2019; Agenda Item: 7.2.8.3; Source: Lenovo, Motorola Mobility; Title: Discussion of multi-beam operation.

R1-1902184; 3GPP TSG RAN WG1 #96; Athens, Greece, Feb. 25-Mar. 1, 2019; Agenda Item: 7.2.8.3; Source: Sony; Title: Enhancements on multi-beam operation.

R1-1902339; 3GPP TSG RAN WG1 #96; Athens, Greece, Feb. 25-Mar. 1, 2019; Agenda item: 7.2.8.3; Source: CMCC; Title: Enhancements on multi-beam operation; Document for: Discussion and Decision.

R1-1902408; 3GPP TSG-RAN WG1 Meeting #96; Athens, Greece, Feb. 25-Mar. 1, 2019; Source: Asia Pacific Telecom; Title: Enhancements on UL Multi-beam Operation; Agenda item: 7.2.8.3.

R1-1902523; 3GPP TSG RAN WG1 Meeting #96; Athens, Greece, Feb. 25-Mar. 1, 2019; Source: Panasonic; Title: On enhancements for multi-beam operations for NR MIMO in Rel. 16; Agenda Item: 7.2.8.3.

R1-1902564; 3GPP TSG RAN WG1 Meeting #96; Athens, Greece, Feb. 25-Mar. 1, 2019; Agenda item: 7.2.8.3; Source: Nokia, Nokia Shanghai Bell; Title: Enhancements on Multi-beam Operation.

R1-1902615; 3GPP TSG RAN WG1 Meeting #96; Athens, Greece, Feb. 25-Mar. 1, 2019; Agenda Item: 7.2.8.3; Source: InterDigital, Inc.; Title: Enhancement for Multi-Beam Uplink Operation.

R1-1902630; 3GPP TSG RAN WG1 Meeting #96; Athens, Greece, Feb. 25-Mar. 1, 2019; Agenda item: 7.2.8.3; Source: China Telecom; Title: Enhancements on multi-beam operation for multi-panel transmission.

R1-1902714; 3GPP TSG RAN WG1 Meeting #96; Athens, Greece, Feb. 25-Mar. 1, 2019; Agenda Item: 7.2.8.3; Source: Spreadtrum Communications; Title: Discussion on multi-beam operation; Document for: Discussion and decision.

(56) References Cited

OTHER PUBLICATIONS

R1-1902768; 3GPP TSG RAN WG1 #96; Athens, Greece, Feb. 25-Mar. 1, 2019; Agenda Item: 7.2.8.3; Source: Apple Inc.; Title: Consideration on beam measurement and reporting enhancement.
R1-1902833; 3GPP TSG RAN WG1 Meeting #96; Athens, Greece, Feb. 25-Mar. 1, 2019; Source: Mitsubishi Electric; Title: Views on multi-beam operation; Agenda Item: 7.2.8.3.
R1-1902866; 3GPP TSG RAN WG1 #96; Athens, Greece, Feb. 25-Mar. 1, 2019; Agenda Item: 7.2.8.3; Source: Xiaomi; Title: Enhancements on beam management.
R1-1903091; 3GPP TSG RAN WG1 Meeting #96; Athens, Greece, Feb. 25-Mar. 1, 2019; Agenda Item: 7.2.8.6; Source: Huawei, HiSilicon; Title: Panel-based UL beam selection.
R1-1903231; 3GPP TSG-RAN WG1 Meeting #96; Athens, Greece, Feb. 25-Mar. 1, 2019; Agenda Item: 7.2.8.3; Source: Ericsson; Title: Enhancements to multi-beam operation.

\* cited by examiner

User Plane Protocol Stack

Control Plane Protocol Stack

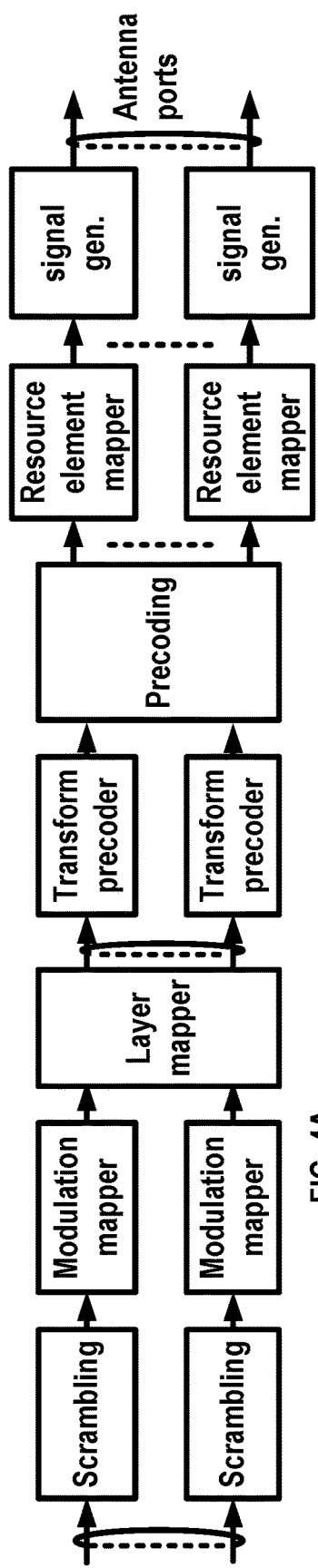
FIG. 4A
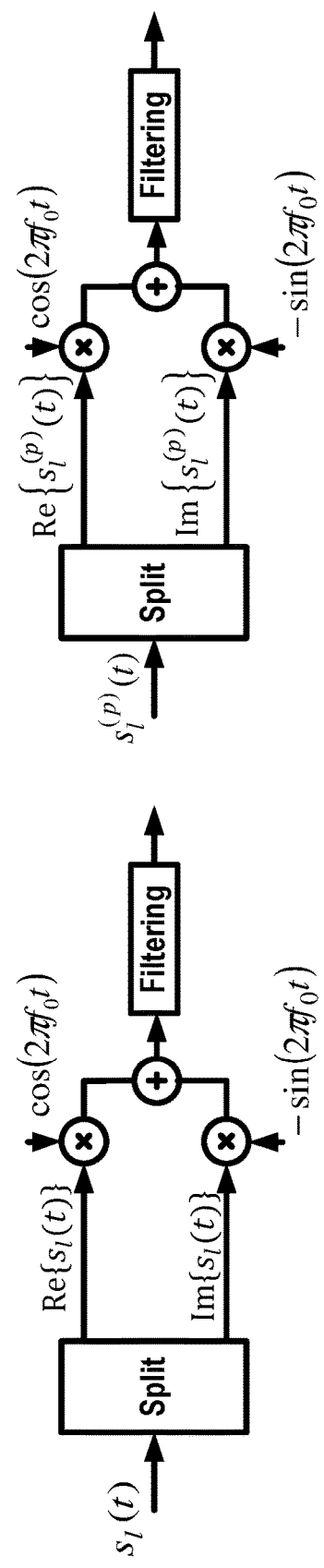
FIG. 4B
FIG. 4D
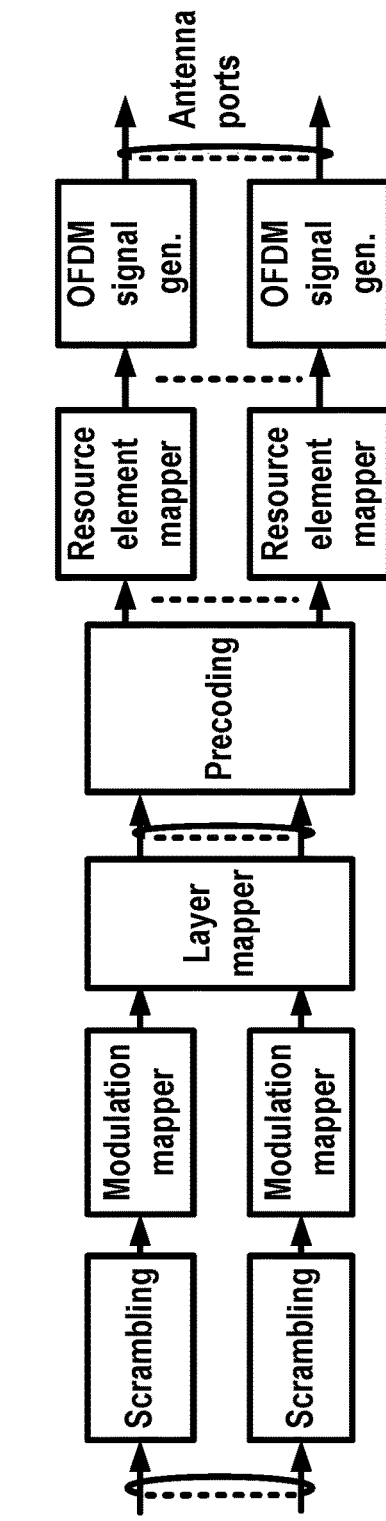
FIG. 4C

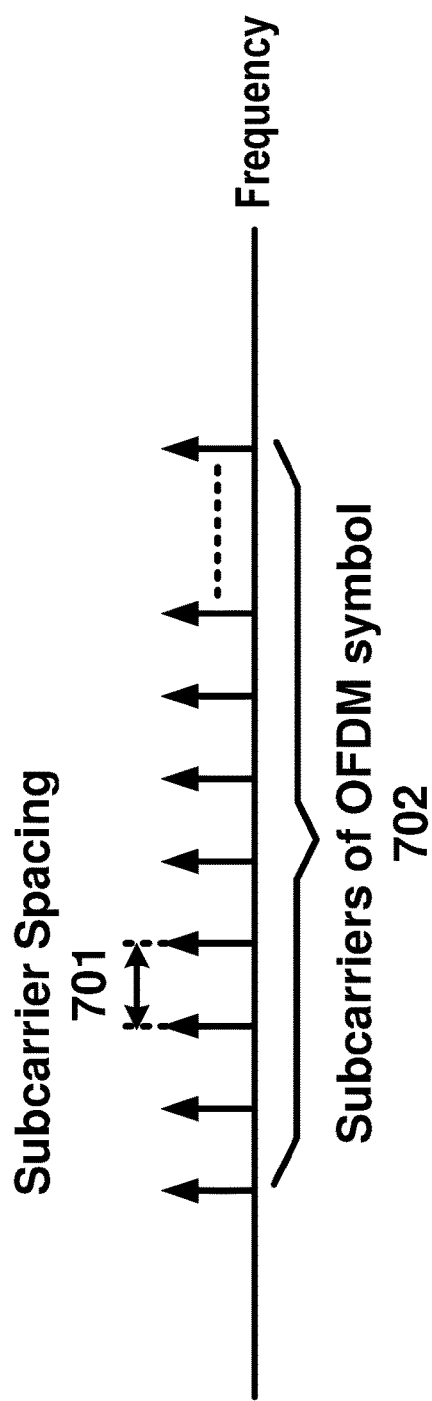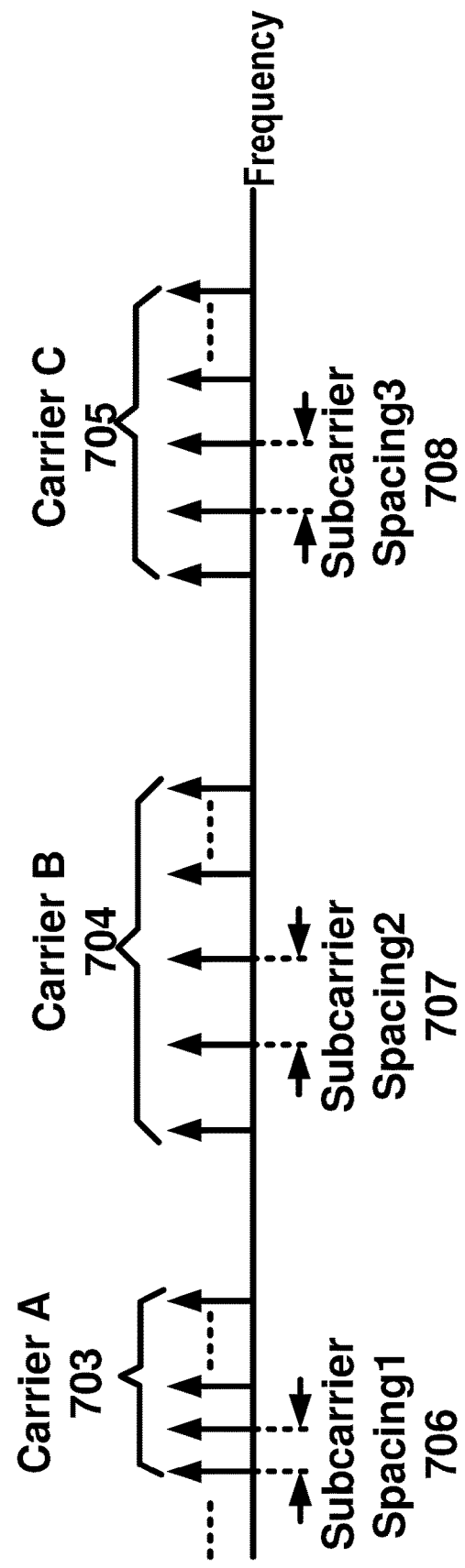
FIG. 7A
FIG. 7B

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 18

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 19

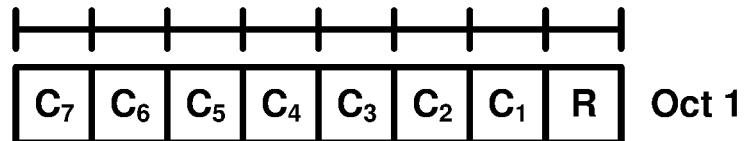
FIG. 21A
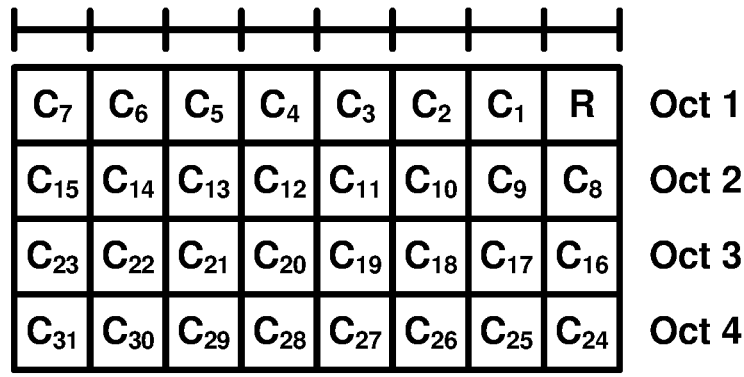
FIG. 21B
| Hibernation MAC CE $C_i$ | Activation/ Deactivation MAC CE $C_i$ | SCell may be |
|---|---|---|
| 0 | 0 | Deactivated |
| 0 | 1 | Activated |
| 1 | 0 | Reserved MAC CE combination |
| 1 | 1 | Dormant |
FIG. 21C

|  | DCI format | Example size (Bits) | Usage |
|---|---|---|---|
| Uplink | 0 | 45 | Uplink scheduling grant |
|  | 4 | 53 | Uplink scheduling grant with spatial multiplexing |
|  | 6-0A, 6-0B | 46, 36 | Uplink scheduling grant for eMTC devices |
| Downlink | 1C | 31 | Special purpose compact assignment |
|  | 1A | 45 | Contiguous allocation only |
|  | 1B | 46 | Codebook-based beamforming using CRS |
|  | 1D | 46 | MU-MIMO using CRS |
|  | 1 | 55 | Flexible allocations |
|  | 2A | 64 | Open-loop spatial multiplexing using CRS |
|  | 2B | 64 | Dual-layer transmission using DM-RS (TM8) |
|  | 2C | 66 | Multi-layer transmission using DM-RS (TM9) |
|  | 2D | 68 | Multi-layer transmission using DM-RS (TM9) |
|  | 2 | 67 | Closed-loop spatial multiplexing using CRS |
|  | 6-1A, 6-1B | 46, 36 | Downlink scheduling grants for eMTC devices |
| Special | 3, 3A | 45 | Power control commands |
|  | 5 |  | Sidelink operation |
|  | 6-2 |  | Paging/direct indication for eMTC devices |

FIG. 22

UPLINK TRANSMISSION IN A WIRELESS COMMUNICATION SYSTEM

CROSS-REFERENCE TO RELATED APPLICATIONS

This application is a continuation of U.S. patent application Ser. No. 16/833,522, filed Mar. 28, 2020, which claims the benefit of U.S. Provisional Application No. 62/825,301, filed Mar. 28, 2019, both of which are hereby incorporated by reference in their entireties.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 7A and FIG. 7B are diagrams depicting example sets of OFDM subcarriers as per an aspect of an embodiment of the present disclosure.

FIG. 18 is an example of LCIDs for DL-SCH as per an aspect of an embodiment of the present disclosure.

FIG. 19 is an example of LCIDs for UL-SCH as per an aspect of an embodiment of the present disclosure.

FIG. 21A is an example of an SCell hibernation MAC CE of one octet as per an aspect of an embodiment of the present disclosure.

FIG. 21B is an example of an SCell hibernation MAC CE of four octets as per an aspect of an embodiment of the present disclosure.

FIG. 21C is an example of MAC control elements for an SCell state transitions as per an aspect of an embodiment of the present disclosure.

FIG. 22 is an example of DCI formats as per an aspect of an embodiment of the present disclosure.

DETAILED DESCRIPTION OF EMBODIMENTS

Figure 1:
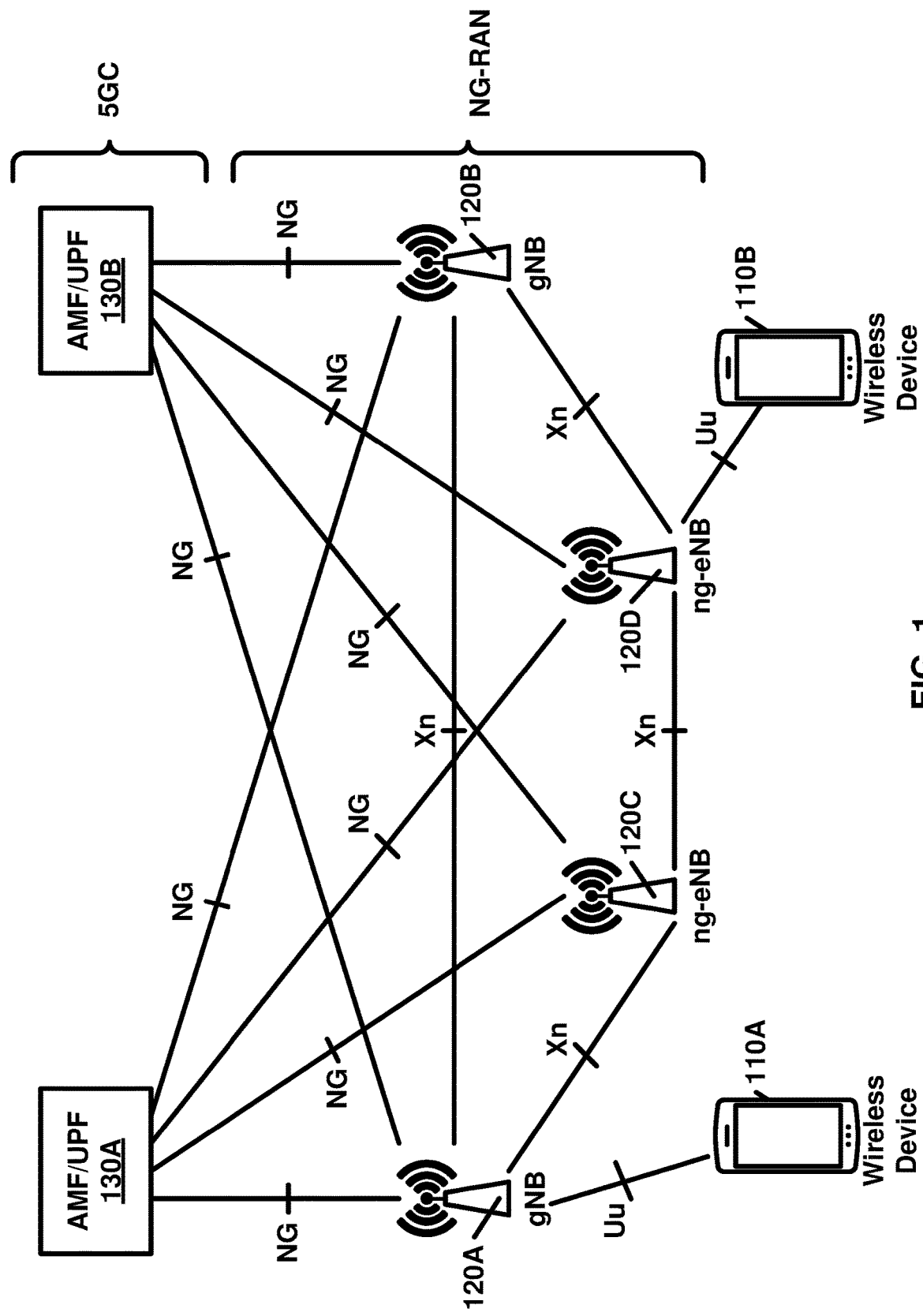
FIG. 1 is a diagram of an example RAN architecture as per an aspect of an embodiment of the present disclosure.

Example embodiments of the present disclosure enable operations on multiple TRPs and/or multiple panels of a wireless device and/or a base station. Embodiments of the technology disclosed herein may be employed in the technical field of multicarrier communication systems. More particularly, the embodiments of the technology disclosed herein may relate to a wireless device and/or a base station in a multicarrier communication system.

The following Acronyms are used throughout the present disclosure:

| | |
|---|---|
| 3GPP | 3rd Generation Partnership Project |
| 5GC | 5G Core Network |
| ACK | Acknowledgement |
| AMF | Access and Mobility Management Function |
| ARQ | Automatic Repeat Request |
| AS | Access Stratum |
| ASIC | Application-Specific Integrated Circuit |
| BA | Bandwidth Adaptation |
| BCCH | Broadcast Control Channel |
| BCH | Broadcast Channel |
| BPSK | Binary Phase Shift Keying |
| BWP | Bandwidth Part |
| CA | Carrier Aggregation |
| CC | Component Carrier |
| CCCH | Common Control CHannel |
| CDMA | Code Division Multiple Access |
| CN | Core Network |
| CP | Cyclic Prefix |
| CP-OFDM | Cyclic Prefix- Orthogonal Frequency Division Multiplex |
| C-RNTI | Cell-Radio Network Temporary Identifier |
| CS | Configured Scheduling |
| CSI | Channel State Information |
| CSI-RS | Channel State Information-Reference Signal |
| CQI | Channel Quality Indicator |
| CSS | Common Search Space |
| CU | Central Unit |
| DAI | Downlink Assignment Index |
| DC | Dual Connectivity |
| DCCH | Dedicated Control Channel |
| DCI | Downlink Control Information |
| DL | Downlink |
| DL-SCH | Downlink Shared CHannel |
| DM-RS | DeModulation Reference Signal |
| DRB | Data Radio Bearer |
| DRX | Discontinuous Reception |
| DTCH | Dedicated Traffic Channel |
| DU | Distributed Unit |
| EPC | Evolved Packet Core |
| E-UTRA | Evolved UMTS Terrestrial Radio Access |
| E-UTRAN | Evolved-Universal Terrestrial Radio Access Network |
| FDD | Frequency Division Duplex |
| FPGA | Field Programmable Gate Arrays |
| F1-C | F1-Control plane |
| F1-U | F1-User plane |
| gNB | next generation Node B |
| HARQ | Hybrid Automatic Repeat reQuest |
| HDL | Hardware Description Languages |
| IE | Information Element |
| IP | Internet Protocol |
| LCID | Logical Channel Identifier |
| LTE | Long Term Evolution |
| MAC | Media Access Control |
| MCG | Master Cell Group |
| MCS | Modulation and Coding Scheme |
| MeNB | Master evolved Node B |
| MIB | Master Information Block |
| MME | Mobility Management Entity |
| MN | Master Node |
| NACK | Negative Acknowledgement |
| NAS | Non-Access Stratum |
| NG CP | Next Generation Control Plane |
| NGC | Next Generation Core |
| NG-C | NG-Control plane |
| ng-eNB | next generation evolved Node B |
| NG-U | NG-User plane |
| NR | New Radio |
| NR MAC | New Radio MAC |
| NR PDCP | New Radio PDCP |
| NR PHY | New Radio PHYsical |
| NR RLC | New Radio RLC |
| NR RRC | New Radio RRC |
| NSSAI | Network Slice Selection Assistance Information |
| O&M | Operation and Maintenance |
| OFDM | orthogonal Frequency Division Multiplexing |
| PBCH | Physical Broadcast CHannel |
| PCC | Primary Component Carrier |
| PCCH | Paging Control CHannel |
| PCell | Primary Cell |
| PCH | Paging CHannel |
| PDCCH | Physical Downlink Control CHannel |
| PDCP | Packet Data Convergence Protocol |
| PDSCH | Physical Downlink Shared CHannel |
| PDU | Protocol Data Unit |
| PHICH | Physical HARQ Indicator CHannel |
| PHY | PHYsical |
| PLMN | Public Land Mobile Network |
| PMI | Precoding Matrix Indicator |
| PRACH | Physical Random Access CHannel |
| PRB | Physical Resource Block |
| PSCell | Primary Secondary Cell |
| PSS | Primary Synchronization Signal |
| pTAG | primary Timing Advance Group |
| PT-RS | Phase Tracking Reference Signal |
| PUCCH | Physical Uplink Control CHannel |
| PUSCH | Physical Uplink Shared CHannel |
| QAM | Quadrature Amplitude Modulation |
| QFI | Quality of Service Indicator |
| QoS | Quality of Service |
| QPSK | Quadrature Phase Shift Keying |
| RA | Random Access |
| RACH | Random Access CHannel |
| RAN | Radio Access Network |
| RAT | Radio Access Technology |
| RA-RNTI | Random Access-Radio Network Temporary Identifier |
| RB | Resource Blocks |
| RBG | Resource Block Groups |
| RI | Rank indicator |
| RLC | Radio Link Control |
| RLM | Radio Link Monitoring |
| RNTI | Radio Network Temporary Identifier |
| RRC | Radio Resource Control |
| RRM | Radio Resource Management |
| RS | Reference Signal |
| RSRP | Reference Signal Received Power |
| SCC | Secondary Component Carrier |
| SCell | Secondary Cell |
| SCG | Secondary Cell Group |
| SC-FDMA | Single Carrier-Frequency Division Multiple Access |
| SDAP | Service Data Adaptation Protocol |
| SDU | Service Data Unit |
| SeNB | Secondary evolved Node B |
| SFN | System Frame Number |
| S-GW | Serving GateWay |
| SI | System Information |
| SIB | System Information Block |
| SMF | Session Management Function |
| SN | Secondary Node |
| SpCell | Special Cell |
| SRB | Signaling Radio Bearer |
| SRS | Sounding Reference Signal |
| SS | Synchronization Signal |
| SSS | Secondary Synchronization Signal |
| sTAG | secondary Timing Advance Group |
| TA | Timing Advance |
| TAG | Timing Advance Group |
| TAI | Tracking Area Identifier |
| TAT | Time Alignment Timer |
| TB | Transport Block |
| TCI | Transmission Configuration Indication |

| | -continued |
|---|---|
| TC-RNTI | Temporary Cell-Radio Network Temporary Identifier |
| TDD | Time Division Duplex |
| TDMA | Time Division Multiple Access |
| TRP | Transmission Reception Point |
| TTI | Transmission Time Interval |
| UCI | Uplink Control Information |
| UE | User Equipment |
| UL | Uplink |
| UL-SCH | Uplink Shared CHannel |
| UPF | User Plane Function |
| UPGW | User Plane Gateway |
| VHDL | VHSIC Hardware Description Language |
| Xn-C | Xn-Control plane |
| Xn-U | Xn-User plane |

Example embodiments of the disclosure may be implemented using various physical layer modulation and transmission mechanisms. Example transmission mechanisms may include, but not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 120C, 120D), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface.

A gNB or an ng-eNB may host functions such as radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
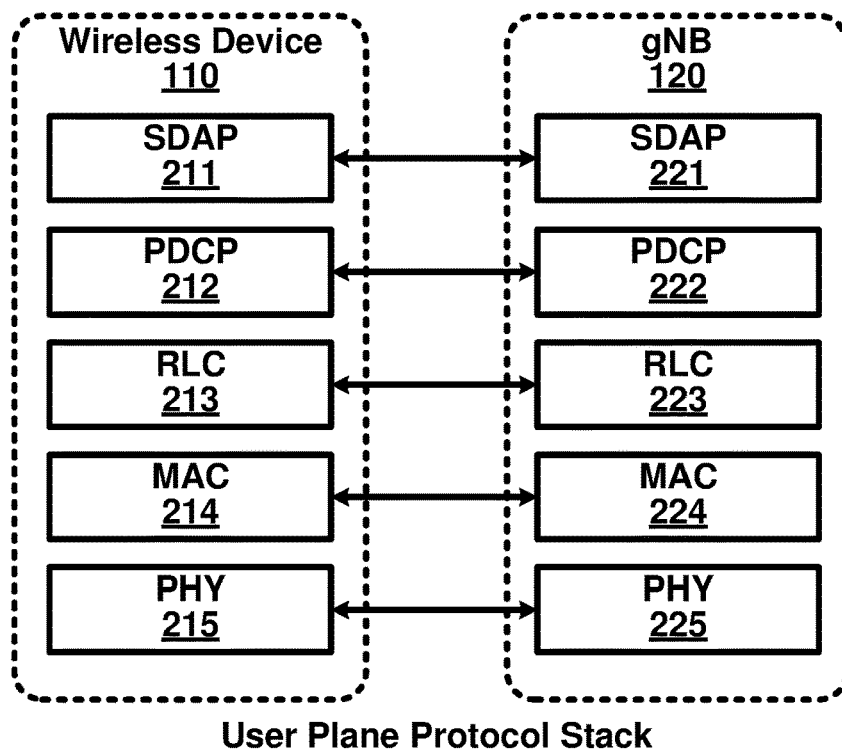
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TB s) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
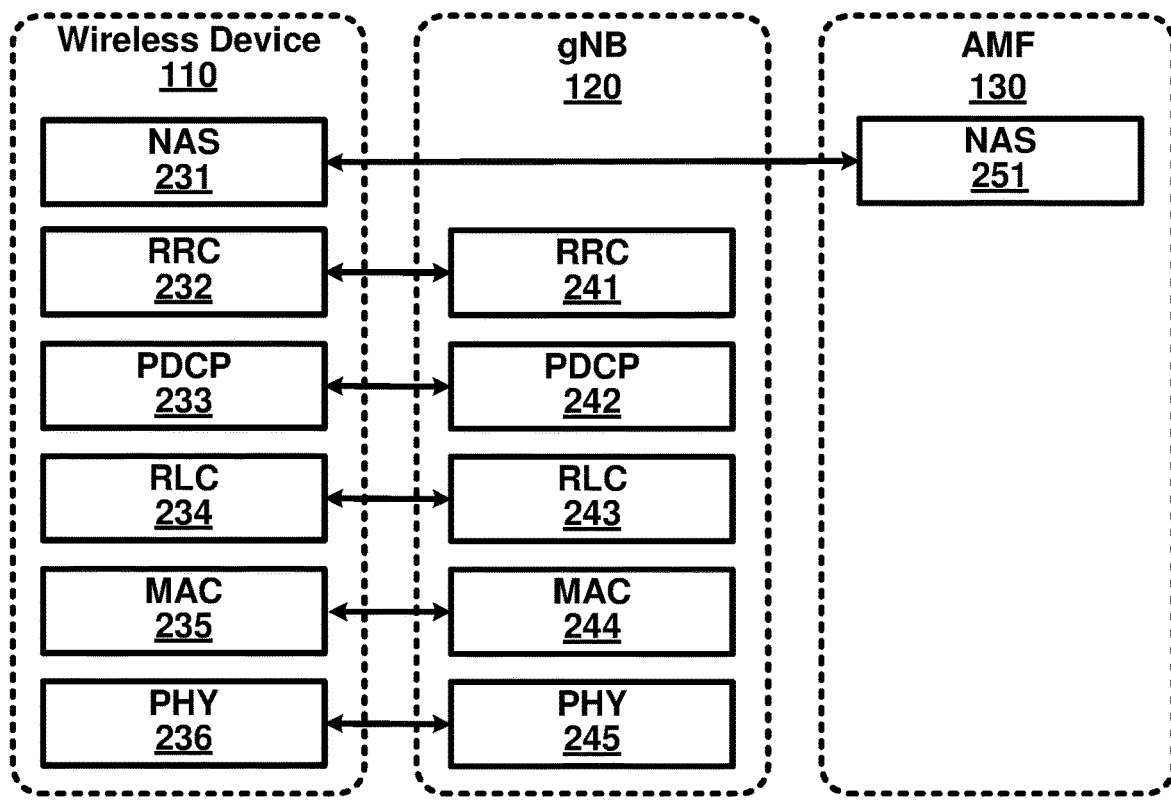
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and an AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
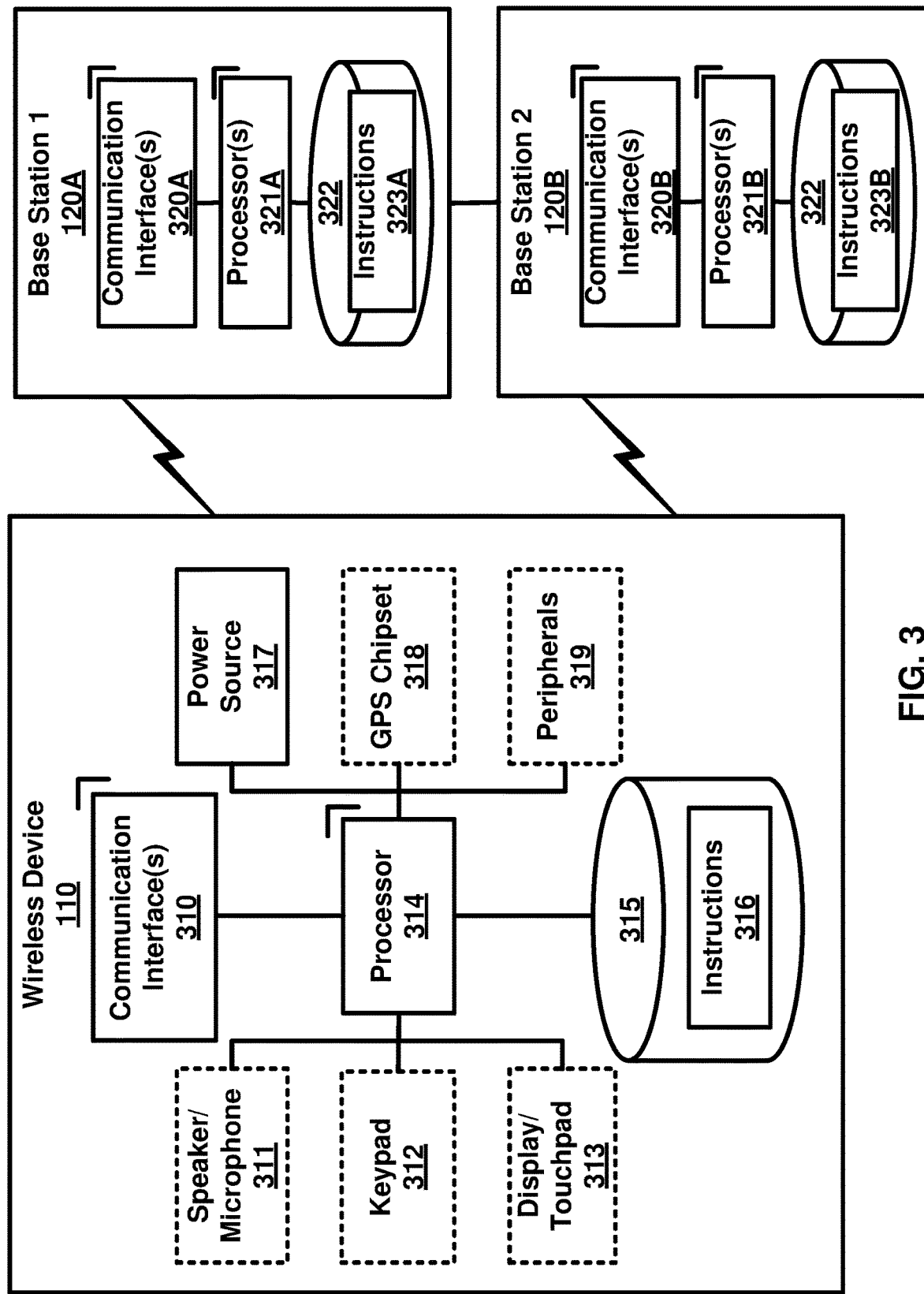
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called a UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SIs. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signalling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signalling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to reestablish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
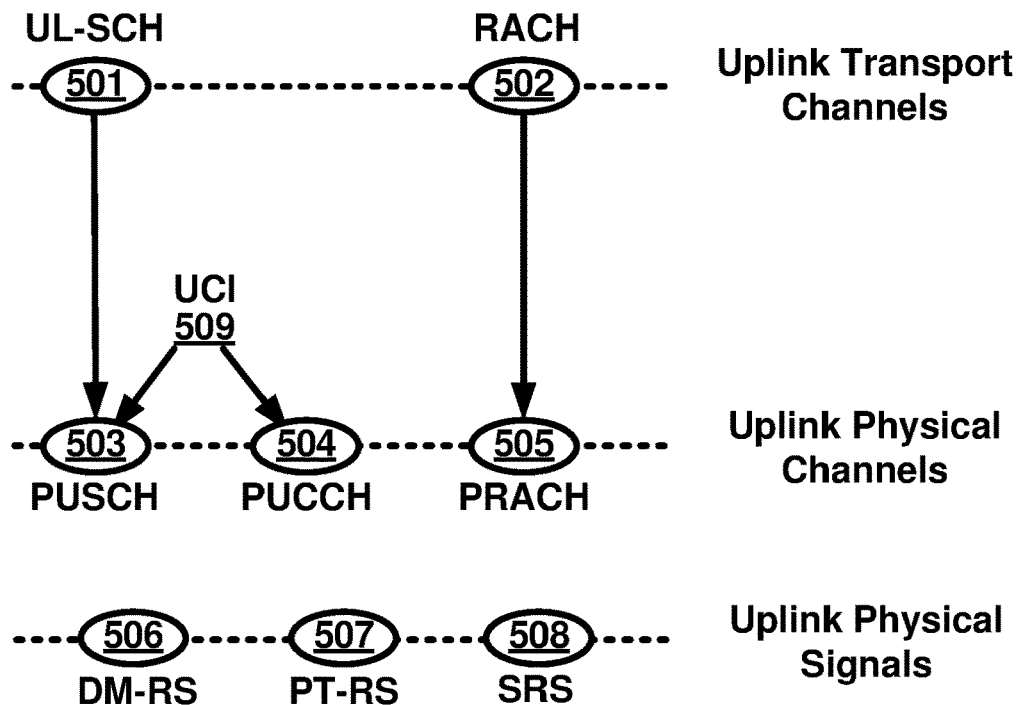
FIG. 5A is a diagram of an example uplink channel mapping and example uplink physical signals as per an aspect of an embodiment of the present disclosure.
Figure 5B:
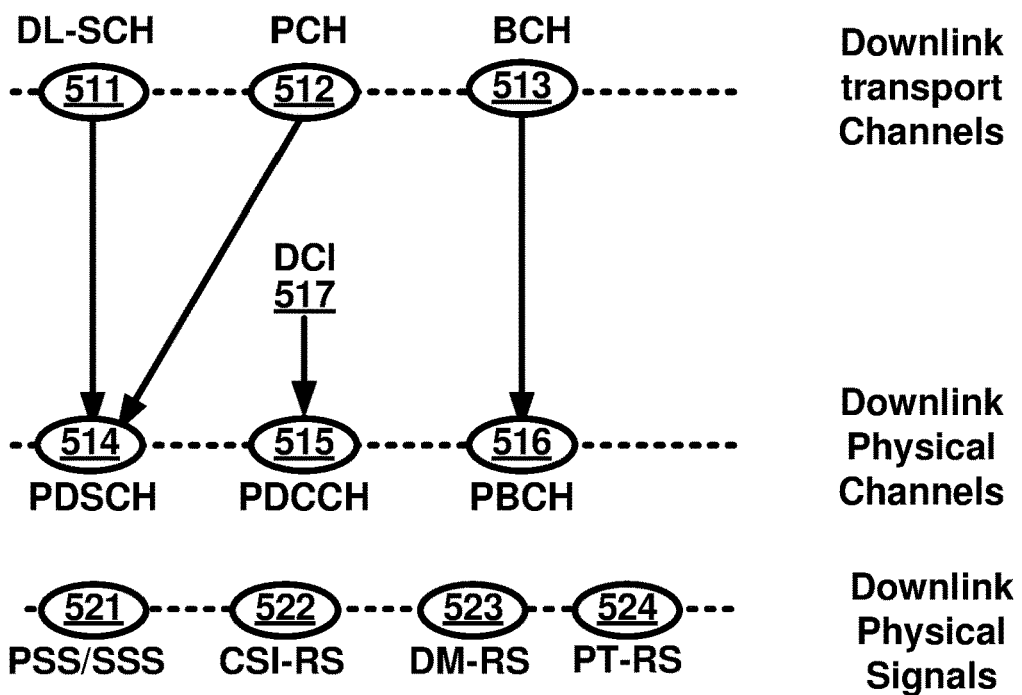
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on an RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, an SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SS/PBCH blocks when the downlink CSI-RS 522 and SS/PBCH blocks are spatially quasi co-located and resource elements associated with the downlink CSI-RS 522 are the outside of PRBs configured for SS/PBCH blocks.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on an RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
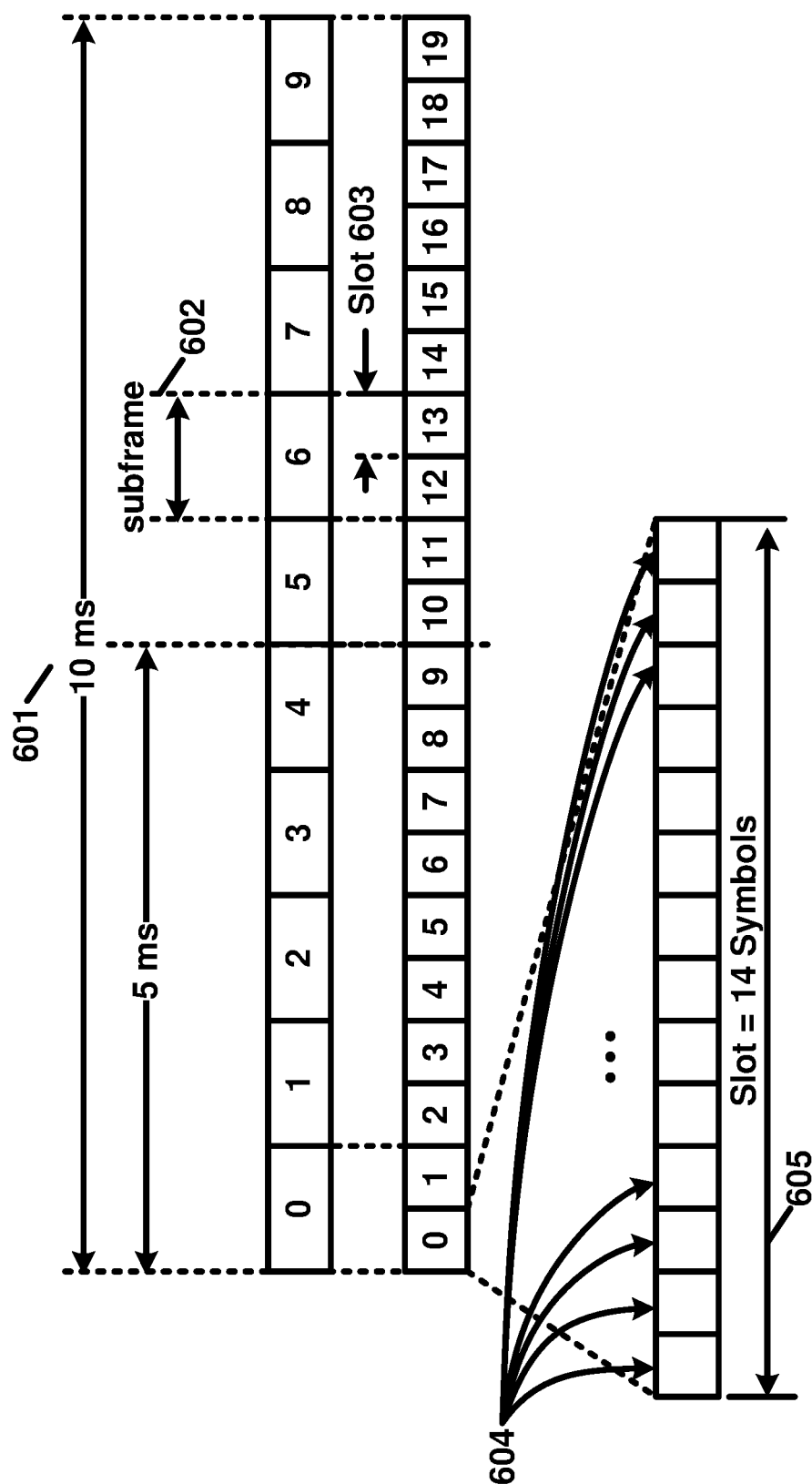
FIG. 6 is a diagram depicting an example transmission time or reception time for a carrier as per an aspect of an embodiment of the present disclosure.

FIG. 6 is a diagram depicting an example transmission time and reception time for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame timing. Downlink and uplink transmissions may be organized into radio frames 601. In this example, radio frame duration is 10 ms. In this example, a 10 ms radio frame 601 may be divided into ten equally sized subframes 602 with 1 ms duration. Subframe (s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
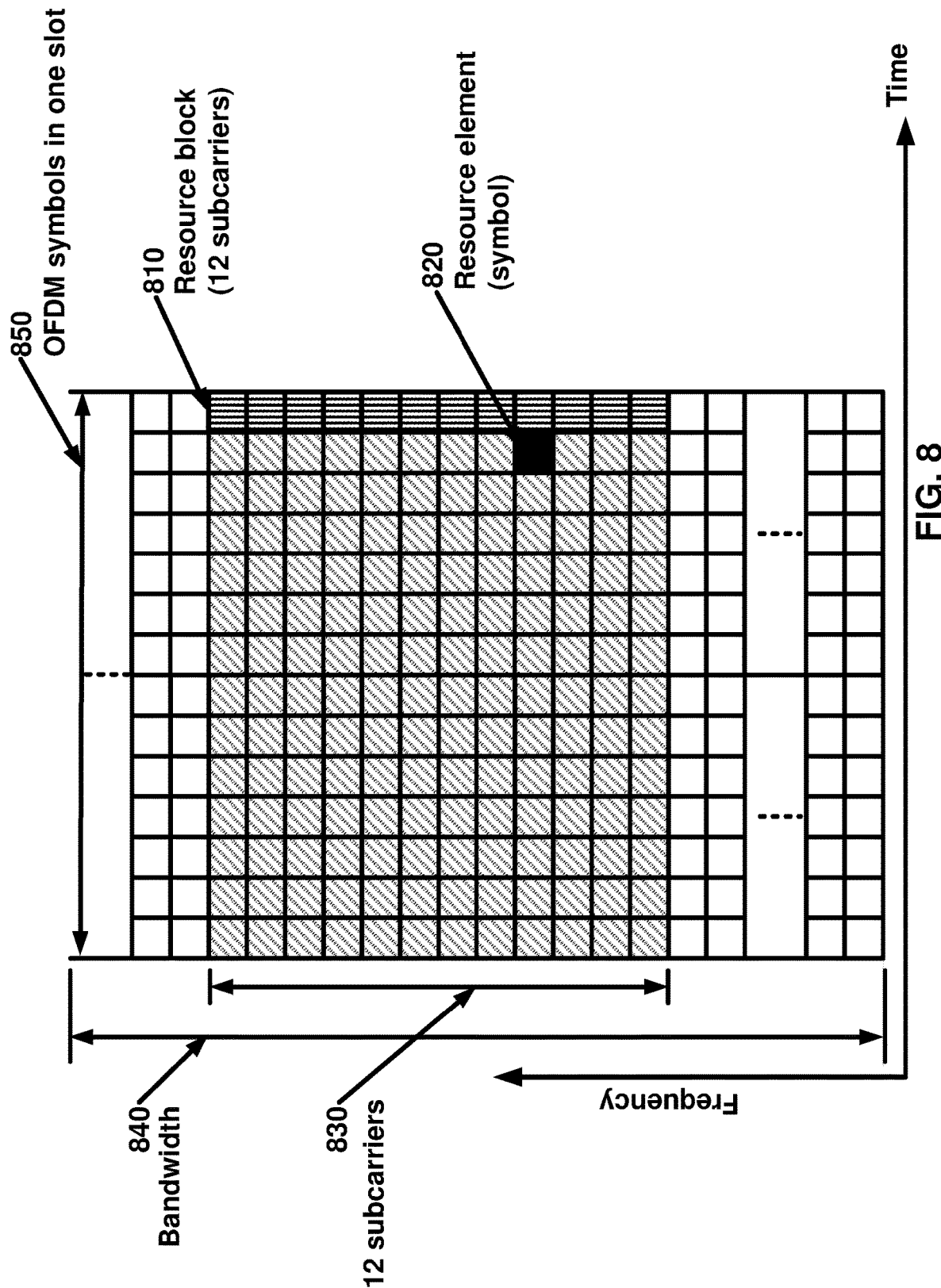
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of an RBG may depend on at least one of: an RRC message indicating an RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristic from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCLed with the DM-RS antenna port(s). Different set of DM-RS antenna port(s) for a DL data channel may be indicated as QCL with different set of the RS antenna port(s).

Figure 9A:
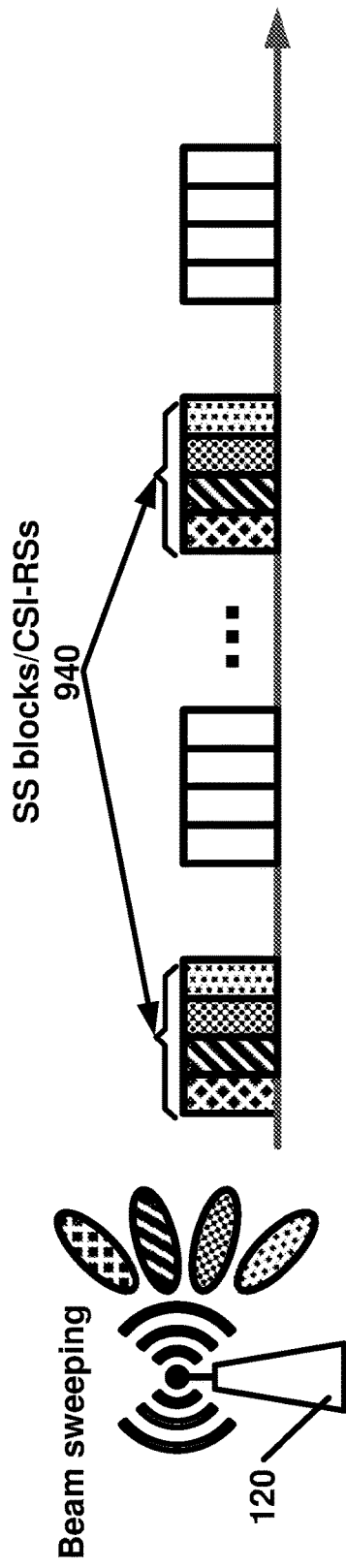
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
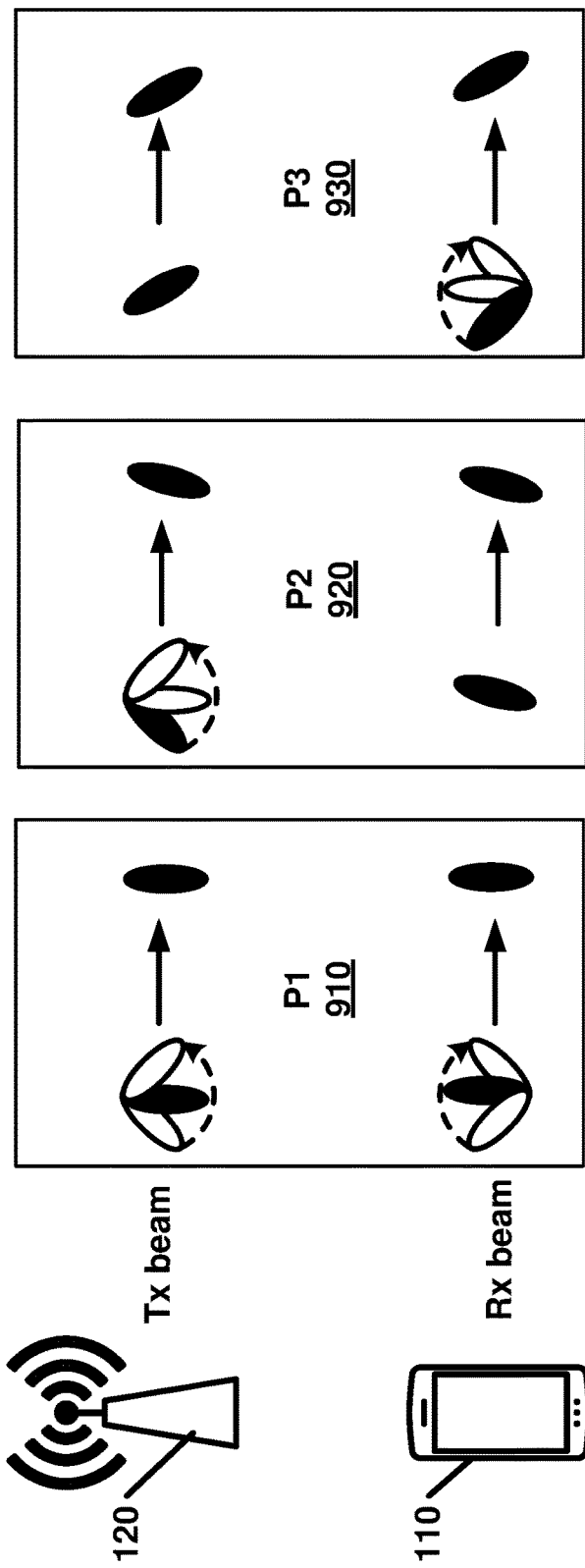
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by a UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
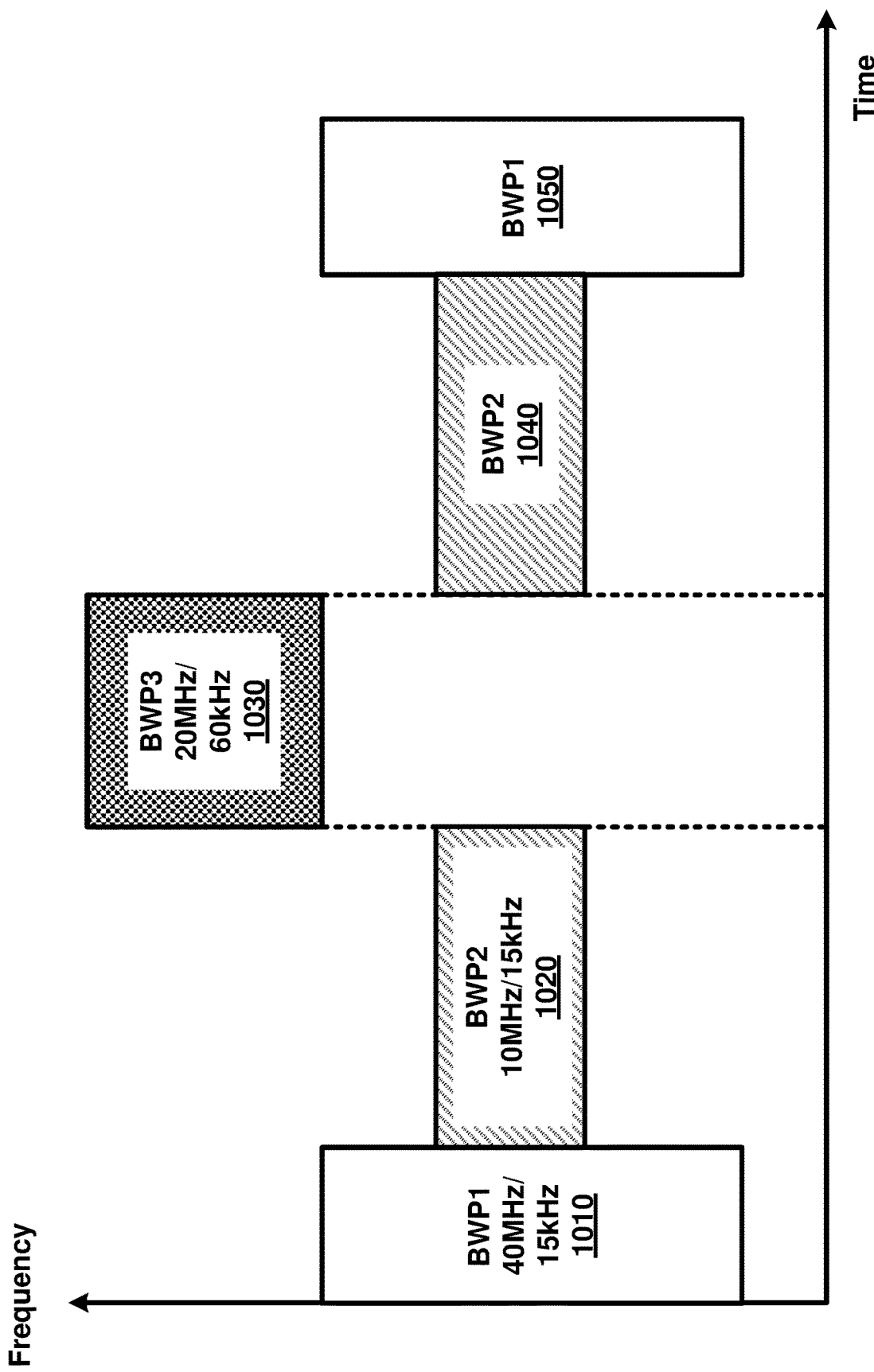
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base station may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
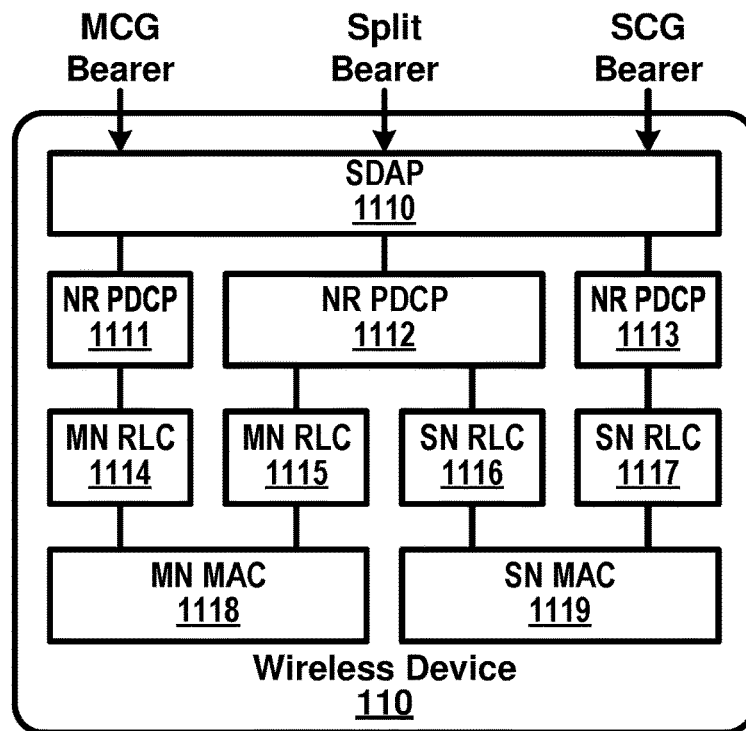
FIG. 11A, and FIG. 11B are diagrams of an example multi connectivity as per an aspect of an embodiment of the present disclosure.
Figure 11B:
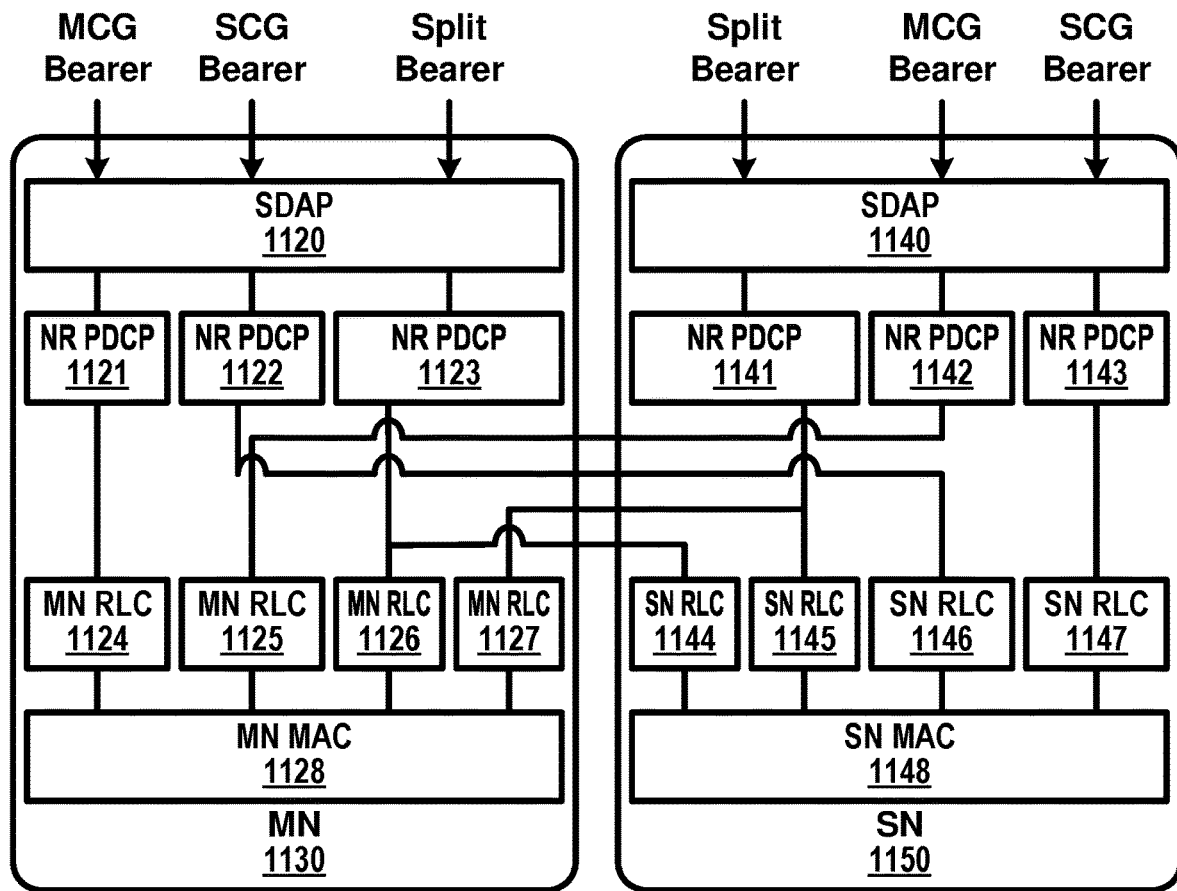

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not be supported.

With respect to interaction between a master base station and a secondary base stations for multi-connectivity, one or more of the following may be applied: a master base station and/or a secondary base station may maintain Radio Resource Management (RRM) measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for an SFN acquired from a MIB of a PSCell of a SCG.

Figure 12:
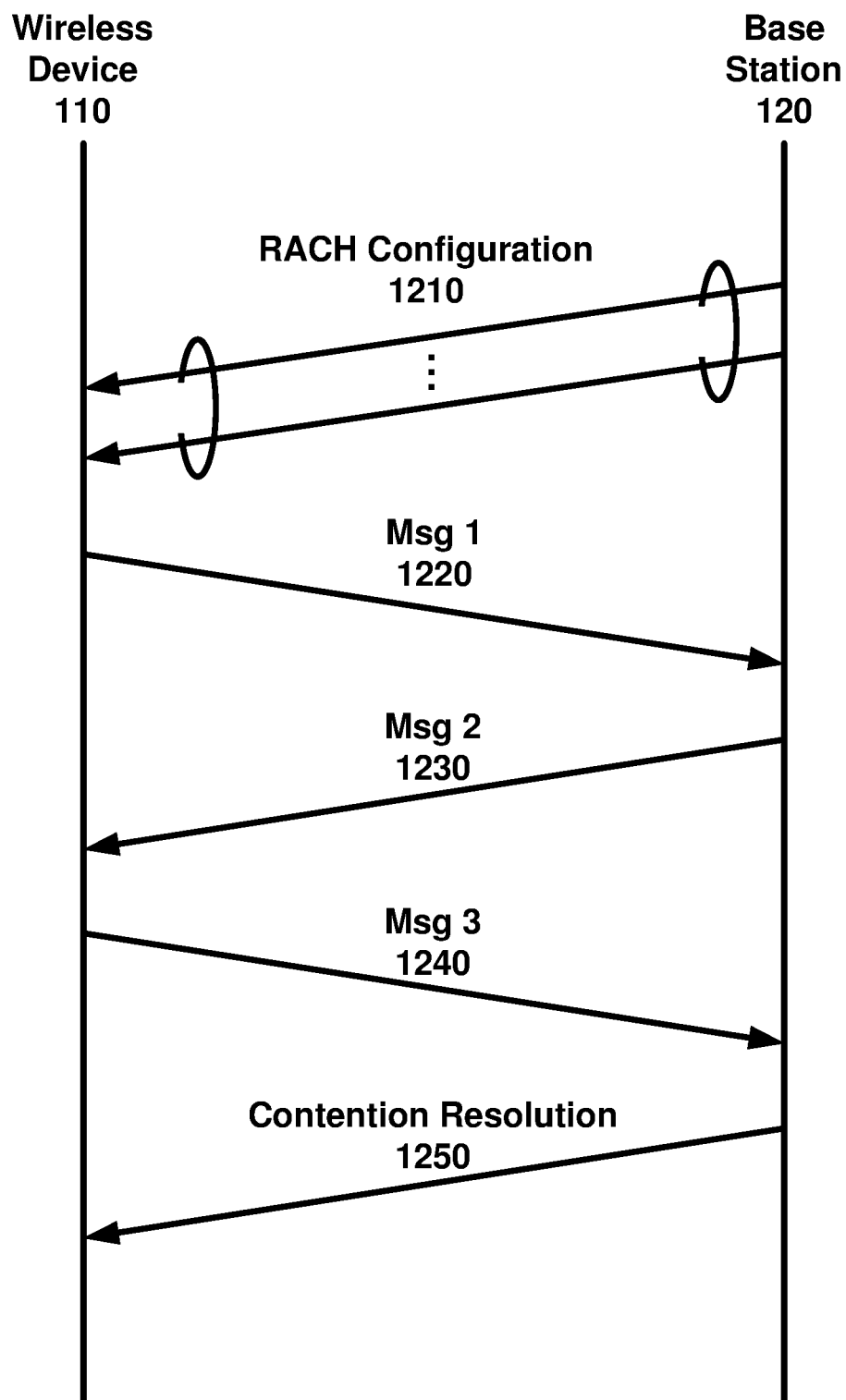
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response (s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
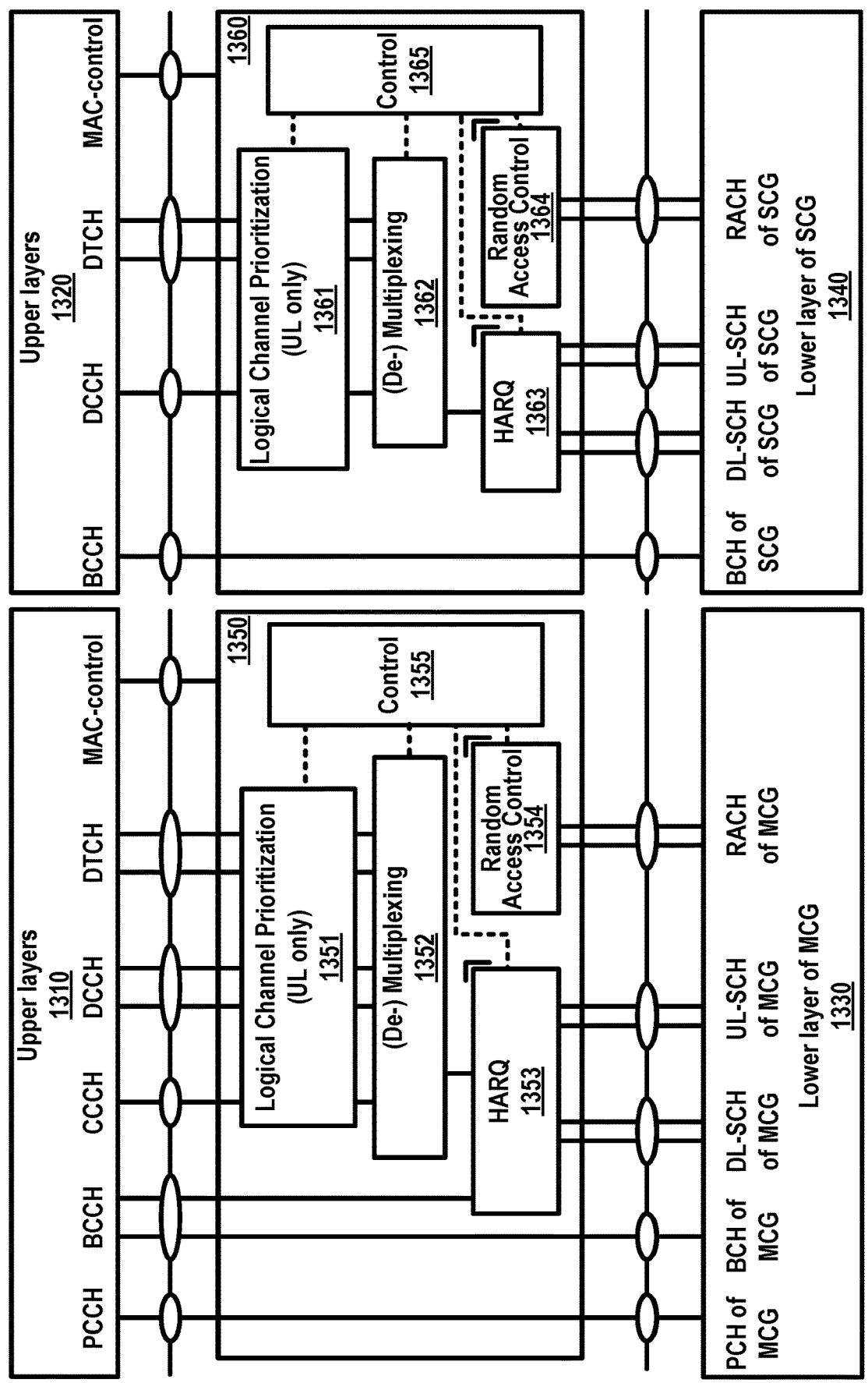
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
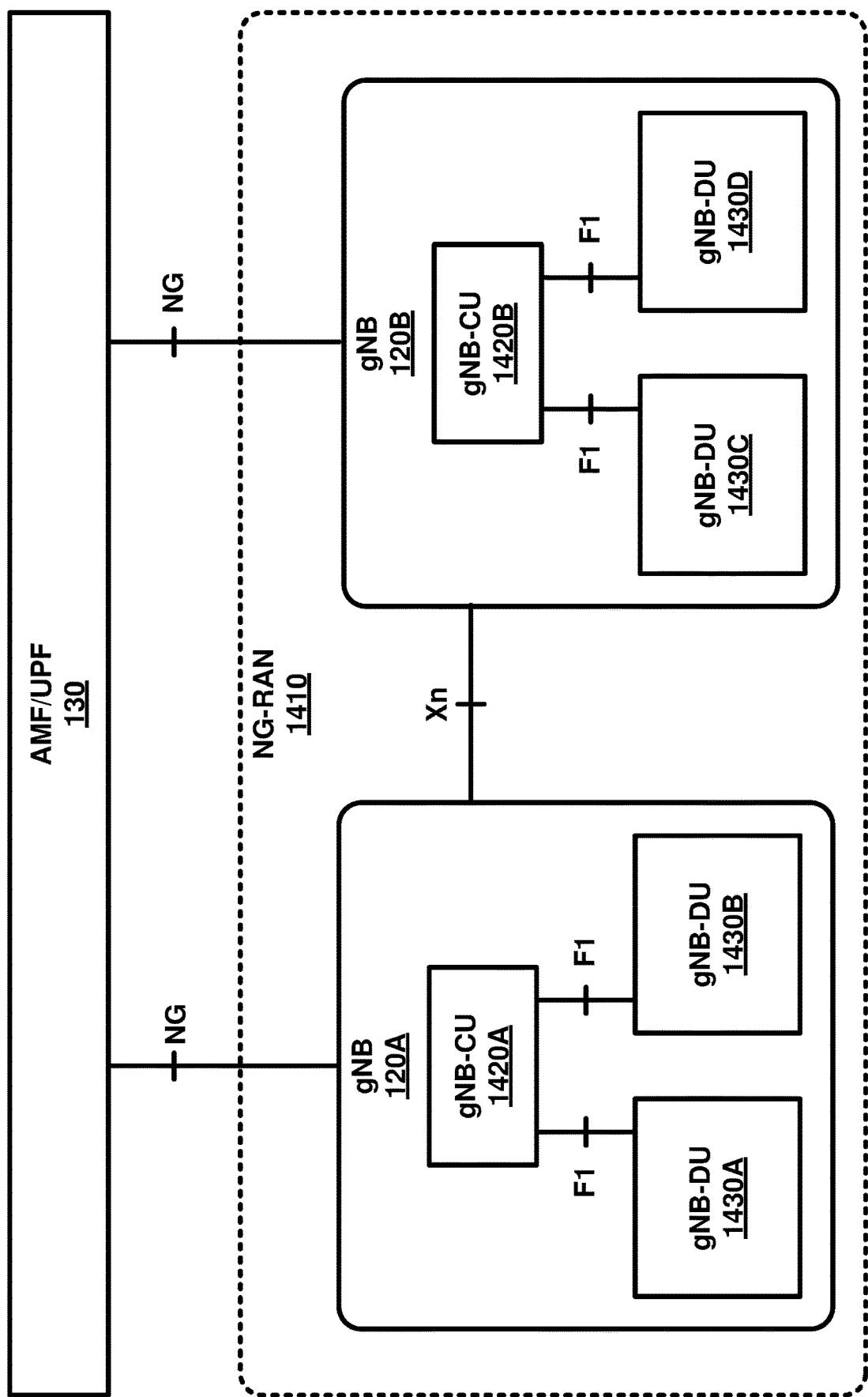
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. gNB 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
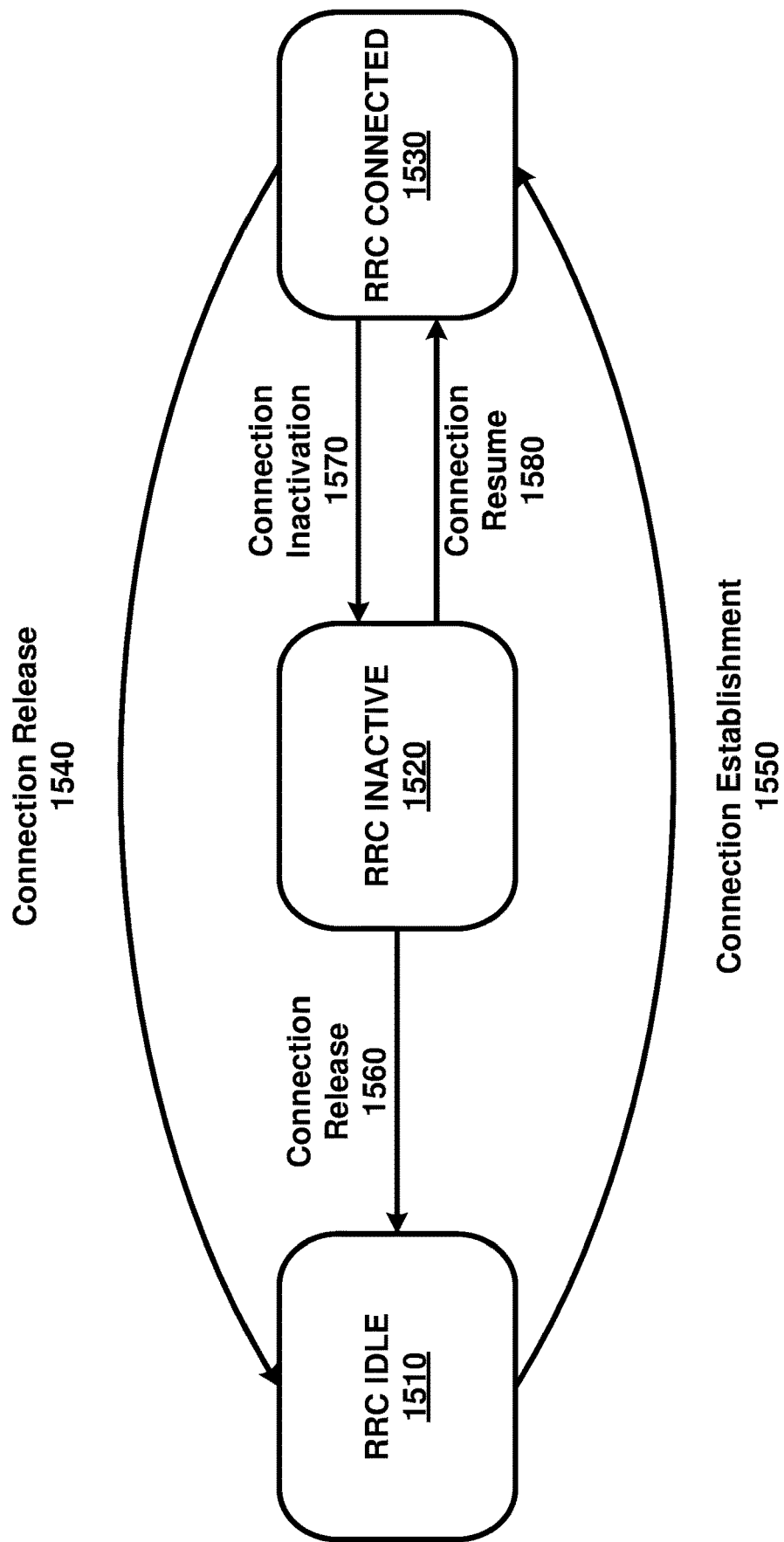
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

A gNB may transmit one or more MAC PDUs to a wireless device. In an example, a MAC PDU may be a bit string that is byte aligned (e.g., a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., a multiple of eight bits) in length. In an example, a MAC SDU may be included in a MAC PDU from the first bit onward.

In an example, a MAC CE may be a bit string that is byte aligned (e.g., a multiple of eight bits) in length.

In an example, a MAC subheader may be a bit string that is byte aligned (e.g., a multiple of eight bits) in length. In an example, a MAC subheader may be placed immediately in front of a corresponding MAC SDU, MAC CE, or padding.

In an example, a MAC entity may ignore a value of reserved bits in a DL MAC PDU.

In an example, a MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; and/or a MAC subheader and padding. In an example, the MAC SDU may be of variable size. In an example, a MAC subheader may correspond to a MAC SDU, a MAC CE, or padding.

In an example, when a MAC subheader corresponds to a MAC SDU, a variable-sized MAC CE, or padding, the MAC subheader may comprise: an R field with a one bit length; an F field with a one bit length; an LCID field with a multi-bit length; and/or an L field with a multi-bit length.

Figure 16A:
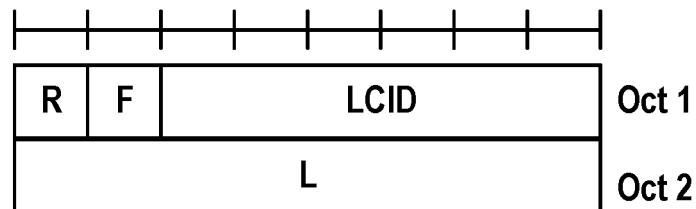
FIG. 16A, FIG. 16B and FIG. 16C are examples of MAC subheaders as per an aspect of an embodiment of the present disclosure.
Figure 16B:
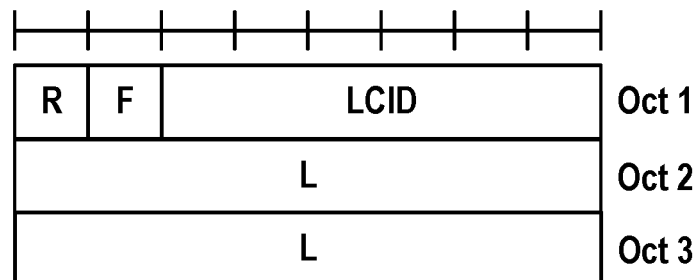

FIG. 16A shows an example of a MAC subheader with an R field, an F field, an LCID field, and an L field. In the example MAC subheader of FIG. 16A, the LCID field may be six bits in length, and the L field may be eight bits in length. FIG. 16B shows example of a MAC subheader with an R field, a F field, an LCID field, and an L field. In the example MAC subheader of FIG. 16B, the LCID field may be six bits in length, and the L field may be sixteen bits in length.

Figure 16C:
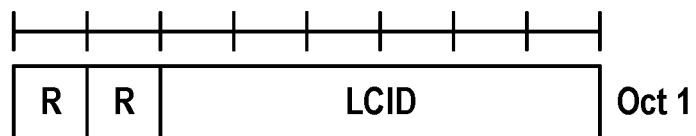

In an example, when a MAC subheader corresponds to a fixed sized MAC CE or padding, the MAC subheader may comprise: an R field with a two bit length and an LCID field with a multi-bit length. FIG. 16C shows an example of a MAC subheader with an R field and an LCID field. In the example MAC subheader of FIG. 16C, the LCID field may be six bits in length, and the R field may be two bits in length.

Figure 17A:
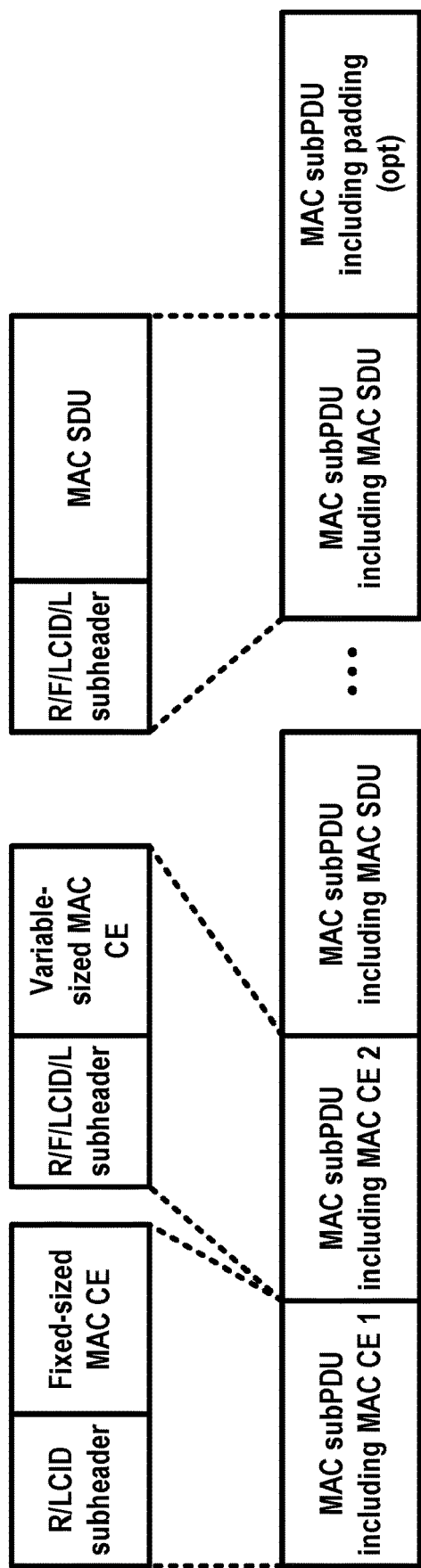
FIG. 17A and FIG. 17B are examples of MAC PDUs as per an aspect of an embodiment of the present disclosure.

FIG. 17A shows an example of a DL MAC PDU. In the example of FIG. 17A, multiple MAC CEs, such as MAC CE 1 and 2, may be placed together. A MAC subPDU comprising a MAC CE may be placed before any MAC subPDU comprising a MAC SDU or a MAC subPDU comprising padding.

Figure 17B:
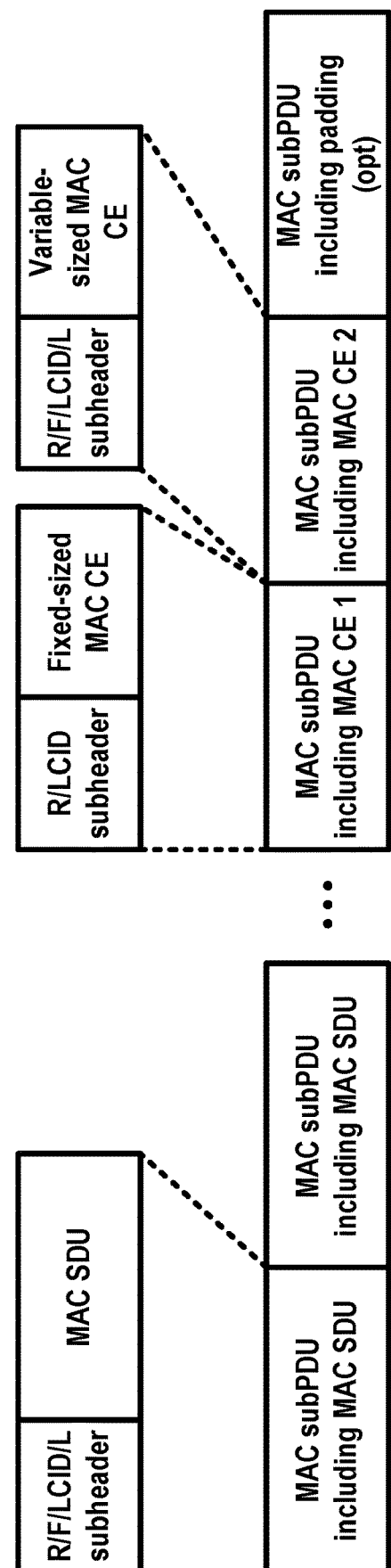

FIG. 17B shows an example of a UL MAC PDU. In the example of FIG. 17B, multiple MAC CEs, such as MAC CE 1 and 2, may be placed together. A MAC subPDU comprising a MAC CE may be placed after all MAC subPDUs comprising a MAC SDU. In addition, the MAC subPDU may be placed before a MAC subPDU comprising padding.

In an example, a MAC entity of a gNB may transmit one or more MAC CEs to a MAC entity of a wireless device. FIG. 18 shows an example of multiple LCIDs that may be associated with the one or more MAC CEs. In the example of FIG. 18, the one or more MAC CEs comprise at least one of: a SP ZP CSI-RS Resource Set Activation/Deactivation MAC CE; a PUCCH spatial relation Activation/Deactivation MAC CE; a SP SRS Activation/Deactivation MAC CE; a SP CSI reporting on PUCCH Activation/Deactivation MAC CE; a TCI State Indication for UE-specific PDCCH MAC CE; a TCI State Indication for UE-specific PDSCH MAC CE; an Aperiodic CSI Trigger State Subselection MAC CE; a SP CSI-RS/CSI-IM Resource Set Activation/Deactivation MAC CE; a UE contention resolution identity MAC CE; a timing advance command MAC CE; a DRX command MAC CE; a Long DRX command MAC CE; an SCell activation/deactivation MAC CE (1 Octet); an SCell activation/deactivation MAC CE (4 Octet); and/or a duplication activation/deactivation MAC CE. In an example, a MAC CE, such as a MAC CE transmitted by a MAC entity of a gNB to a MAC entity of a wireless device, may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a long DRX command MAC CE.

In an example, the MAC entity of the wireless device may transmit to the MAC entity of the gNB one or more MAC CEs. FIG. 19 shows an example of the one or more MAC CEs. The one or more MAC CEs may comprise at least one of: a short buffer status report (BSR) MAC CE; a long BSR MAC CE; a C-RNTI MAC CE; a configured grant confirmation MAC CE; a single entry PHR MAC CE; a multiple entry PHR MAC CE; a short truncated BSR; and/or a long truncated BSR. In an example, a MAC CE may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a short-truncated command MAC CE.

In carrier aggregation (CA), two or more component carriers (CCs) may be aggregated. A wireless device may simultaneously receive or transmit on one or more CCs, depending on capabilities of the wireless device, using the technique of CA. In an example, a wireless device may support CA for contiguous CCs and/or for non-contiguous CCs. CCs may be organized into cells. For example, CCs may be organized into one primary cell (PCell) and one or more secondary cells (SCells).

When configured with CA, a wireless device may have one RRC connection with a network. During an RRC connection establishment/re-establishment/handover, a cell providing NAS mobility information may be a serving cell. During RRC connection re-establishment/handover procedure, a cell providing a security input may be a serving cell. In an example, the serving cell may denote a PCell. In an example, a gNB may transmit, to a wireless device, one or more messages comprising configuration parameters of a plurality of one or more SCells, depending on capabilities of the wireless device.

When configured with CA, a base station and/or a wireless device may employ an activation/deactivation mechanism of an SCell to improve battery or power consumption of the wireless device. When a wireless device is configured with one or more SCells, a gNB may activate or deactivate at least one of the one or more SCells. Upon configuration of an SCell, the SCell may be deactivated unless an SCell state associated with the SCell is set to "activated" or "dormant".

In an example, a wireless device may activate/deactivate an SCell in response to receiving an SCell Activation/Deactivation MAC CE.

In an example, a gNB may transmit, to a wireless device, one or more messages comprising an SCell timer (e.g., sCellDeactivationTimer). In an example, a wireless device may deactivate an SCell in response to an expiry of the SCell timer.

When a wireless device receives an SCell Activation/Deactivation MAC CE activating an SCell, the wireless device may activate the SCell. In response to the activating the SCell, the wireless device may perform operations comprising SRS transmissions on the SCell; CQI/PMI/RI/CRI reporting for the SCell; PDCCH monitoring on the SCell; PDCCH monitoring for the SCell; and/or PUCCH transmissions on the SCell.

In an example, in response to the activating the SCell, the wireless device may start or restart a first SCell timer (e.g., sCellDeactivationTimer) associated with the SCell. The wireless device may start or restart the first SCell timer in the slot when the SCell Activation/Deactivation MAC CE activating the SCell has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

When a wireless device receives an SCell Activation/Deactivation MAC CE deactivating an activated SCell, the wireless device may deactivate the activated SCell. In an example, when a first SCell timer (e.g., sCellDeactivationTimer) associated with an activated SCell expires, the wireless device may deactivate the activated SCell. In response to the deactivating the activated SCell, the wireless device may stop the first SCell timer associated with the activated SCell. In an example, in response to the deactivating the activated SCell, the wireless device may clear one or more configured downlink assignments and/or one or more configured uplink grants of a configured uplink grant Type 2 associated with the activated SCell. In an example, in response to the deactivating the activated SCell, the wireless device may: suspend one or more configured uplink grants of a configured uplink grant Type 1 associated with the activated SCell; and/or flush HARQ buffers associated with the activated SCell.

In an example, when an SCell is deactivated, a wireless device may not perform operations comprising: transmitting SRS on the SCell; reporting CQI/PMI/RI/CRI for the SCell; transmitting on UL-SCH on the SCell; transmitting on RACH on the SCell; monitoring at least one first PDCCH on the SCell; monitoring at least one second PDCCH for the SCell; and/or transmitting a PUCCH on the SCell.

In an example, when at least one first PDCCH on an activated SCell indicates an uplink grant or a downlink assignment, a wireless device may restart a first SCell timer (e.g., sCellDeactivationTimer) associated with the activated SCell. In an example, when at least one second PDCCH on a serving cell (e.g. a PCell or an SCell configured with PUCCH, i.e. PUCCH SCell) scheduling the activated SCell indicates an uplink grant or a downlink assignment for the activated SCell, a wireless device may restart the first SCell timer (e.g., sCellDeactivationTimer) associated with the activated SCell.

In an example, when an SCell is deactivated, if there is an ongoing random access procedure on the SCell, a wireless device may abort the ongoing random access procedure on the SCell.

Figure 20A:
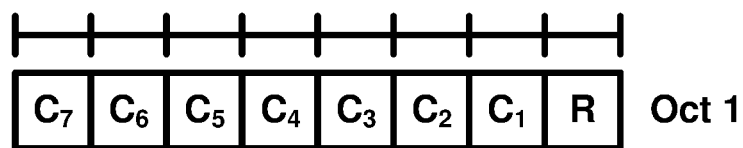
FIG. 20A is an example of an SCell Activation/Deactivation MAC CE of one octet as per an aspect of an embodiment of the present disclosure.

FIG. 20A shows an example of an SCell Activation/Deactivation MAC CE of one octet. A first MAC PDU subheader with a first LCID (e.g., '111010' as shown in FIG. 18) may identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first number of C-fields (e.g. seven) and a second number of R-fields (e.g., one).

Figure 20B:
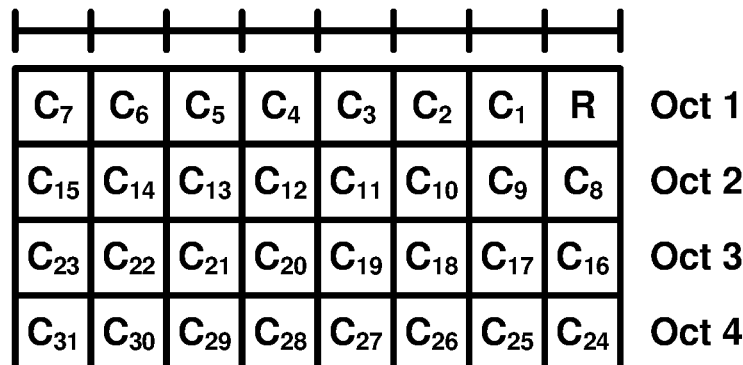
FIG. 20B is an example of an SCell Activation/Deactivation MAC CE of four octets as per an aspect of an embodiment of the present disclosure.

FIG. 20B shows an example of an SCell Activation/Deactivation MAC CE of four octets. A second MAC PDU subheader with a second LCID (e.g., '111001' as shown in FIG. 18) may identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third number of C-fields (e.g., 31) and a fourth number of R-fields (e.g., 1).

In FIG. 20A and/or FIG. 20B, a $C_i$ field may indicate an activation/deactivation status of an SCell with an SCell index i if an SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In FIG. 20A and FIG. 20B, an R field may indicate a reserved bit. The R field may be set to zero.

When configured with CA, a base station and/or a wireless device may employ a hibernation mechanism for an SCell to improve battery or power consumption of the wireless device and/or to improve latency of SCell activation/addition. When the wireless device hibernates the SCell, the SCell may be transitioned into a dormant state. In response to the SCell being transitioned into a dormant state, the wireless device may: stop transmitting SRS on the SCell; report CQI/PMI/RI/PTI/CRI for the SCell according to a periodicity configured for the SCell in a dormant state; not transmit on UL-SCH on the SCell; not transmit on RACH on the SCell; not monitor the PDCCH on the SCell; not monitor the PDCCH for the SCell; and/or not transmit PUCCH on the SCell. In an example, reporting CSI for an SCell and not monitoring the PDCCH on/for the SCell, when the SCell is in a dormant state, may provide the base station an always-updated CSI for the SCell. With the always-updated CSI, the base station may employ a quick and/or accurate channel adaptive scheduling on the SCell once the SCell is transitioned back into active state, thereby speeding up the activation procedure of the SCell. In an example, reporting CSI for the SCell and not monitoring the PDCCH on/for the SCell, when the SCell is in dormant state, may improve battery or power consumption of the wireless device, while still providing the base station timely and/or accurate channel information feedback. In an example, a PCell/PSCell and/or a PUCCH secondary cell may not be configured or transitioned into dormant state.

When configured with one or more SCells, a gNB may activate, hibernate, or deactivate at least one of the one or more SCells. In an example, a gNB may transmit one or more RRC messages comprising parameters indicating at least one SCell being set to an active state, a dormant state, or an inactive state, to a wireless device.

In an example, when an SCell is in an active state, the wireless device may perform SRS transmissions on the SCell; CQI/PMI/RI/CRI reporting for the SCell; PDCCH monitoring on the SCell; PDCCH monitoring for the SCell; and/or PUCCH/SPUCCH transmissions on the SCell.

In an example, when an SCell is in an inactive state, the wireless device may: not transmit SRS on the SCell; not report CQI/PMI/RI/CRI for the SCell; not transmit on UL-SCH on the SCell; not transmit on RACH on the SCell; not monitor PDCCH on the SCell; not monitor PDCCH for the SCell; and/or not transmit PUCCH/SPUCCH on the SCell.

In an example, when an SCell is in a dormant state, the wireless device may: not transmit SRS on the SCell; report CQI/PMI/RI/CRI for the SCell; not transmit on UL-SCH on the SCell; not transmit on RACH on the SCell; not monitor PDCCH on the SCell; not monitor PDCCH for the SCell; and/or not transmit PUCCH/SPUCCH on the SCell.

When configured with one or more SCells, a gNB may activate, hibernate, or deactivate at least one of the one or more SCells. In an example, a gNB may transmit one or more MAC control elements comprising parameters indicating activation, deactivation, or hibernation of at least one SCell to a wireless device.

In an example, a gNB may transmit a first MAC CE (e.g., activation/deactivation MAC CE, as shown in FIG. 20A or FIG. 20B) indicating activation or deactivation of at least one SCell to a wireless device. In FIG. 20A and/or FIG. 20B, a $C_i$ field may indicate an activation/deactivation status of an SCell with an SCell index i if an SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In FIG. 20A and FIG. 20B, an R field may indicate a reserved bit. In an example, the R field may be set to zero.

In an example, a gNB may transmit a second MAC CE (e.g., hibernation MAC CE) indicating activation or hibernation of at least one SCell to a wireless device. In an example, the second MAC CE may be associated with a second LCID different from a first LCID of the first MAC CE (e.g., activation/deactivation MAC CE). In an example, the second MAC CE may have a fixed size. In an example, the second MAC CE may consist of a single octet containing seven C-fields and one R-field. FIG. 21A shows an example of the second MAC CE with a single octet. In another example, the second MAC CE may consist of four octets containing 31 C-fields and one R-field. FIG. 21B shows an example of the second MAC CE with four octets. In an example, the second MAC CE with four octets may be associated with a third LCID different from the second LCID for the second MAC CE with a single octet, and/or the first LCID for activation/deactivation MAC CE. In an example, when there is no SCell with a serving cell index greater than 7, the second MAC CE of one octet may be applied, otherwise the second MAC CE of four octets may be applied.

In an example, when the second MAC CE is received, and the first MAC CE is not received, $C_i$ may indicate a dormant/activated status of an SCell with SCell index i if there is an SCell configured with SCell index i, otherwise the MAC entity may ignore the C field. In an example, when $C_i$ is set to "1", the wireless device may transition an SCell associated with SCell index i into a dormant state. In an example, when $C_i$ is set to "0", the wireless device may activate an SCell associated with SCell index i. In an example, when C is set to "0" and the SCell with SCell index i is in a dormant state, the wireless device may activate the SCell with SCell index i. In an example, when C is set to "0" and the SCell with SCell index i is not in a dormant state, the wireless device may ignore the $C_i$ field.

In an example, when both the first MAC CE (activation/deactivation MAC CE) and the second MAC CE (hibernation MAC CE) are received, two $C_i$ fields of the two MAC CEs may indicate possible state transitions of the SCell with SCell index i if there is an SCell configured with SCell index i, otherwise the MAC entity may ignore the $C_i$ fields. In an example, the $C_i$ fields of the two MAC CEs may be interpreted according to FIG. 21C.

When configured with one or more SCells, a gNB may activate, hibernate, or deactivate at least one of the one or more SCells. In an example, a MAC entity of a gNB and/or a wireless device may maintain an SCell deactivation timer (e.g., sCellDeactivationTimer) per configured SCell (except the SCell configured with PUCCH/SPUCCH, if any) and deactivate the associated SCell upon its expiry.

In an example, a MAC entity of a gNB and/or a wireless device may maintain an SCell hibernation timer (e.g., sCell-HibernationTimer) per configured SCell (except the SCell configured with PUCCH/SPUCCH, if any) and hibernate the associated SCell upon the SCell hibernation timer expiry if the SCell is in active state. In an example, when both the SCell deactivation timer and the SCell hibernation timer are configured, the SCell hibernation timer may take priority over the SCell deactivation timer. In an example, when both the SCell deactivation timer and the SCell hibernation timer are configured, a gNB and/or a wireless device may ignore the SCell deactivation timer regardless of the SCell deactivation timer expiry.

In an example, a MAC entity of a gNB and/or a wireless device may maintain a dormant SCell deactivation timer (e.g., dormantSCellDeactivationTimer) per configured SCell (except the SCell configured with PUCCH/SPUCCH, if any), and deactivate the associated SCell upon the dormant SCell deactivation timer expiry if the SCell is in dormant state.

In an example, when a MAC entity of a wireless device is configured with an activated SCell upon SCell configuration, the MAC entity may activate the SCell. In an example, when a MAC entity of a wireless device receives a MAC CE(s) activating an SCell, the MAC entity may activate the SCell. In an example, the MAC entity may start or restart the SCell deactivation timer associated with the SCell in response to activating the SCell. In an example, the MAC entity may start or restart the SCell hibernation timer (if configured) associated with the SCell in response to activating the SCell. In an example, the MAC entity may trigger PHR procedure in response to activating the SCell.

In an example, when a MAC entity of a wireless device receives a MAC CE(s) indicating deactivating an SCell, the MAC entity may deactivate the SCell. In an example, in response to receiving the MAC CE(s), the MAC entity may: deactivate the SCell; stop an SCell deactivation timer associated with the SCell; and/or flush all HARQ buffers associated with the SCell.

In an example, when an SCell deactivation timer associated with an activated SCell expires and an SCell hibernation timer is not configured, the MAC entity may: deactivate the SCell; stop the SCell deactivation timer associated with the SCell; and/or flush all HARQ buffers associated with the SCell.

In an example, when a first PDCCH on an activated SCell indicates an uplink grant or downlink assignment, or a second PDCCH on a serving cell scheduling an activated SCell indicates an uplink grant or a downlink assignment for the activated SCell, or a MAC PDU is transmitted in a configured uplink grant or received in a configured downlink assignment, the MAC entity may: restart the SCell deactivation timer associated with the SCell; and/or restart the SCell hibernation timer associated with the SCell if configured. In an example, when an SCell is deactivated, an ongoing random access procedure on the SCell may be aborted.

In an example, when a MAC entity is configured with an SCell associated with an SCell state set to dormant state upon the SCell configuration, or when the MAC entity receives MAC CE(s) indicating transitioning the SCell into a dormant state, the MAC entity may: transition the SCell into a dormant state; transmit one or more CSI reports for the SCell; stop an SCell deactivation timer associated with the SCell; stop an SCell hibernation timer associated with the SCell if configured; start or restart a dormant SCell deactivation timer associated with the SCell; and/or flush all HARQ buffers associated with the SCell. In an example, when the SCell hibernation timer associated with the activated SCell expires, the MAC entity may: hibernate the SCell; stop the SCell deactivation timer associated with the SCell; stop the SCell hibernation timer associated with the SCell; and/or flush all HARQ buffers associated with the SCell. In an example, when a dormant SCell deactivation timer associated with a dormant SCell expires, the MAC entity may: deactivate the SCell; and/or stop the dormant SCell deactivation timer associated with the SCell. In an example, when an SCell is in dormant state, ongoing random access procedure on the SCell may be aborted.

FIG. 22 shows DCI formats for an example of 20 MHz FDD operation with 2 Tx antennas at the base station and no carrier aggregation in an LTE system. In a NR system, the DCI formats may comprise at least one of: DCI format 0_0/0_1 indicating scheduling of PUSCH in a cell; DCI format 1_0/1_1 indicating scheduling of PDSCH in a cell; DCI format 2_0 notifying a group of UEs of slot format; DCI format 2_1 notifying a group of UEs of PRB(s) and OFDM symbol(s) where a UE may assume no transmission is intended for the UE; DCI format 2_2 indicating transmission of TPC commands for PUCCH and PUSCH; and/or DCI format 2_3 indicating transmission of a group of TPC commands for SRS transmission by one or more UEs. In an example, a gNB may transmit a DCI via a PDCCH for scheduling decision and power-control commends. More specifically, the DCI may comprise at least one of: downlink scheduling assignments, uplink scheduling grants, power-control commands. The downlink scheduling assignments may comprise at least one of: PDSCH resource indication, transport format, HARQ information, and control information related to multiple antenna schemes, a command for power control of the PUCCH used for transmission of ACK/NACK in response to downlink scheduling assignments. The uplink scheduling grants may comprise at least one of: PUSCH resource indication, transport format, and HARQ related information, a power control command of the PUSCH.

In an example, the different types of control information correspond to different DCI message sizes. For example, supporting spatial multiplexing with noncontiguous allocation of RBs in the frequency domain may require a larger scheduling message in comparison with an uplink grant allowing for frequency-contiguous allocation only. The DCI may be categorized into different DCI formats, where a format corresponds to a certain message size and usage.

In an example, a UE may monitor one or more PDCCH candidates to detect one or more DCI with one or more DCI format. The one or more PDCCH may be transmitted in common search space or UE-specific search space. A UE may monitor PDCCH with only a limited set of DCI format, to save power consumption. For example, a normal UE may not be required to detect a DCI with DCI format 6 which is used for an eMTC UE. The more DCI format to be detected, the more power be consumed at the UE.

In an example, the one or more PDCCH candidates that a UE monitors may be defined in terms of PDCCH UE-specific search spaces. A PDCCH UE-specific search space at CCE aggregation level $L \in \{1, 2, 4, 8\}$ may be defined by a set of PDCCH candidates for CCE aggregation level L. In an example, for a DCI format, a UE may be configured per serving cell by one or more higher layer parameters a number of PDCCH candidates per CCE aggregation level L.

In an example, in non-DRX mode operation, a UE may monitor one or more PDCCH candidate in control resource set q according to a periodicity of $W_{PDCCH, q}$ symbols that may be configured by one or more higher layer parameters for control resource set q.

In an example, the information in the DCI formats used for downlink scheduling may be organized into different groups, with the field present varying between the DCI formats, including at least one of: resource information, consisting of: carrier indicator (0 or 3 bits), RB allocation; HARQ process number; MCS, NDI, and RV (for the first TB); MCS, NDI and RV (for the second TB); MIMO related information; PDSCH resource-element mapping and QCI; Downlink assignment index (DAI); TPC for PUCCH; SRS request (1 bit), triggering one-shot SRS transmission; ACK/NACK offset; DCI format 0/1A indication, used to differentiate between DCI format 1A and 0; and padding if necessary. The MIMO related information may comprise at least one of: PMI, precoding information, transport block swap flag, power offset between PDSCH and reference signal, reference-signal scrambling sequence, number of layers, and/or antenna ports for the transmission.

In an example, the information in the DCI formats used for uplink scheduling may be organized into different groups, with the field present varying between the DCI formats, including at least one of: resource information, consisting of: carrier indicator, resource allocation type, RB allocation; MCS, NDI (for the first TB); MCS, NDI (for the second TB); phase rotation of the uplink DMRS; precoding information; CSI request, requesting an aperiodic CSI report; SRS request (2 bit), used to trigger aperiodic SRS transmission using one of up to three preconfigured settings; uplink index/DAI; TPC for PUSCH; DCI format 0/1A indication; and padding if necessary.

In an example, a gNB may perform cyclic redundancy check (CRC) scrambling for a DCI, before transmitting the DCI via a PDCCH. The gNB may perform CRC scrambling by bit-wise addition (or Modulo-2 addition or exclusive OR (XOR) operation) of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, SRS-TPC-RNTI, INT-RNTI, SFI-RNTI, P-RNTI, SI-RNTI, RA-RNTI, and/or MCS-C-RNTI) with the CRC bits of the DCI. The wireless device may check the CRC bits of the DCI, when detecting the DCI. The wireless device may receive the DCI when the CRC is scrambled by a sequence of bits that is the same as the at least one wireless device identifier.

In a NR system, in order to support wide bandwidth operation, a gNB may transmit one or more PDCCH in different control resource sets. A gNB may transmit one or more RRC message comprising configuration parameters of one or more control resource sets. At least one of the one or more control resource sets may comprise at least one of: a first OFDM symbol; a number of consecutive OFDM symbols; a set of resource blocks; a CCE-to-REG mapping; and a REG bundle size, in case of interleaved CCE-to-REG mapping.

A base station (gNB) may configure a wireless device (UE) with uplink (UL) bandwidth parts (BWPs) and downlink (DL) BWPs to enable bandwidth adaptation (BA) on a PCell. If carrier aggregation is configured, the gNB may further configure the UE with at least DL BWP(s) (i.e., there may be no UL BWPs in the UL) to enable BA on an SCell. For the PCell, an initial active BWP may be a first BWP used for initial access. For the SCell, a first active BWP may be a second BWP configured for the UE to operate on the SCell upon the SCell being activated.

In paired spectrum (e.g. FDD), a gNB and/or a UE may independently switch a DL BWP and an UL BWP. In unpaired spectrum (e.g. TDD), a gNB and/or a UE may simultaneously switch a DL BWP and an UL BWP.

In an example, a gNB and/or a UE may switch a BWP between configured BWPs by means of a DCI or a BWP inactivity timer. When the BWP inactivity timer is configured for a serving cell, the gNB and/or the UE may switch an active BWP to a default BWP in response to an expiry of the BWP inactivity timer associated with the serving cell. The default BWP may be configured by the network.

In an example, for FDD systems, when configured with BA, one UL BWP for each uplink carrier and one DL BWP may be active at a time in an active serving cell. In an example, for TDD systems, one DL/UL BWP pair may be active at a time in an active serving cell. Operating on the one UL BWP and the one DL BWP (or the one DL/UL pair) may improve UE battery consumption. BWPs other than the one active UL BWP and the one active DL BWP that the UE may work on may be deactivated. On deactivated BWPs, the UE may: not monitor PDCCH; and/or not transmit on PUCCH, PRACH, and UL-SCH.

In an example, a serving cell may be configured with at most a first number (e.g., four) of BWPs. In an example, for an activated serving cell, there may be one active BWP at any point in time.

In an example, a BWP switching for a serving cell may be used to activate an inactive BWP and deactivate an active BWP at a time. In an example, the BWP switching may be controlled by a PDCCH indicating a downlink assignment or an uplink grant. In an example, the BWP switching may be controlled by a BWP inactivity timer (e.g., bwp-Inactivity-Timer). In an example, the BWP switching may be controlled by a MAC entity in response to initiating a Random Access procedure. Upon addition of an SpCell or activation of an SCell, one BWP may be initially active without receiving a PDCCH indicating a downlink assignment or an uplink grant. The active BWP for a serving cell may be indicated by RRC and/or PDCCH. In an example, for unpaired spectrum, a DL BWP may be paired with a UL BWP, and BWP switching may be common for both UL and DL.

Figure 23:
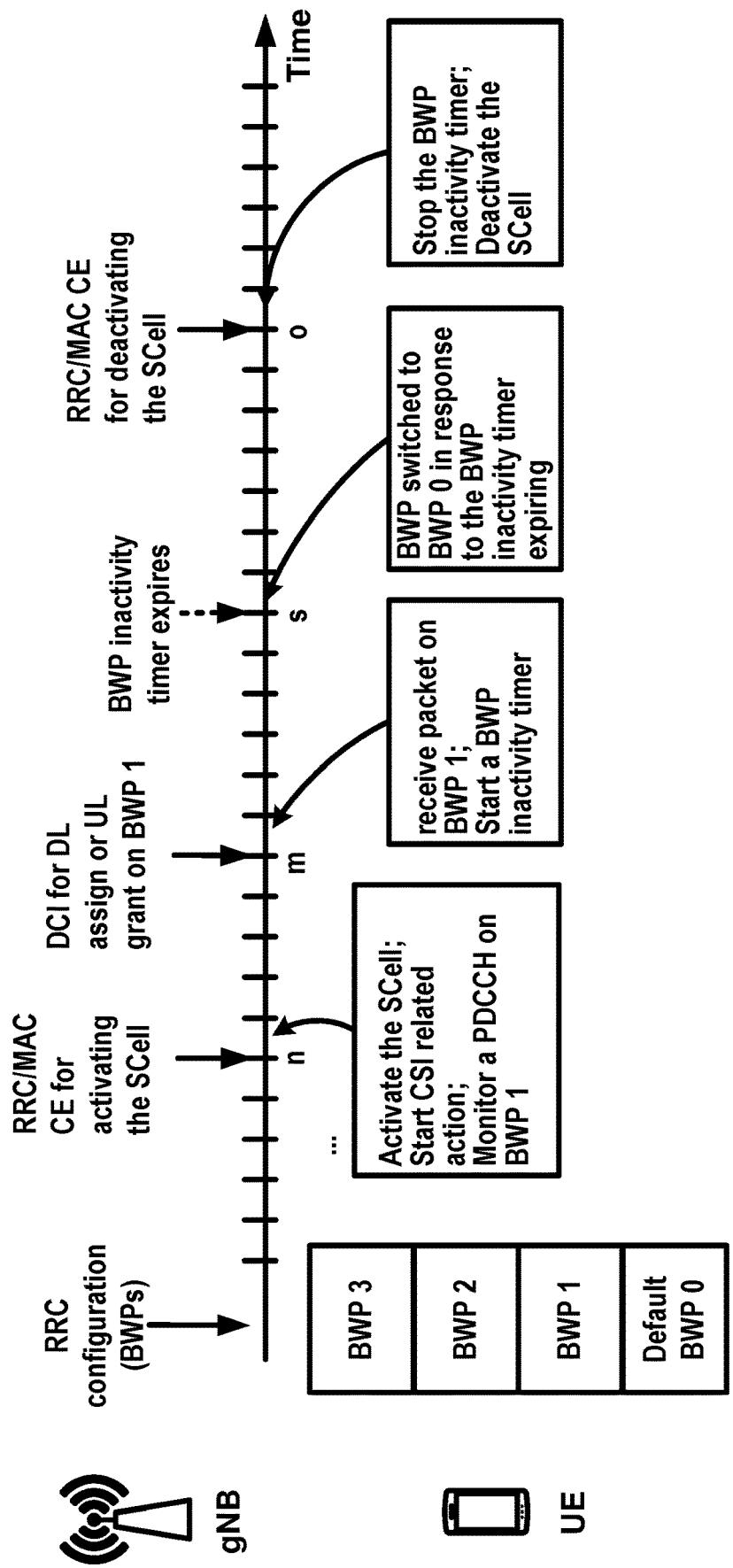
FIG. 23 is an example of BWP management on an SCell as per an aspect of an embodiment of the present disclosure.

FIG. 23 shows an example of BWP switching on an SCell. In an example, a UE may receive RRC message comprising parameters of a SCell and one or more BWP configuration associated with the SCell. The RRC message may comprise: RRC connection reconfiguration message (e.g., RRCReconfiguration); RRC connection reestablishment message (e.g., RRCRestablishment); and/or RRC connection setup message (e.g., RRCSetup). Among the one or more BWPs, at least one BWP may be configured as the first active BWP (e.g., BWP 1 in FIG. 23), one BWP as the default BWP (e.g., BWP 0 in FIG. 23). The UE may receive a MAC CE to activate the SCell at $n^{th}$ slot. The UE may start a SCell deactivation timer (e.g., sCellDeactivationTimer), and start CSI related actions for the SCell, and/or start CSI related actions for the first active BWP of the SCell. The UE may start monitoring a PDCCH on BWP 1 in response to activating the SCell.

In an example, the UE may start restart a BWP inactivity timer (e.g., bwp-InactivityTimer) at $m^{th}$ slot in response to receiving a DCI indicating DL assignment on BWP 1. The UE may switch back to the default BWP (e.g., BWP 0) as an active BWP when the BWP inactivity timer expires, at $s^{th}$ slot. The UE may deactivate the SCell and/or stop the BWP inactivity timer when the sCellDeactivationTimer expires.

Employing the BWP inactivity timer may further reduce UE's power consumption when the UE is configured with multiple cells with each cell having wide bandwidth (e.g., 1 GHz). The UE may only transmit on or receive from a narrow-bandwidth BWP (e.g., 5 MHz) on the PCell or SCell when there is no activity on an active BWP.

In an example, a MAC entity may apply normal operations on an active BWP for an activated serving cell configured with a BWP comprising: transmitting on UL-SCH; transmitting on RACH; monitoring a PDCCH; transmitting PUCCH; receiving DL-SCH; and/or (re-) initializing any suspended configured uplink grants of configured grant Type 1 according to a stored configuration, if any.

In an example, on an inactive BWP for each activated serving cell configured with a BWP, a MAC entity may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

In an example, if a MAC entity receives a PDCCH for a BWP switching of a serving cell while a Random Access procedure associated with this serving cell is not ongoing, a UE may perform the BWP switching to a BWP indicated by the PDCCH.

In an example, if a bandwidth part indicator field is configured in DCI format 1_1, the bandwidth part indicator field value may indicate the active DL BWP, from the configured DL BWP set, for DL receptions. In an example, if a bandwidth part indicator field is configured in DCI format 0_1, the bandwidth part indicator field value may indicate the active UL BWP, from the configured UL BWP set, for UL transmissions.

In an example, for a primary cell, a UE may be provided by a higher layer parameter Default-DL-BWP a default DL BWP among the configured DL BWPs. If a UE is not provided a default DL BWP by the higher layer parameter Default-DL-BWP, the default DL BWP is the initial active DL BWP.

In an example, a UE may be provided by higher layer parameter bwp-InactivityTimer, a timer value for the primary cell. If configured, the UE may increment the timer, if running, every interval of 1 millisecond for frequency range 1 or every 0.5 milliseconds for frequency range 2 if the UE may not detect a DCI format 1_1 for paired spectrum operation or if the UE may not detect a DCI format 1_1 or DCI format 0_1 for unpaired spectrum operation during the interval.

In an example, if a UE is configured for a secondary cell with higher layer parameter Default-DL-BWP indicating a default DL BWP among the configured DL BWPs and the UE is configured with higher layer parameter bwp-InactivityTimer indicating a timer value, the UE procedures on the secondary cell may be same as on the primary cell using the timer value for the secondary cell and the default DL BWP for the secondary cell.

In an example, if a UE is configured by higher layer parameter Active-BWP-DL-SCell a first active DL BWP and by higher layer parameter Active-BWP-UL-SCell a first active UL BWP on a secondary cell or carrier, the UE may use the indicated DL BWP and the indicated UL BWP on the secondary cell as the respective first active DL BWP and first active UL BWP on the secondary cell or carrier.

In an example, a wireless device may transmit one or more uplink control information (UCI) via one or more PUCCH resources to a base station. The one or more UCI may comprise at least one of: HARQ-ACK information; scheduling request (SR); and/or CSI report. In an example, a PUCCH resource may be identified by at least: frequency location (e.g., starting PRB); and/or a PUCCH format associated with initial cyclic shift of a base sequence and time domain location (e.g., starting symbol index). In an example, a PUCCH format may be PUCCH format 0, PUCCH format 1, PUCCH format 2, PUCCH format 3, or PUCCH format 4. A PUCCH format 0 may have a length of 1 or 2 OFDM symbols and be less than or equal to 2 bits. A PUCCH format 1 may occupy a number between 4 and 14 of OFDM symbols and be less than or equal to 2 bits. A PUCCH format 2 may occupy 1 or 2 OFDM symbols and be greater than 2 bits. A PUCCH format 3 may occupy a number between 4 and 14 of OFDM symbols and be greater than 2 bits. A PUCCH format 4 may occupy a number between 4 and 14 of OFDM symbols and be greater than 2 bits. The PUCCH resource may be configured on a PCell, or a PUCCH secondary cell.

In an example, when configured with multiple uplink BWPs, a base station may transmit to a wireless device, one or more RRC messages comprising configuration parameters of one or more PUCCH resource sets (e.g., at most 4 sets) on an uplink BWP of the multiple uplink BWPs. Each PUCCH resource set may be configured with a PUCCH resource set index, a list of PUCCH resources with each PUCCH resource being identified by a PUCCH resource identifier (e.g., pucch-Resourceid), and/or a maximum number of UCI information bits a wireless device may transmit using one of the plurality of PUCCH resources in the PUCCH resource set.

In an example, when configured with one or more PUCCH resource sets, a wireless device may select one of the one or more PUCCH resource sets based on a total bit length of UCI information bits (e.g., HARQ-ARQ bits, SR, and/or CSI) the wireless device will transmit. In an example, when the total bit length of UCI information bits is less than or equal to 2, the wireless device may select a first PUCCH resource set with the PUCCH resource set index equal to "0". In an example, when the total bit length of UCI information bits is greater than 2 and less than or equal to a first configured value, the wireless device may select a second PUCCH resource set with the PUCCH resource set index equal to "1". In an example, when the total bit length of UCI information bits is greater than the first configured value and less than or equal to a second configured value, the wireless device may select a third PUCCH resource set with the PUCCH resource set index equal to "2". In an example, when the total bit length of UCI information bits is greater than the second configured value and less than or equal to a third value (e.g., 1706), the wireless device may select a fourth PUCCH resource set with the PUCCH resource set index equal to "3".

In an example, a wireless device may determine, based on a number of uplink symbols of UCI transmission and a number of UCI bits, a PUCCH format from a plurality of PUCCH formats comprising PUCCH format 0, PUCCH format 1, PUCCH format 2, PUCCH format 3 and/or PUCCH format 4. In an example, the wireless device may transmit UCI in a PUCCH using PUCCH format 0 if the transmission is over 1 symbol or 2 symbols and the number of HARQ-ACK information bits with positive or negative SR (HARQ-ACK/SR bits) is 1 or 2. In an example, the wireless device may transmit UCI in a PUCCH using PUCCH format 1 if the transmission is over 4 or more symbols and the number of HARQ-ACK/SR bits is 1 or 2. In an example, the wireless device may transmit UCI in a PUCCH using PUCCH format 2 if the transmission is over 1 symbol or 2 symbols and the number of UCI bits is more than 2. In an example, the wireless device may transmit UCI in a PUCCH using PUCCH format 3 if the transmission is over 4 or more symbols, the number of UCI bits is more than 2 and PUCCH resource does not include an orthogonal cover code. In an example, the wireless device may transmit UCI in a PUCCH using PUCCH format 4 if the transmission is over 4 or more symbols, the number of UCI bits is more than 2 and the PUCCH resource includes an orthogonal cover code.

In an example, in order to transmit HARQ-ACK information on a PUCCH resource, a wireless device may determine the PUCCH resource from a PUCCH resource set. The PUCCH resource set may be determined as mentioned above. The wireless device may determine the PUCCH resource based on a PUCCH resource indicator field in a DCI (e.g., with a DCI format 1_0 or DCI for 1_1) received on a PDCCH. A 3-bit PUCCH resource indicator field in the DCI may indicate one of eight PUCCH resources in the PUCCH resource set. The wireless device may transmit the HARQ-ACK information in a PUCCH resource indicated by the 3-bit PUCCH resource indicator field in the DCI.

In an example, the wireless device may transmit one or more UCI bits via a PUCCH resource of an active uplink BWP of a PCell or a PUCCH secondary cell. Since at most one active uplink BWP in a cell is supported for a wireless device, the PUCCH resource indicated in the DCI is naturally a PUCCH resource on the active uplink BWP of the cell.

In an example, a base station may transmit a downlink signal/channel to a wireless device with multiple beam technologies. When applying the multiple beam technologies, the base station may indicate to the wireless device a transmission beam on which the wireless device may employ for PUCCH/PUSCH transmission. The wireless device may determine a transmission beam based on the indication. The indication may be transmitted via a DCI (e.g., DCI format 0_1) or an RRC message. The determination of the transmission beam may be referred to as a determination of a spatial domain transmission filter.

Figure 24:
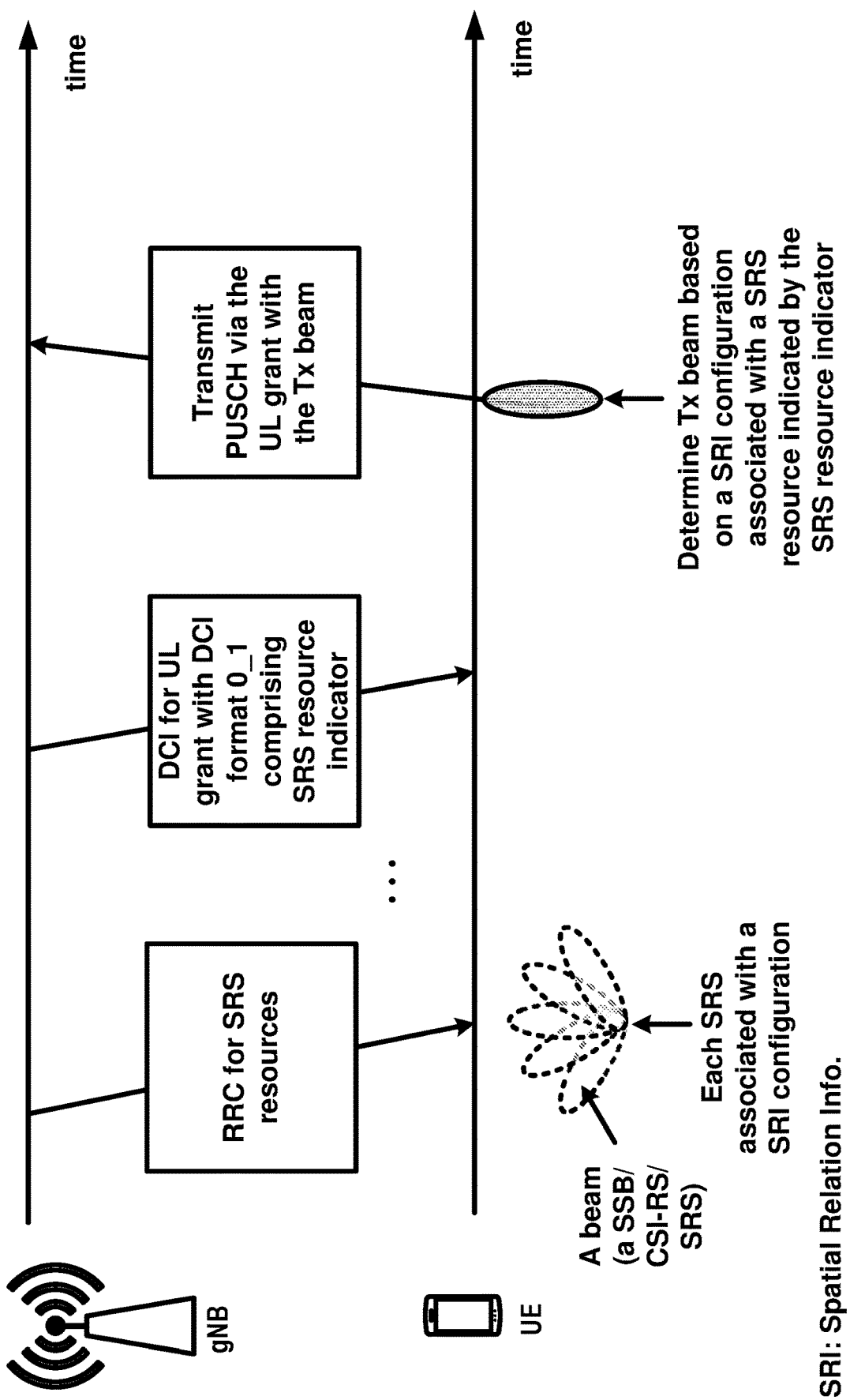
FIG. 24 is an example of transmission beam determination of a PUSCH transmission based on a DCI format 0_1 as per an aspect of an embodiment of the present disclosure.

FIG. 24 is an example of transmission beam determination of a PUSCH transmission based on a DCI format 0_1. In an example, a base station may transmit to a wireless device one or more RRC messages (e.g., ServingCellConfig, SIB1, or CellGroupConfig) comprising configuration parameters of sounding reference signal (SRS) resources. Each SRS resource may be identified with an SRS resource ID. Each SRS resource may be configured with a number of SRS ports, a transmission comb indicator, a resource mapping configuration parameter, one or more frequency location parameters, a resource type (periodic, aperiodic, semi-persistent) indicator; a sequence indicator, and/or a spatial relation information configuration. The spatial relation information configuration may indicate a reference signal resource index of a cell. The reference signal resource index may comprise an SSB index, a CSI-RS index, or an SRS index of an uplink BWP on the cell. The spatial relation information configuration of an SRS may indicate a spatial relation between the SRS and an SSB indicated by an SSB index, if a reference signal resource index of the spatial relation information configuration comprises the SSB index. The spatial relation information configuration of an SRS may indicate a spatial relation between the SRS and a CSI-RS indicated by a CSI-RS index, if a reference signal resource index of the spatial relation information configuration comprises the CSI-RS index. The spatial relation information configuration of a first SRS may indicate a spatial relation between the first SRS and a second SRS indicated by an SRS index, if a reference signal resource index of the spatial relation information configuration comprises the SRS index. In an example, the wireless device may determine a transmission beam based on a spatial relation information configuration of an SRS.

As shown in FIG. 24, the base station may transmit to the wireless device a DCI (with DCI format 0_1) indicating PUSCH resources. A DCI with the DCI format 0_1 may comprise: a carrier indicator; a BWP ID; a frequency resource assignment parameter; a time resource assignment parameter; a frequency hopping flag; an MCS indicator; a new data indicator; a redundancy version value; a HARQ process number; a first downlink assignment index; a second downlink assignment index; a TPC command for PUSCH; a UL/SUL indicator; an SRS resource indicator; a parameter indicating precoding information and number of layers; antenna ports indicator; an SRS request; a CSI request; a CBG transmission information parameter; a PTRS-DMRS association indicator; a beta offset indicator; a DMRS sequence initialization indicator; and/or a UL-SCH indicator. In response to receiving the DCI with DCI format 0_1, the wireless device may transmit an uplink transport block (TB) via the PUSCH resources with a spatial domain transmission filter based on an SRS indicated by the SRS resource indicator. In an example, if a reference signal resource index of the spatial relation information configuration of the SRS comprises an SSB index, the wireless device may transmit the uplink TB with a same spatial domain transmission filter used for reception of an SSB identified by the SSB index. In an example, if the reference signal resource index comprises a CSI-RS index, the wireless device may transmit the uplink TB with a same spatial domain transmission filter used for reception of a CSI-RS identified by the CSI-RS index. In an example, if the reference signal resource index comprises an SRS index, the wireless device may transmit the uplink TB with a same spatial domain transmission filter used for transmission of an SRS identified by the SRS index.

Figure 25:
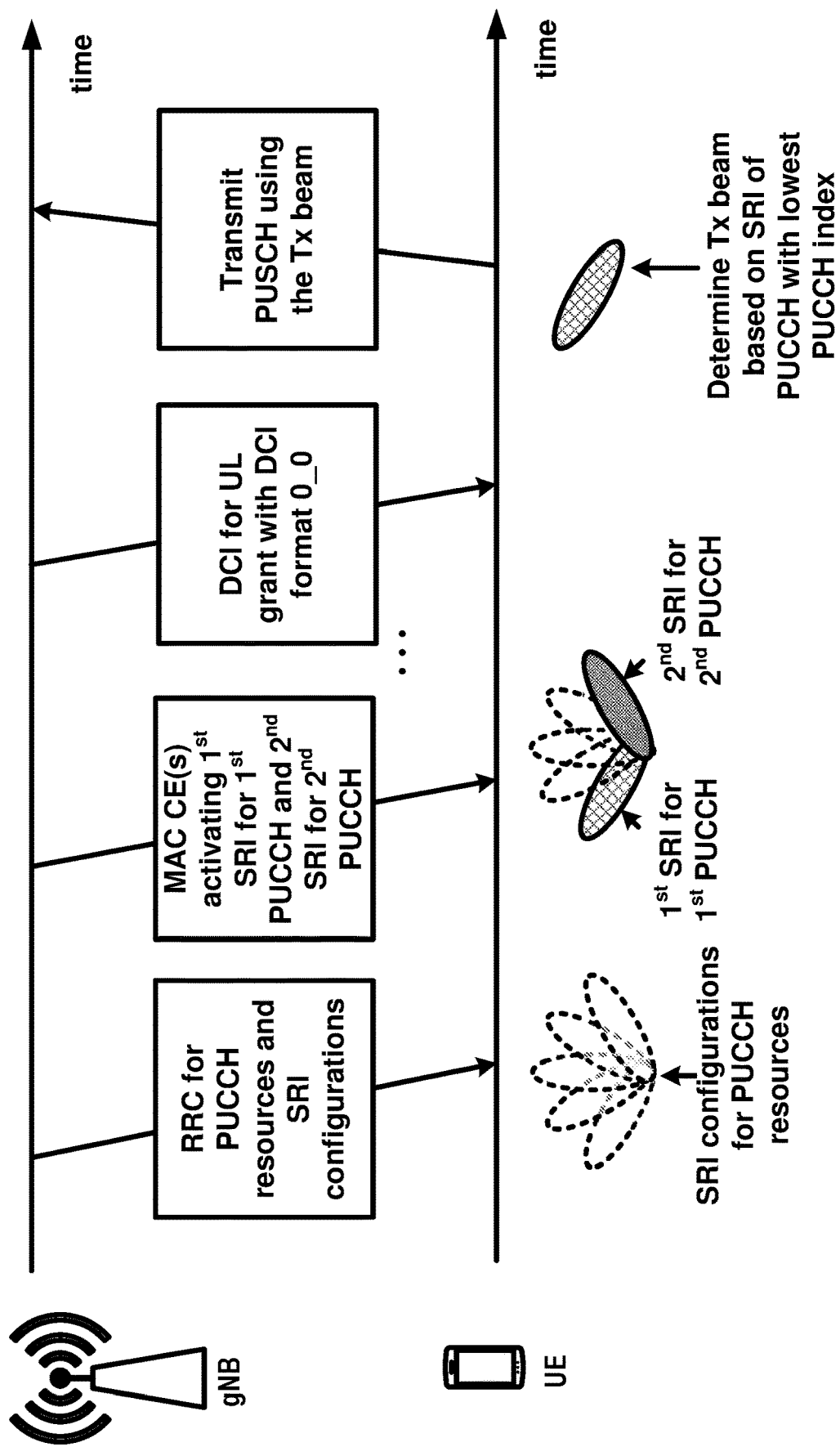
FIG. 25 is an example of transmission beam determination of a PUSCH transmission based on a DCI format 0_0 as per an aspect of an embodiment of the present disclosure.

In an example, a base station may transmit to a wireless device a DCI (e.g., DCI format 0_0) indicating an uplink grant. A DCI with DCI format 0_0 may comprise: a frequency resource assignment parameter; a time resource assignment parameter; a frequency hopping flag; an MCS indicator; a new data indicator; a redundancy version value; a HARQ process number; a TPC command for PUSCH; a UL/SUL indicator; and/or padding bits if necessary. DCI format 0_0 may be a fallback DCI, compared to DCI format 0_1. DCI format 0_0 may have a smaller number of bits than DCI format 0_1. In an example, transmitting DCI format 0_0, rather than DCI format 0_1, may reduce signaling overhead. DCI format 0_0 may not comprise an SRS resource indicator. FIG. 25 is an example of transmission beam determination of a PUSCH transmission based on a DCI format 0_0. In an example, a base station may transmit to a wireless device one or more RRC messages (e.g., PUCCH-Config) comprise configuration parameters of a plurality of PUCCH resources and a plurality of spatial relation information configurations. In an example, each PUCCH resource may be identified by a PUCCH resource index (or ID). Each PUCCH resource may be configured with a starting physical resource block (PRB) location and a PUCCH format (e.g., PUCCH format 0, PUCCH format 1, PUCCH format 2, PUCCH format 3, and/or PUCCH format 4). In an example, each spatial relation information configuration may be identified by a spatial relation information configuration index (or ID). Parameters of each spatial relation information configuration may comprise: a serving cell ID; a reference signal resource index; a PUCCH pathloss reference RS indicator; a P0 value for PUCCH transmission; and/or a close loop power control identifier. The reference signal resource index may comprise: an SSB index, a CSI-RS index or an SRS index. In an example, a spatial relation information configuration of PUCCH may indicate spatial setting of the PUCCH transmission. The spatial relation information configuration of PUCCH may indicate power control parameters.

As shown in FIG. 25, the base station may transmit one or more MAC CEs activating a first spatial relation information configuration (from the plurality of spatial relation information configurations) for a first PUCCH resource (from the plurality of PUCCH resources). The one or more MAC CEs may activate a second spatial relation information configuration (from the plurality of spatial relation information configurations) for a second PUCCH resource (from the plurality of PUCCH resources). The one or more MAC CEs may be identified with a MAC PDU subheader with a LCID value (e.g., "110001" as shown in FIG. 18). In an example, when the wireless device transmits first UCIs via the first PUCCH resource, the wireless device, based on the first spatial relation information configuration (e.g., activated by the one or more MAC CEs), may determine a spatial domain transmission filter for the transmission. In an example, when the wireless device transmits second UCIs via the second PUCCH resource, the wireless device, based on the second spatial relation information configuration (e.g., activated by the one or more MAC CEs), may determine a spatial domain transmission filter for the transmission. In an example, if a reference signal resource index of a spatial relation information configuration activated on a PUCCH (e.g., first PUCCH or second PUCCH) comprises an SSB index, the wireless device may transmit UCIs on the PUCCH with a same spatial domain transmission filter used for reception of an SSB identified by the SSB index. In an example, if the reference signal resource index comprises a CSI-RS index, the wireless device may transmit UCIs on the PUCCH with a same spatial domain transmission filter used for reception of a CSI-RS identified by the CSI-RS index. In an example, if the reference signal resource index comprises an SRS index, the wireless device may transmit the UCIs on the PUCCH with a same spatial domain transmission filter used for transmission of an SRS identified by the SRS index.

As shown in FIG. 25, the base station may transmit to the wireless device a DCI (DCI format 0_0) indicating PUSCH resources. Since the DCI format 0_0 does not have an SRS resource indicator, the wireless device may, based on a spatial domain transmission filter of a transmission of a PUCCH, transmit an uplink TB via the PUSCH resources. In an example, the wireless device may transmit the uplink TB with a same spatial domain transmission filter used for a transmission of UCIs via a PUCCH resource with a lowest PUCCH resource index. In an example, the spatial domain transmission filter used for the transmission of the UCIs via the PUCCH resource may be determined based on a spatial relation information configuration (e.g., activated by a MAC CE) of the PUCCH resource (e.g., as described above). In an example, the PUCCH resource with the lowest PUCCH resource index may be referred to as a default PUCCH resource. In an example, the wireless device may not expect PUSCH scheduled by DCI format 0_0 without configured PUCCH resource with a spatial relation information configuration. In an example, the wireless device may not expect PUSCH scheduled by DCI format 0_0, if a spatial relation information configuration is not activated (e.g., by MAC CE) for a default PUCCH resource. By this embodiment, a base station and a wireless device may align on a transmission beam on which the wireless device transmit an uplink TB via a PUSCH resource, if the PUSCH resource is assigned in a DCI format 0_0. The base station may receive the uplink TB with a receiving beam corresponding to the transmission beam of the wireless device.

Figure 26:
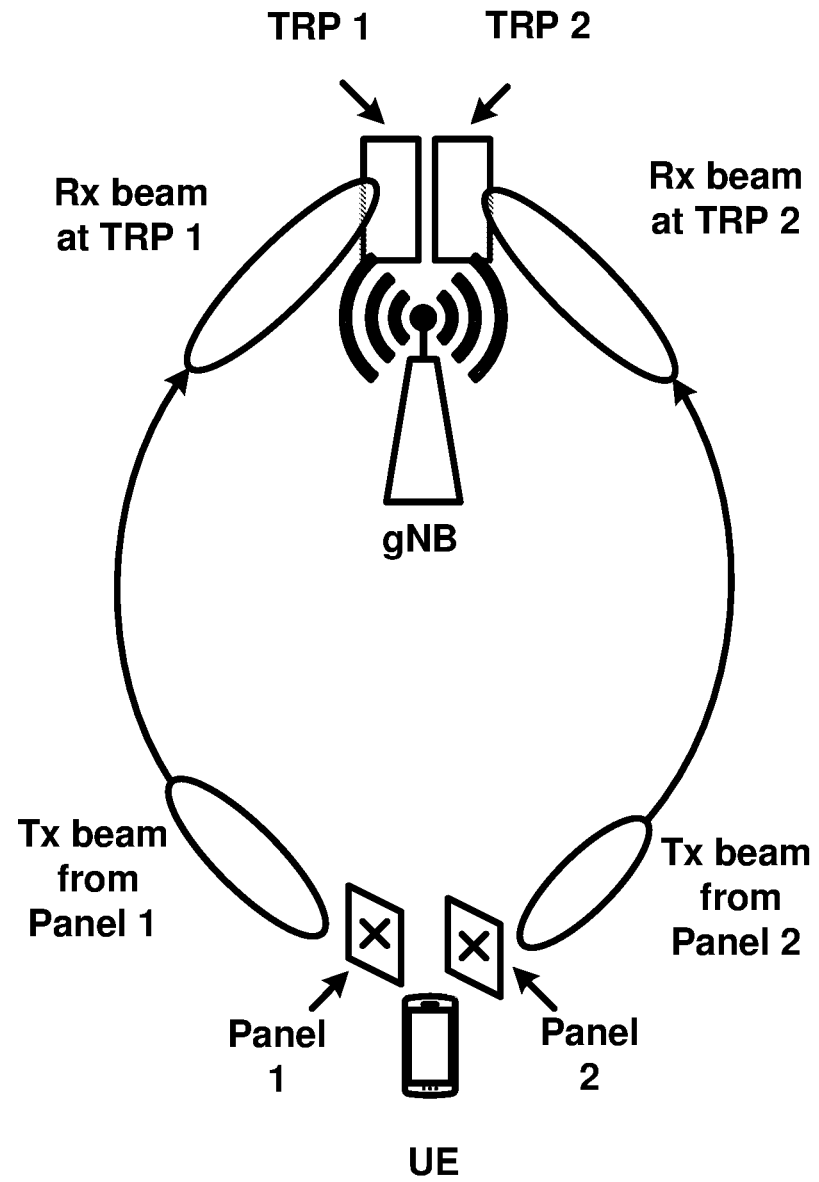
FIG. 26 is an example of transmission and reception with multiple TRPs and multiple panels as per an aspect of an embodiment of the present disclosure.

FIG. 26 shows an example of transmission and reception with multiple TRPs and multiple panels. In an example, a base station may be equipped with more than one TRP (e.g., TRP 1 and TRP 2 in FIG. 26). A wireless device may be equipped with more than one panel (e.g., Panel 1 and Panel 2 in FIG. 26). Transmission and reception with multiple TRPs and multiple panels may improve transmission robustness for a wireless communication in a high frequency (e.g., above 6 GHz).

In an example, a TRP of multiple TRPs of the base station may be identified by at least one of: a TRP identifier (ID), a cell index, or a reference signal index. In an example, a TRP ID of a TRP may comprise a control resource set group (or pool) index (e.g., CORESETPoolIndex) of a control resource set group from which a DCI is transmitted from the base station on a control resource set. In an example, a TRP ID of a TRP may comprise a TRP index indicated in the DCI. In an example, a TRP ID of a TRP may comprise a TCI state group index of a TCI state group. A TCI state group may comprise at least one TCI state with which the wireless device receives the downlink TBs, or with which the base station transmits the downlink TBs.

In an example, a base station may be equipped with multiple TRPs. The base station may transmit to a wireless device one or more RRC messages comprising configuration parameters of a plurality of CORESETs on a cell (or a BWP of the cell). Each of the plurality of CORESETs may be identified with a CORESET index and may be associated with (or configured with) a CORESET pool (or group) index. Each CORESET may be associated with one or more configuration parameters comprising at least one of: a frequency domain resource indicator, a time duration indicator, a resource mapping type indicator, one or more transmission configuration indicator states, and the like. One or more CORESETs, of the plurality of CORESETs, having a same CORESET pool index may indicate that DCIs received on the one or more CORESETs are transmitted from a same TRP of a plurality of TRPs of the base station. The wireless device may determine receiving beams (or spatial domain filters) for PDCCHs/PDSCHs based on a TCI indication (e.g., DCI) and a CORESET pool index associated with a CORESET for the DCI.

In an example, a wireless device, when configured with multiple panels, may determine to activate (or select) one of the multiple panels to receive downlink signals/channels transmitted from one of multiple TRPs of the base station. The activation/selection of one of the multiple panels may be based on receiving downlink signaling indicating the activation/selection or be automatically performed based on measuring downlink channel qualities of one or more reference signals transmitted from the base station.

In an example, the wireless device may apply a spatial domain filter to transmit from a panel of the multiple panels to one of the multiple TRPs of the base station, the panel and the spatial domain filter being determined based on at least one of: an UL TCI indication of a DCI, a panel ID in the DCI, a SRI indication of a DCI, a CORESET pool index of a CORESET for receiving the DCI, and the like.

In an example, when receiving a DCI indicating an uplink grant, the wireless device may determine a panel and a transmission beam (or spatial domain transmission filter) on the panel. The panel may be explicitly indicated by a panel ID comprised in the DCI. The panel may be implicitly indicated by an SRS ID (or an SRS group/pool index), a UL TCI pool index of a UL TCI for uplink transmission, and/or a CORESET pool index of a CORESET for receiving the DCI.

When equipped with multiple panels, a wireless device may transmit a first uplink signal with a first transmission beam (e.g., Tx beam from panel 1 in FIG. 26) on a first panel to the base station. The base station may determine a first TRP to receive the first uplink signal with a first Rx beam (e.g., Rx beam at TRP 1 in FIG. 26). The base station and the wireless device may determine the first Tx beam and the first Rx beam based one or more beam management procedures. Similarly, the wireless device may transmit a second uplink signal with a second transmission beam (e.g., Tx beam from panel 2 in FIG. 26) on a second panel to a base station. The base station may determine a second TRP to receive the second uplink signal with a second Rx beam (e.g., Rx beam at TRP 2 in FIG. 26).

In an example, the base station may transmit a DCI via a first TRP or a second TRP to the wireless device. The DCI may be transmitted with a DCI format 0_1, DCI format 0_0, or a new DCI format (e.g., designed for URLLC transmission). When receiving the DCI with the DCI format 0_1, the wireless device may determine a panel and a transmission beam (or spatial domain transmission filter) on the panel based on an SRS resource indicator in the DCI. A panel may be identified by a panel ID. The panel ID may be indicated by an SRS ID, one or more fields of the DCI, and/or a control resource set (CORESET) ID. However, with receiving the DCI with DCI format 0_0, or when receiving the DCI with DCI format 0_1 without activated spatial relation information configuration of PUCCH transmission, or when receiving a new DCI format without SRS resource indicator, the wireless device may have difficulties in determining a panel and/or a transmission beam (or spatial domain transmission filter) on the panel. For example, by implementing existing technologies, the wireless device may incorrectly determine that a transmission beam of a PUSCH on a first panel is the same as a transmission beam of a default PUCCH, while the default PUCCH is configured on a second panel. Transmitting a PUSCH on a first panel with a transmission beam incorrectly determined based on a second panel may result in transmission failure, reducing uplink spectrum efficiency, increasing uplink interference, and/or increasing power consumption of the wireless device. There is a need to improve existing transmission beam determination when configured with multiple TRPs/panels. Example embodiments may improve the existing transmission beam determination for a PUSCH when configured with multiple TRPs/panels. Example embodiments may improve transmission robustness, increase uplink spectrum efficiency, reduce uplink interference, and/or reduce power consumption of the wireless device.

Figure 27:
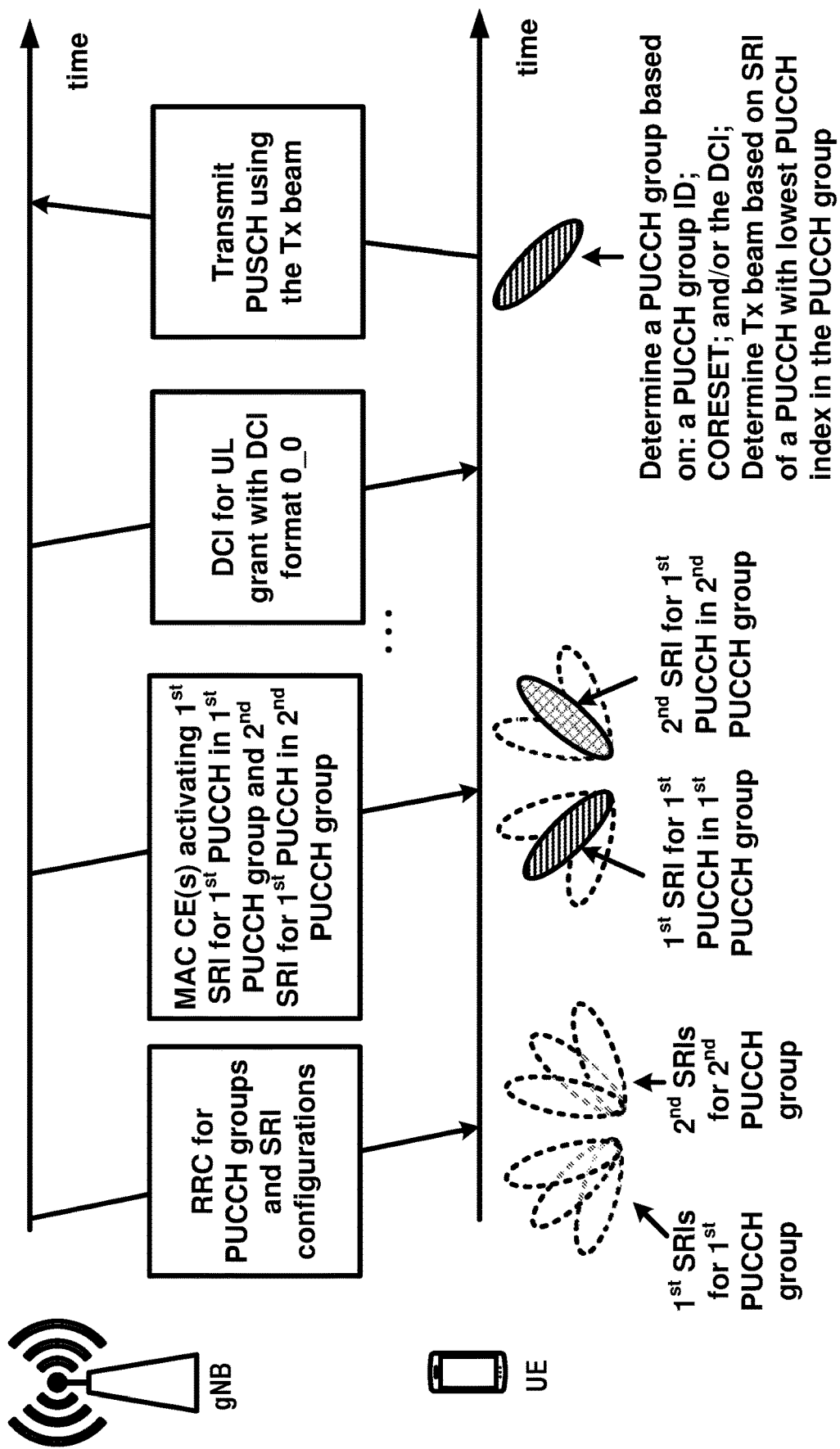
FIG. 27 is an example of transmission beam determination of PUSCH transmission as per an aspect of an embodiment of the present disclosure.

FIG. 27 is an example of transmission beam determination of PUSCH transmission as per an aspect of an embodiment of the present disclosure. In an example, a base station (e.g., gNB in FIG. 27) may transmit to a wireless device (e.g., UE in FIG. 27) one or more RRC messages comprising configuration parameters of PUCCH resource groups (e.g., $1^{st}$ PUCCH group and $2^{nd}$ PUCCH group in FIG. 27) and spatial relation information configurations. In an example, each PUCCH resource group may be associated with a panel of a plurality of panels. A panel may be associated with at least one of: a panel ID, a CORESET ID (or a CORESET pool index), an SRI ID (or an SRI group ID), and/or a TCI index (or a TCI group index).

In an example, a PUCCH resource group may be identified by a group ID. The group ID may indicate a panel of a plurality of panels. A PUCCH resource group may comprise a plurality of PUCCH resources. A PUCCH resource of the plurality of PUCCH resources may be identified by a PUCCH resource index (or ID). Each PUCCH resource may be configured with a starting physical resource block (PRB) location and a PUCCH format (e.g., PUCCH format 0, PUCCH format 1, PUCCH format 2, PUCCH format 3, and/or PUCCH format 4). In an example, in each PUCCH resource group of the PUCCH resource groups, a PUCCH resource with a lowest PUCCH resource index may be referred to as a default PUCCH resource in the each PUCCH resource group. In an example, the spatial relation information configurations may comprise a plurality of spatial relation information configurations for spatial setting of PUCCH transmission. In an example, the plurality of spatial relation information configurations may be grouped in a plurality of spatial relation information configurations groups, each spatial relation information configuration group being associated with a PUCCH resource group, or a panel. For example, as shown in FIG. 27, a first spatial relation information configuration group (e.g., $1^{st}$ SRIs in FIG. 27) may be associated with a first PUCCH resource group (e.g., $1^{st}$ PUCCH group in FIG. 27). A second spatial relation information configuration group (e.g., $2^{nd}$ SRIs in FIG. 27) may be associated with a second PUCCH resource group (e.g., $2^{nd}$ PUCCH group in FIG. 27). Each spatial relation information configuration group may comprise a list of spatial relation information configurations. Each spatial relation information configuration may be identified by a spatial relation information configuration index (or ID). Parameters of each spatial relation information configuration may comprise a serving cell ID; a reference resource signal index; a PUCCH pathloss reference RS indicator; a P0 value for PUCCH transmission; and/or a close loop power control identifier. The reference resource signal index may comprise: an SSB index, a CSI-RS index or an SRS index of an uplink BWP. In an example, a spatial relation information configuration of PUCCH may indicate spatial setting of the PUCCH transmission. The spatial relation information configuration of PUCCH may indicate power control parameters.

As shown in FIG. 27, the base station may transmit to the wireless device one or more MAC CEs activating a first spatial relation information configuration (e.g., $1^{st}$ SRI in FIG. 27) for a first PUCCH resource (e.g., $1^{st}$ PUCCH in FIG. 27) in a first PUCCH resource group (e.g., $1^{st}$ PUCCH group in FIG. 27) and a second spatial relation information configuration (e.g., $2^{nd}$ SRI in FIG. 27) for a first PUCCH resource (e.g., $1^{st}$ PUCCH in FIG. 27) in a second PUCCH resource group (e.g., $2^{nd}$ PUCCH group in FIG. 27). In an example, the first PUCCH resource of the first PUCCH resource group may be a PUCCH resource with a lowest PUCCH resource index (e.g., a default PUCCH resource) in the first PUCCH resource group. In an example, the first PUCCH resource of the second PUCCH resource group may be a PUCCH resource with a lowest PUCCH resource index (e.g., a default PUCCH resource) in the second PUCCH resource group. In an example, the first spatial relation information configuration may be from the first spatial relation information configuration group. In an example, the second spatial relation information configuration may be from the second spatial relation information configuration group. In an example, the base station may transmit one or more second MAC CE(s) activating second spatial relation information configuration(s) for second PUCCH resource(s) in the first PUCCH resource group and third spatial relation information configuration(s) for second PUCCH resource(s) in the second PUCCH resource group.

In an example, when the wireless device transmits a UCI via a panel, the wireless device may determine a PUCCH resource group associated with the panel. After or in response to determining the PUCCH resource group, the wireless device may determine a PUCCH resource from the PUCCH resource group. The wireless device may determine the PUCCH resource based on a payload size of the UCI. The wireless device, based on a spatial relation information configuration (e.g., activated by one or more MAC CEs) of the PUCCH resource, may determine a spatial domain transmission filter for the transmission of the UCI. In an example, if a reference signal resource index of a spatial relation information configuration activated on the PUCCH resource comprises an SSB index, the wireless device may transmit the UCI on the PUCCH resource with a same spatial domain transmission filter used for reception of an SSB identified by the SSB index. In an example, if the reference signal resource index comprises a CSI-RS index, the wireless device may transmit the UCI on the PUCCH resource with a same spatial domain transmission filter used for reception of a CSI-RS identified by the CSI-RS index. In an example, if the reference signal resource index comprises an SRS index, the wireless device may transmit the UCI on the PUCCH resource with a same spatial domain transmission filter used for transmission of an SRS identified by the SRS index.

As shown in FIG. 27, the base station may transmit to the wireless device a DCI with DCI format 0_0 indicating uplink grant of a PUSCH, or the DCI with DCI format 0_1 and spatial relation information configuration not activated for PUCCH transmission, or the DCI with a new DCI format not comprising an SRS resource indicator. The DCI with DCI format 0_0 may not comprise an SRS resource indicator. In response to receiving the DCI, the wireless device may determine a PUCCH resource group from the PUCCH resource groups based on at least one of: a PUCCH resource group ID; a CORESET; a current active panel; and/or one or more parameters of the DCI. In an example, if the DCI indicates the uplink grant of the PUSCH on a panel of multiple panels, the wireless device may determine the PUCCH resource group based on the PUCCH resource group ID being associated with the panel. In an example, if the wireless device receives the DCI via a PDCCH in a CORESET, the wireless device may determine the PUCCH resource group based on the PUCCH resource group being associated with the CORESET. In an example, if a current active panel is a first panel, the wireless device may determine the PUCCH resource group based on the PUCCH resource group being associated with the first panel. In an example, if the wireless devices the DCI comprising one or more parameters indicating a panel, the wireless device may determine the PUCCH resource group based on the PUCCH resource group being associated with the panel.

In an example, after or in response to determining a PUCCH resource group based on a PUCCH resource group ID; a CORESET; a current active panel; and/or one or more parameters of the DCI, the wireless device may transmit uplink TB via a PUSCH with a same spatial domain transmission filter used for transmission on a PUCCH with a lowest PUCCH resource index in the PUCCH resource group.

By implementing one or more example embodiments, when configured with multiple TRPs/panels, a base station and a wireless device may align on a transmission beam on which the wireless device transmit an uplink TB via a PUSCH resource, if the PUSCH resource is scheduled in a DCI, where the DCI does not comprise an SRS resource indicator, e.g., DCI format 0_0. The base station may receive the uplink TB with a receiving beam corresponding to the transmission beam of the wireless device. Example embodiments may improve the existing transmission beam determination for a PUSCH transmission when configured with multiple TRPs/panels. Example embodiments may improve transmission robustness, increase uplink spectrum efficiency, reduce uplink interference, and/or reduce power consumption of the wireless device.

Figure 28:
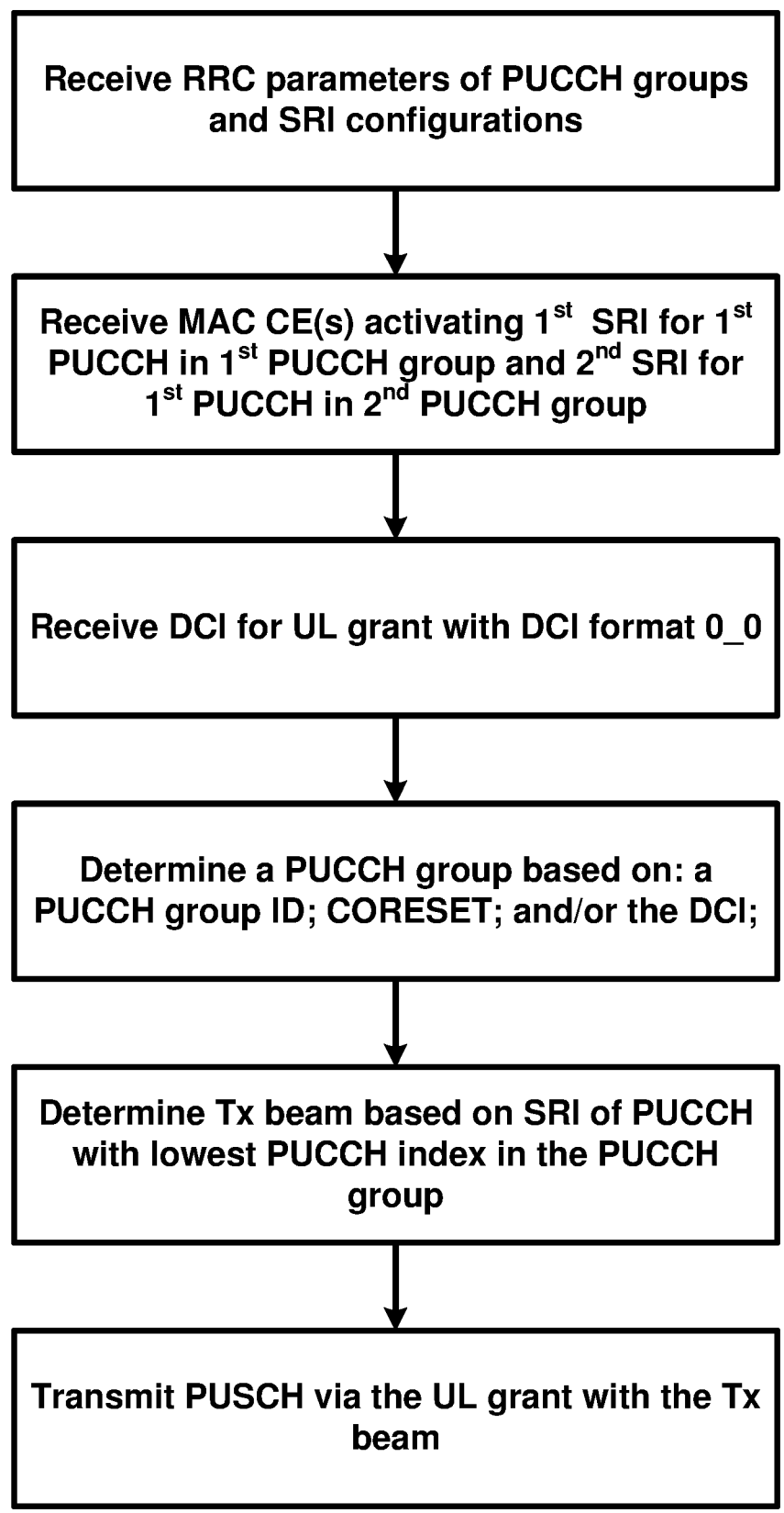
FIG. 28 is a flowchart of a transmission beam determination of PUSCH transmission as per an aspect of an example embodiment of the present disclosure.

FIG. 28 is an example of flowchart of a transmission beam determination of PUSCH transmission when configured with multiple TRPs/panels. In an example, a wireless device may receive configuration parameters of PUCCH groups and spatial relation information configurations. The configuration parameters may be implemented by one or more of example embodiments of FIG. 27. The wireless device may receive one or more MAC CEs activating at least a spatial relation information configuration for at least a PUCCH resource in at least a PUCCH group, e.g., as shown in FIG. 28, the one or more MAC CEs activating $1^{st}$ SRI for $1^{st}$ PUCCH in $1^{st}$ PUCCH group and $2^{nd}$ SRI for $1^{st}$ PUCCH in $2^{nd}$ PUCCH group. In an example, the wireless device may receive a DCI (e.g., DCI format 0_0) indicating an uplink grant. In response to receiving the DCI, the wireless device may determine a PUCCH group from the PUCCH groups based on a PUCCH group ID; a CORESET; a current active panel; and/or the DCI. The determination of the PUCCH group may be implemented based on one or more of example embodiments of FIG. 27. The wireless device may determine a transmission beam based on a spatial relation information configuration of a PUCCH resource with a lowest PUCCH resource index in the PUCCH group. The wireless device may transmit uplink TB via the uplink grant with a same spatial domain transmission filter used for UCIs transmission via the PUCCH resource with the lowest PUCCH resource index in the PUCCH group.

In an example, a wireless device receives configuration parameters of PUCCH resources of a cell. The PUCCH resources are grouped into a plurality of PUCCH resource groups. The wireless device receives, via a control resource set, a DCI indicating an uplink grant of a PDSCH resource. The wireless device selects, based on the control resource set, a PUCCH resource group from the plurality of PUCCH resource groups. The wireless device determines a spatial relation information corresponding to a first PUCCH resource of the selected PUCCH resource group. The wireless device transmits one or more uplink control information based on the spatial relation information. The wireless device transmits an uplink transport block via the uplink grant of the PUSCH based on the spatial relation information.

According to an example embodiment, the wireless device determines the first PUCCH resource, from the selected PUCCH resource group, with a lowest PUCCH resource index.

According to an example embodiment, the DCI is of a DCI format 0_0. The DCI does not comprise an SRS resource indicator field.

According to an example embodiment, the PUCCH resource group is associated with one or more control resource set comprising the control resource set. The selecting the PUCCH resource group comprises selecting the PUCCH resource group, from the plurality of PUCCH resource groups, with a PUCCH resource group index associated with the control resource set.

According to an example embodiment, the transmitting the uplink transport block based on the spatial relation information comprises transmitting the uplink transport block based on a spatial domain transmission filter used for a transmission of uplink control information via the first PUCCH resource.

According to an example embodiment, the PUCCH resource group comprises a plurality of PUCCH resources, each of the plurality of PUCCH resources being identified with a PUCCH resource index. One or more parameters of the first PUCCH resource comprise at least one of: a frequency location parameter, a PUCCH format indicator, and/or a time domain location parameter.

According to an example embodiment, the wireless device receives a spatial relation information activation MAC CE indicating an activation of the spatial relation information for the first PUCCH resource. The spatial relation information is associated with at least one of: an index of a CSI-RS, an index of SSB, and/or an index of SRS.

According to an example embodiment, the configuration parameters of the cell comprise first configuration parameters of a plurality of TCI states, each of the plurality of TCI state is associated with at least one of: a TCI state index, an index of a CSI-RS, an index of SSB, and/or an index of SRS.

According to an example embodiment, the plurality of TCI states are grouped into a plurality of TCI groups, each of the plurality of TCI groups being identified with a TCI pool index. Each of the plurality of PUCCH resource groups is associated with a corresponding one of the plurality of TCI groups. The selecting the PUCCH resource group comprises selecting the PUCCH resource group, from the plurality of PUCCH resource groups, associated with a corresponding TCI group, of the plurality of TCI groups, comprising a TCI state used for receiving the DCI via the control resource set.

According to an example embodiment, the configuration parameters of the cell comprise first configuration parameters of a plurality of control resource sets comprising the control resource set. The first configuration parameters of the control resource set comprise at least one of: a frequency domain resource indicator, a time duration indicator, a resource mapping type indicator, and/or one or more TCI states. The plurality of control resource sets are grouped into a plurality of control resource set groups, each of the plurality of control resource set groups being identified with a control resource set pool index. Each of the plurality of PUCCH resource groups is associated with a corresponding one of the plurality of control resource set groups. The selecting the PUCCH resource group comprises selecting the PUCCH resource group, from the plurality of PUCCH resource groups, associated with a corresponding control resource set group, of the plurality of control resource set groups, comprising the control resource set.

In an example, a wireless device receives first parameters of physical uplink control channel (PUCCH) resources of a cell and second parameters of transmission configuration indication (TCI) states being grouped into a plurality of TCI groups. Each of the PUCCH resources is associated with one of the plurality of TCI groups. The wireless device receives, via a control resource set, a DCI indicating an uplink grant. The wireless device selects a TCI group from the plurality of TCI groups, wherein the TCI group comprises a TCI state used for the receiving the DCI via the control resource set. The wireless device determines a spatial relation information corresponding to a first PUCCH resource of one or more PUCCH resources, of the PUCCH resources, associated with the selected TCI group. The wireless device transmits an uplink transport block via the uplink grant based on the spatial relation information.

In an example, a wireless device receives from a base station one or more configuration parameters of PUCCH resources of a cell, the PUCCH resources being grouped into a first PUCCH resource group and a second PUCCH resource group. The wireless device receives, via a control resource set, a DCI having a first DCI format and indicating an uplink grant of a PUSCH. The wireless device selects, based on the control resource set and the DCI having the first DCI format, a PUCCH resource group from the first PUCCH resource group and the second PUCCH resource group. The wireless device determines a first PUCCH resource, with a lowest PUCCH resource index, from the selected PUCCH resource group. The wireless device transmits one or more uplink control information based on the spatial relation information. The wireless device transmits an uplink transport block via the uplink grant of the PUSCH based on a spatial relation information corresponding to the first PUCCH resource.

Figure 29:
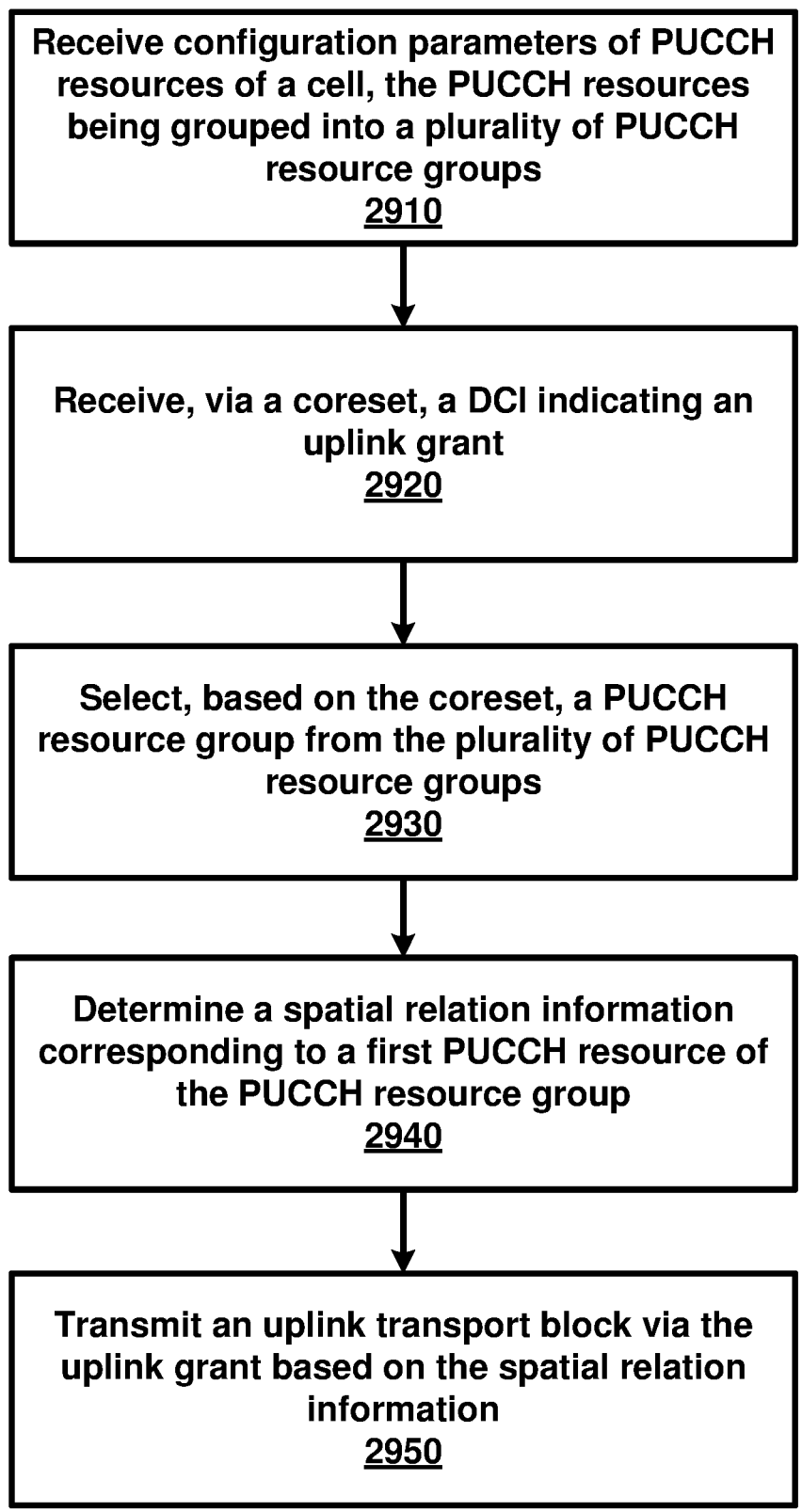
FIG. 29 is an of flowchart of a transmission beam determination of PUSCH transmission as per an aspect of an example embodiment of the present disclosure.

FIG. 29 shows an example flowchart of uplink transmission with multiple beams. At 2910, a wireless device receives from a base station (not shown in FIG. 29) configuration parameters of PUCCH resources of a cell. The PUCCH resources are grouped into a plurality of PUCCH resource groups. At 2920, the wireless device receives via a control resource set (coreset), a DCI indicating an uplink grant. At 2930, the wireless device selects, based on the coreset, a PUCCH resource group from the plurality of PUCCH resource groups. At 2940, the wireless device determines a spatial relation information corresponding to a first PUCCH resource of the PUCCH resource group. At

2950, the wireless device transmits an uplink transport block via the uplink grant based on the spatial relation information.

According to an example embodiment, the wireless device determines the first PUCCH resource, from the selected PUCCH resource group, with a lowest PUCCH resource index.

According to an example embodiment, the DCI is of a DCI format 0_0. The DCI does not comprise a sounding reference signal indicator field.

According to an example embodiment, the PUCCH resource group is associated with one or more coreset comprising the coreset.

According to an example embodiment, the wireless device transmits the uplink transport block based on the spatial relation information comprises transmitting the uplink transport block based on a spatial domain transmission filter used for a transmission of uplink control information via the first PUCCH resource.

According to an example embodiment, the configuration parameters of the cell comprise first configuration parameters of a plurality of coresets comprising the coreset. The plurality of coresets are grouped into a plurality of coreset groups, each of the plurality of coreset groups being identified with a coreset pool index. Each of the plurality of PUCCH resource groups is associated with a corresponding one of the plurality of coreset groups. The wireless device selects the PUCCH resource group from the plurality of PUCCH resource groups based on the PUCCH resource group being associated with a corresponding coreset group, of the plurality of coreset groups, comprising the coreset.

Figure 30:
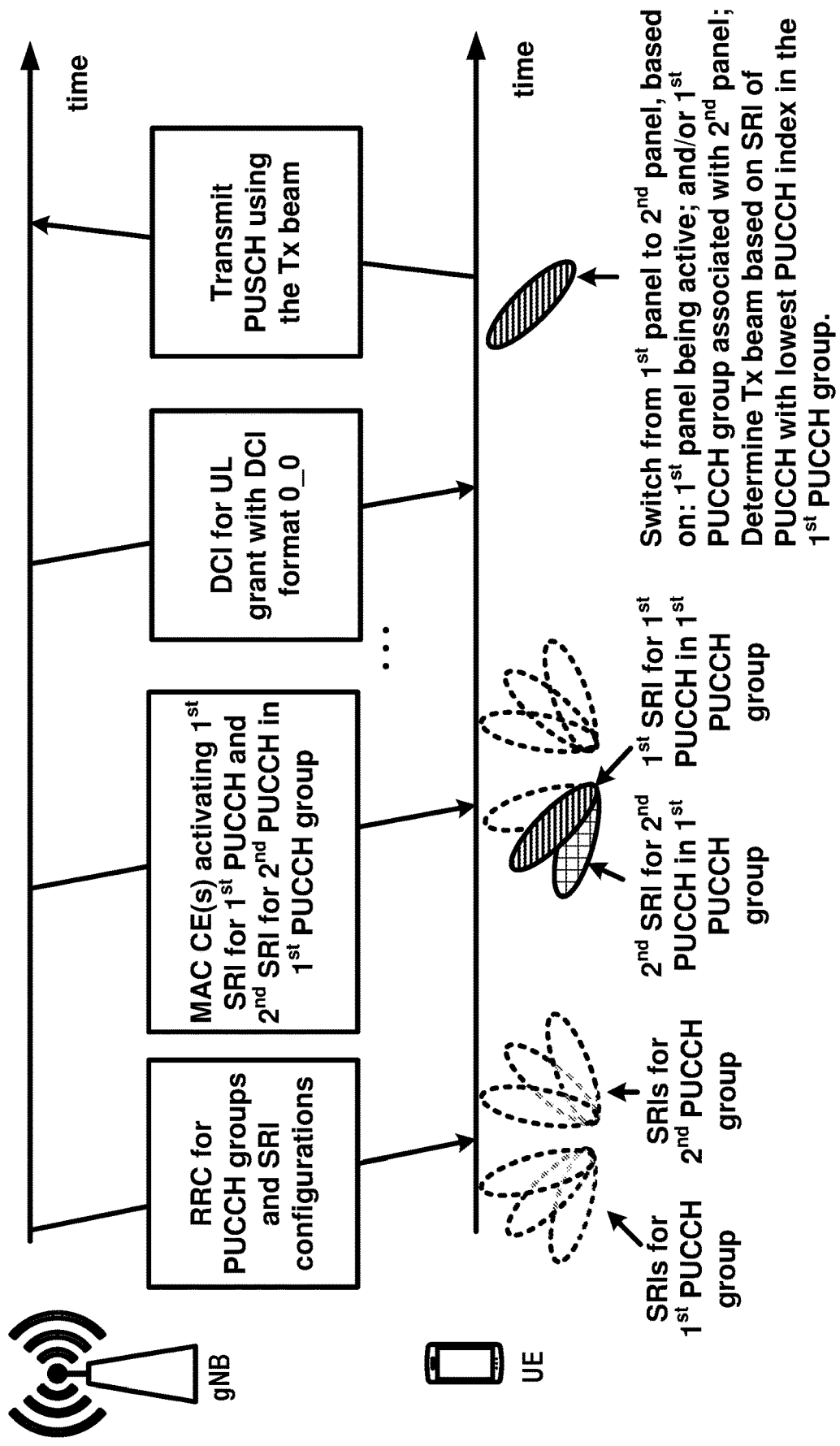
FIG. 30 is an example of transmission beam determination of PUSCH transmission as per an aspect of an embodiment of the present disclosure.

FIG. 30 is an example of transmission beam determination of PUSCH transmission scheduled by a DCI with DCI format 0_0, or the DCI with DCI format 0_1 and spatial relation information configuration not activated for PUCCH transmission, or the DCI with a new DCI format not comprising an SRS resource indicator. In an example, a base station may transmit to a wireless device one or more RRC messages comprising configuration parameters of PUCCH resource groups (e.g., $1^{st}$ PUCCH group and $2^{nd}$ PUCCH group in FIG. 30) and spatial relation information configurations. In an example, each PUCCH resource group may be associated with a panel of a plurality of panels, or a CORESET. In example, a PUCCH resource group may be identified by a group ID. The group ID may indicate a panel of a plurality of panels. A PUCCH resource group may comprise a plurality of PUCCH resources. A PUCCH resource of the plurality of PUCCH resources may be identified by a PUCCH resource index (or ID). In an example, in each PUCCH resource group of the PUCCH resource groups, a PUCCH resource with a lowest PUCCH resource index may be referred to as a default PUCCH resource in the each PUCCH resource group. In an example, the spatial relation information configurations may comprise a plurality of spatial relation information configurations for spatial setting of PUCCH transmission. In an example, the plurality of spatial relation information configurations may be grouped in a plurality of spatial relation information configurations groups, each spatial relation information configuration group being associated with a PUCCH resource group, and/or a panel. For example, as shown in FIG. 30, a first spatial relation information configuration group (e.g., $1^{st}$ SRIs in FIG. 30) may be associated with a first PUCCH resource group (e.g., $1^{st}$ PUCCH group in FIG. 30). A second spatial relation information configuration group (e.g., $2^{nd}$ SRIs in FIG. 30) may be associated with a second PUCCH resource group (e.g., $2^{nd}$ PUCCH group in FIG. 30). Each spatial relation information configuration group may comprise a list of spatial relation information configurations. Each spatial relation information configuration may be identified by a spatial relation information configuration index (or ID). Parameters of each spatial relation information configuration may comprise a serving cell ID; a reference resource signal index; a PUCCH pathloss reference RS indicator; a P0 value for PUCCH transmission; and/or a close loop power control identifier. The reference resource signal index may comprise an SSB index, a CSI-RS index or an SRS index. In an example, a spatial relation information configuration of PUCCH may indicate spatial setting of the PUCCH transmission. The spatial relation information configuration of PUCCH may indicate power control parameters.

In an example, the base station may transmit one or more MAC CEs activating at least one spatial relation configurations for at least one PUCCH resource in a first PUCCH group (e.g., $1^{st}$ SRI for $1^{st}$ PUCCH and $2^{nd}$ SRI for $2^{nd}$ PUCCH in $1^{st}$ PUCCH group). In an example, there may be no activated spatial relation configurations for PUCCH resource(s) in PUCCH groups other than the first PUCCH group. In an example, the first PUCCH group with an activated spatial relation information configuration on a default PUCCH (e.g., a PUCCH with a lowest PUCCH resource index) in the first PUCCH group may be referred to as a default PUCCH group, or a PUCCH group on a default panel (master panel, or primary panel).

In an example, the wireless device may receive a DCI with DCI format 0_0 indicating an uplink grant. In response to receiving the DCI, the wireless device may switch from a first panel to a second panel based on: the first panel being active before receiving the DCI; the default PUCCH group being configured on the second panel. The wireless device, based on switching from the first panel to the second panel, may transmit uplink TB via the uplink grant with a transmission beam determined based on the default PUCCH group. In an example, after or in response to determining the default PUCCH group, the wireless device may transmit the uplink TB with a same spatial domain transmission filter used for UCIs transmission via a PUCCH resource with a lowest PUCCH resource index in the default PUCCH group.

Figure 31:
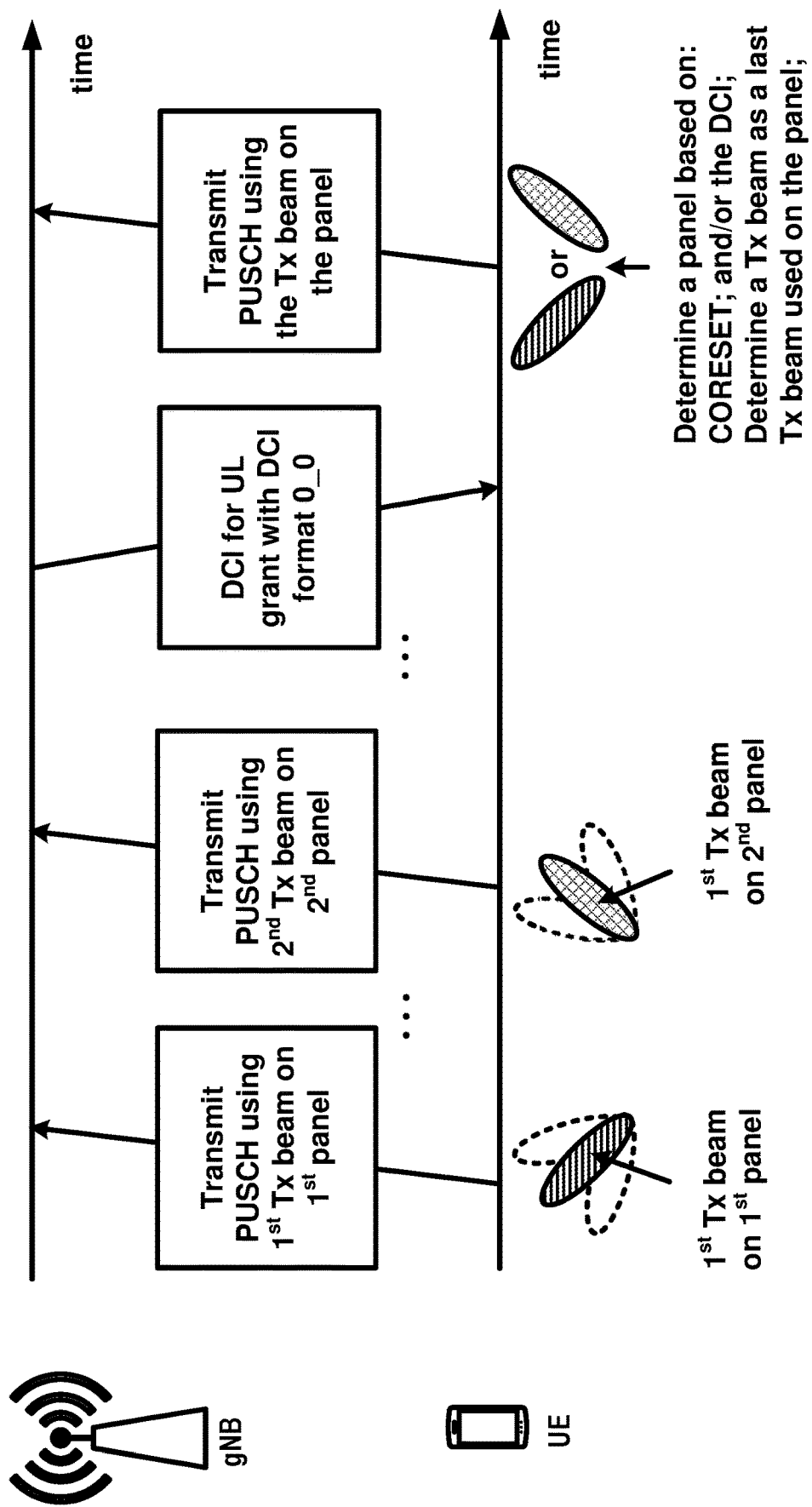
FIG. 31 is an example of transmission beam determination of PUSCH transmission as per an aspect of an embodiment of the present disclosure.

FIG. 31 is an example of transmission beam determination of PUSCH transmission. In an example, a wireless device may transmit a first uplink TB with a first transmission beam on a first panel (e.g., $1^{st}$ Tx beam on $1^{st}$ panel as shown in FIG. 31). The wireless device may transmit a second uplink TB with a second transmission beam on a second panel (e.g., $2^{nd}$ Tx beam on $2^{nd}$ panel as shown in FIG. 31). Transmission of the first uplink TB may occur simultaneously (or overlap in at least a portion of a time duration) with transmission of the second uplink TB. Transmission of the first uplink TB may occur after transmission of the second uplink TB.

In an example, the wireless device may receive a DCI with DCI format 0_0 indicating an uplink grant, or the DCI with DCI format 0_1 when spatial relation information configuration is not activated for PUCCH transmission. In response to receiving the DCI, the wireless device, based on a CORESET and/or one or more parameters of the DCI, may determine a panel from the first panel and the second panel. In an example, based on the determining the panel, the wireless device may transmit a third uplink TB via the uplink grant with a same transmission beam used for last PUSCH transmission on the panel.

In an example, a wireless device may transmit an uplink TB via an uplink grant with a transmission power. The wireless device may calculate the transmission power as:

$$P_{PUSCH,b,f,c}(i, j, q_d, l) =$$

$$\min \left\{ \begin{array}{l} P_{CMAX,f,c}(i), \\ P_{O\_PUSCH,b,f,c}(j) + 10 \ log_{10}\left(2^{\mu} \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i, l) \end{array} \right\}$$

In an example, $P_{PUSCH,b,f,c}$ (i,j,q$_d$,l) may be a calculated transmission power on active UL BWP b of carrier f of serving cell c using parameter set configuration with index j and PUSCH power control adjustment state with index l, in PUSCH transmission occasion i.

In an example, $P_{CMAX,f,c}(i)$ may be a configured UE transmit power for carrier f of serving cell c in PUSCH transmission occasion i. In an example, $P_{O\_PUSCH,b,f,c}(j)$ may be a parameter composed of a sum of a component $P_{O\_NOMINAL\_PUSCH,f,c}(j)$ and a component $P_{O\_UE\_PUSCH,b,f,c}$ (j) where j∈ {0_1, . . . , J−1}.

In an example, $\alpha_{b,f,c}(j)$ may be a configured power compensation factor for transmission on active UL BWP b of carrier f of serving cell c using parameter set configuration with index j in PUSCH transmission occasion i.

In an example, $M_{RB,b,f,c}^{PUSCH}(i)$ may be a bandwidth of PUSCH resource assignment expressed in number of resource blocks for PUSCH transmission occasion i on active UL BWP b of carrier f of serving cell c and μ may be a SCS configuration.

In an example, $PL_{b,f,c}(q_d)$ may be a downlink pathloss estimate in dB calculated by the wireless device using reference signal (RS) index q$_d$ for an active DL BWP of serving cell c.

In an example, $\Delta_{TF,b,f,c}(i)=10 \ log_{10}((2^{BPRE \cdot K_S}-1) \cdot \beta_{offset}^{PUSCH})$ for K$_S$=1.25 and $\Delta_{TF,b,f,c}(i)$=0 for K$_S$=0. In an example, $f_{b,f,c}(i, l)$ may be a PUSCH power control adjustment state for active UL BWP b of carrier f of serving cell c in PUSCH transmission occasion i.

Figure 32:
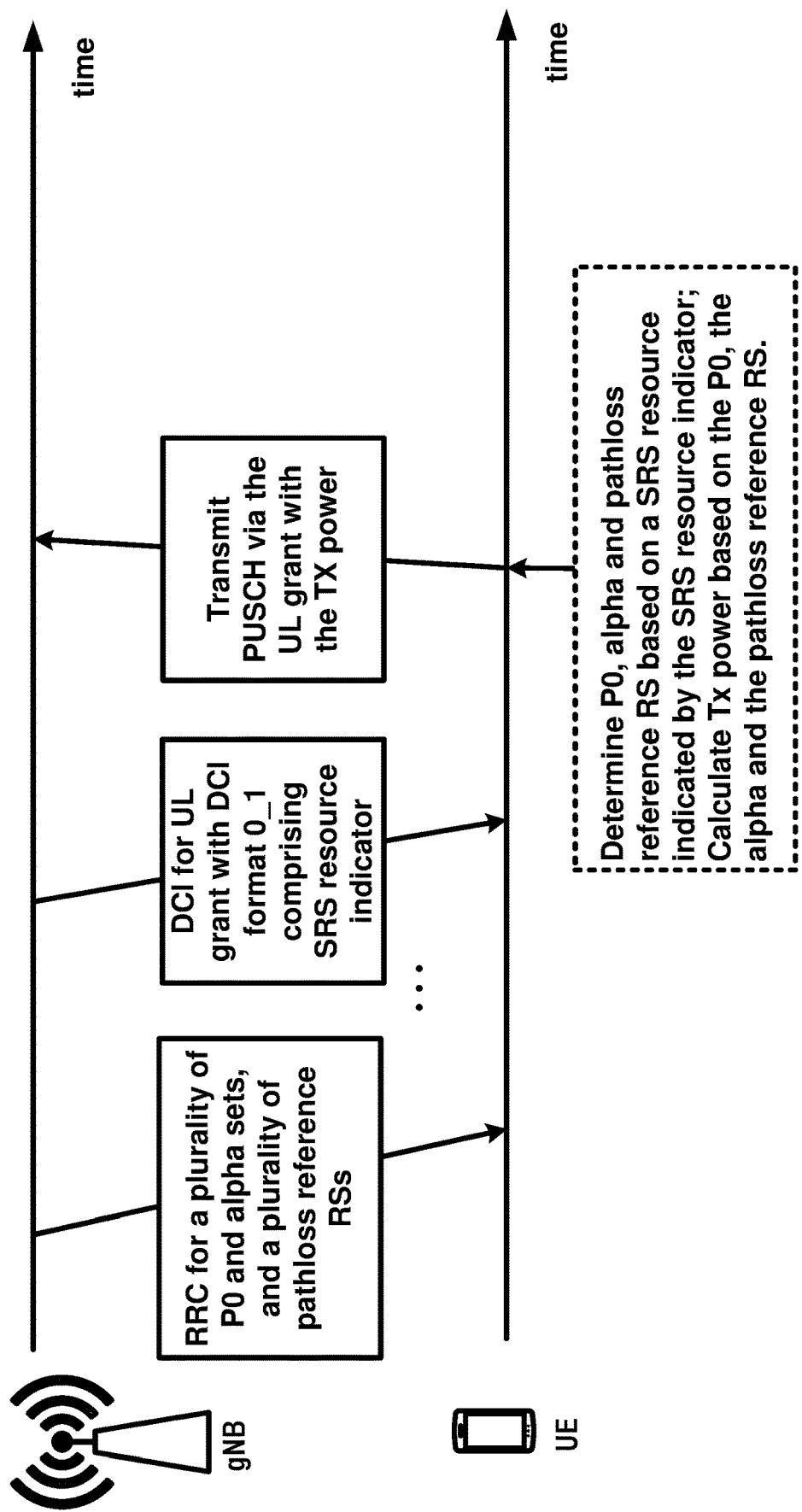
FIG. 32 is an example of transmission power determination of PUSCH transmission based on a DCI format 0_1 as per an aspect of an embodiment of the present disclosure.

FIG. 32 is an example of transmission power determination of PUSCH transmission. In an example, a base station may transmit to a wireless device one or more RRC messages (e.g., PUSCH-PowerControl, PUSCH-Config, or BWP-UplinkDedicated) comprising configuration parameters of a plurality of P0 and alpha sets and a plurality of pathloss reference RSs. In an example, each P0 and alpha set of the plurality of P0 and alpha sets may be identified by a P0 and alpha set ID (or index). Each P0 and alpha set may comprise: a P0 value and an alpha value. In an example, the P0 value may be used to determine $P_{O\_UE\_PUSCH,b,f,c}(i)$ In an example, the alpha value may be used to determine $\alpha_{b,f,c}(j)$. A total number of the plurality of P0 and alpha sets may be a positive integer (e.g., less than or equal to 30). In an example, each pathloss reference RS of the plurality of pathloss reference RS s may be identified by a pathloss reference RS ID (or index). Each pathloss reference RS may comprise an SSB indicated by an SSB index; or CSI-RS indicated by a CSI-RS index. A total number of the plurality of pathloss reference RSs may be a positive integer (e.g., less than or equal to 30).

In an example, the configuration parameters may further comprise a plurality of SRI-to-PUSCH mapping configurations. Each SRI-to-PUSCH mapping configuration may be identified by an SRI-to-PUSCH power control ID. Each SRI-to-PUSCH mapping configuration may comprise: a pathloss reference RS ID; a P0 and alpha set ID; and/or a close loop index for power control. A total number of the SRI-to-PUSCH mapping configurations may be a positive integer (e.g., less than or equal to 16).

As shown in FIG. 32, the wireless device may receive a DCI with DCI format 0_1 indicating an uplink grant. The wireless device may, in response to receiving the DCI, determine a P0 and alpha set based on an SRS resource indicator of the DCI. In an example, the wireless device may determine (or select) the P0 and alpha set from the plurality of P0 and alpha sets, wherein the P0 and alpha set is identified by a P0 and alpha set ID. The P0 and alpha set ID may be comprised in an SRI-to-PUSCH mapping configuration indicated by the SRS resource indicator of the DCI. In an example, the wireless device may, in response to receiving the DCI, determine a pathloss reference RS based on the SRS resource indicator of the DCI. In an example, the wireless device may determine (or select) the pathloss reference RS from the plurality of pathloss reference signals, wherein the pathloss reference RS is identified by a pathloss reference RS ID. The pathloss reference RS ID may be comprised in the SRI-to-PUSCH mapping configuration indicated by the SRS resource indicator of the DCI.

In an example, based on the P0 and alpha set and the pathloss reference RS determined based on the SRS resource indicator of DCI format 0_1, the wireless device may determine a transmission power as:

$$P_{PUSCH,b,f,c}(i, j, q_d, l) =$$

$$\min \left\{ \begin{array}{l} P_{CMAX,f,c}(i), \\ P_{O\_PUSCH,b,f,c}(j) + 10 \ log_{10}\left(2^{\mu} \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i, l) \end{array} \right\}$$

In an example, $P_{O\_UE\_PUSCH,b,f,c}(j)$ may be indicated by a P0 value of the P0 and alpha set. $\alpha_{b,f,c}(j)$ may be indicated by an alpha value of the P0 and alpha set. In an example, $PL_{b,f,c}(q_d)$ may be a downlink pathloss estimate in dB calculated by the wireless device using a reference signal indicated by the pathloss reference RS. In an example, $PL_{f,c}(q_d)$=referenceSignalPower−higher layer filtered RSRP, where referenceSignalPower may be provided by higher layers (RRC messages) and RSRP may be measured on the pathloss reference RS.

In an example, based on the calculated transmission power, the wireless device may transmit an uplink TB with the uplink grant with the transmission power.

Figure 33:
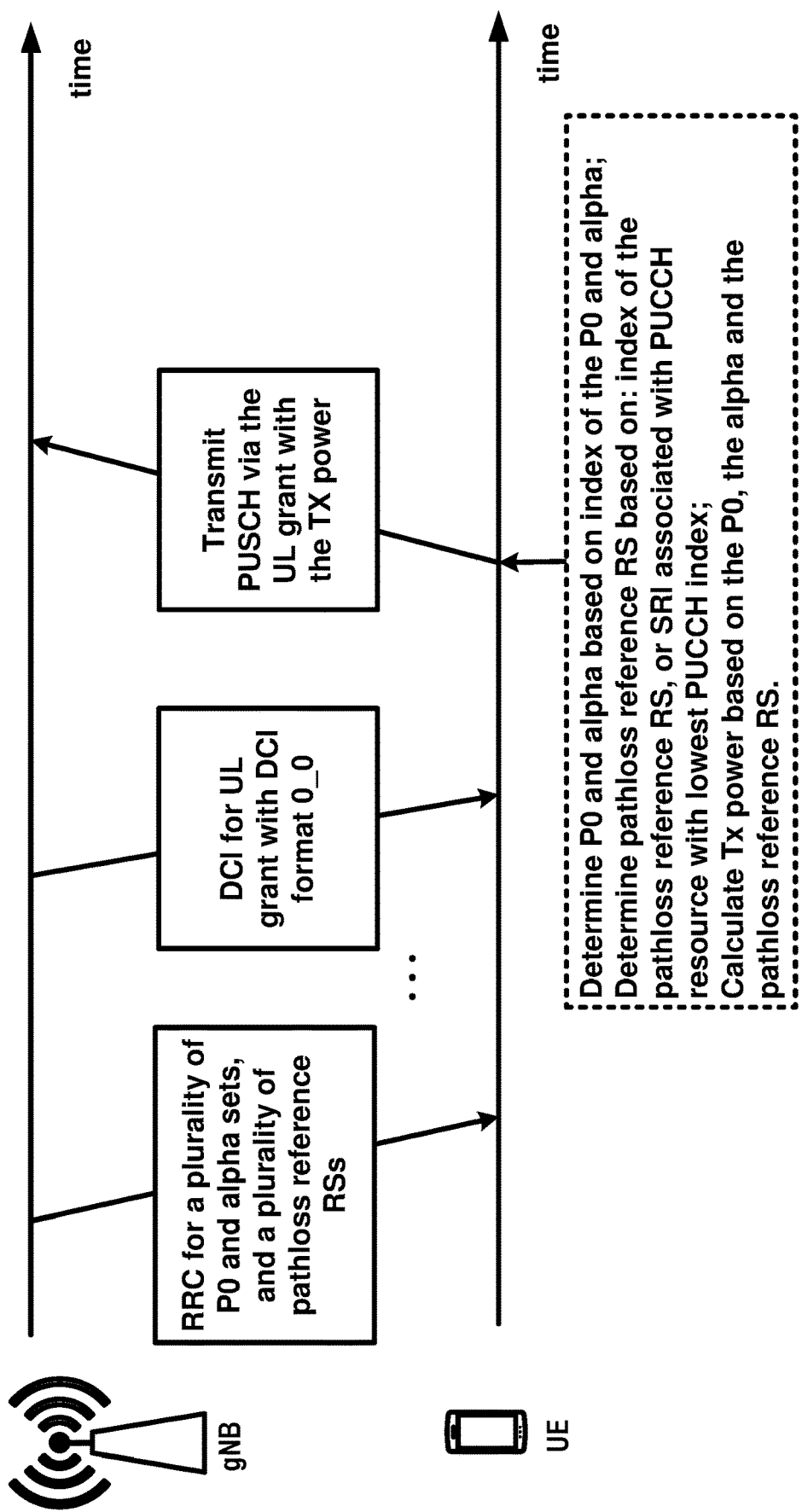
FIG. 33 is an example of transmission power determination of a PUSCH transmission based on a DCI format 0_0 as per an aspect of an embodiment of the present disclosure.

In an example, a base station may transmit to a wireless device a DCI with DCI format 0_0 indicating an uplink grant. Since DCI format 0_0 does not comprise an SRS resource indicator, the wireless device may determine a P0 and alpha set based on an index of the P0 and alpha set. The wireless device may determine a pathloss reference RS based on an index of the pathloss reference RS. FIG. 33 is an example of transmission power determination of a PUSCH transmission. In an example, a base station may transmit to a wireless device one or more RRC messages (e.g., PUSCH-PowerControl, PUSCH-Config, or BWP-UplinkDedicated) comprising configuration parameters of a plurality of P0 and alpha sets and a plurality of pathloss reference RS s. In an example, the transmitting the one or more RRC messages may be implemented by one or more examples of FIG. 32.

As shown in FIG. 33, the wireless device may receive a DCI (e.g., with DCI format 0_0, or with a new DCI format not comprising an SRS resource indicator) indicating an uplink grant. In response to receiving the DCI, the wireless device may determine a P0 and alpha set from the plurality of P0 and alpha sets based on an index of the P0 and alpha set. In an example, the wireless device may determine the P0 and alpha set having a lowest P0 and alpha set index in the plurality of P0 and alpha sets. The wireless device may determine the P0 and alpha set as a first P0 and alpha set in the plurality of P0 and alpha sets, where each P0 and alpha set are in order of P0 and alpha set index from lowest to highest. In an example, in response to receiving the DCI, the wireless device may determine a pathloss reference RS based on index of the pathloss reference RS, if the wireless device is not provided a (or activated) spatial relation information configuration for a PUCCH transmission. In an example, the wireless device may determine the pathloss reference RS with a pathloss reference RS ID being equal to zero, from the plurality of pathloss reference RS s. In an example, in response to receiving the DCI, the wireless device may determine a pathloss reference RS based on a spatial relation information configuration of a default PUCCH resource (or a PUCCH resource with a lowest PUCCH resource index), if the wireless device is provided a (or activated) spatial relation information configuration for a PUCCH transmission. In an example, the wireless device may determine the pathloss reference RS as a RS indicated in a spatial relation information configuration of the default PUCCH resource.

In an example, based on the P0 and alpha set and the pathloss reference RS determined based on index of the P0 and alpha set, the pathloss reference RS ID, and/or spatial relation information configuration of a default PUCCH, the wireless device may determine a transmission power as:

$$P_{PUSCH,b,f,c}(i, j, q_d, l) =$$

$$\min \left\{ \begin{array}{l} P_{CMAX,f,c}(i), \\ P_{O\_PUSCH,b,f,c}(j) + 10\ log_{10}(2^{\mu} \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{array} \right\}$$

In an example, $P_{O\_UE\_PUSCH,b,f,c}(j)$ may be indicated by a P0 value of the P0 and alpha set. $\alpha_{b,f,c}(j)$ may be indicated by an alpha value of the P0 and alpha set. In an example, $PL_{b,f,c}(q_d)$ may be a downlink pathloss estimate in dB calculated by the wireless device using a reference signal indicated by the pathloss reference RS. In an example, $PL_{f,c}(q_d)$=referenceSignalPower−higher layer filtered RSRP, where referenceSignalPower may be provided by higher layers (RRC messages) and RSRP may be measured on the pathloss reference RS.

In an example, based on the calculated transmission power, the wireless device may transmit an uplink TB with the uplink grant with the transmission power.

In an example, when configured with multiple TRPs/panels, a base station may transmit a DCI via a first TRP or a second TRP to the wireless device. The DCI may be transmitted with a DCI format 0_1 or a DCI format 0_0. When receiving the DCI with the DCI format 0_1, the wireless device may determine a panel and a transmission power on the panel based on an SRS resource indicator in the DCI. However, with receiving the DCI with the DCI format 0_0, or the DCI with a new DCI format not comprising an SRS resource indicator, the wireless device may have difficulties in determining a panel and/or a transmission power on the panel. For example, by implementing existing technologies, the wireless device may incorrectly determine a transmission power of a PUSCH on a first panel based on a P0 and alpha set and a pathloss reference RS configured for a second panel. Transmitting a PUSCH on a first panel with a transmission power incorrectly determined based on a second panel may result in transmission failure, reducing uplink spectrum efficiency, increasing uplink interference, and/or increasing power consumption of the wireless device. There is a need to improve existing transmission power determination when configured with multiple TRPs/panels. Example embodiments may improve the existing transmission power determination for PUSCH transmission when configured with multiple TRPs/panels. Example embodiments may improve transmission robustness, increase uplink spectrum efficiency, reduce uplink interference, and/or reduce power consumption of the wireless device.

Figure 34:
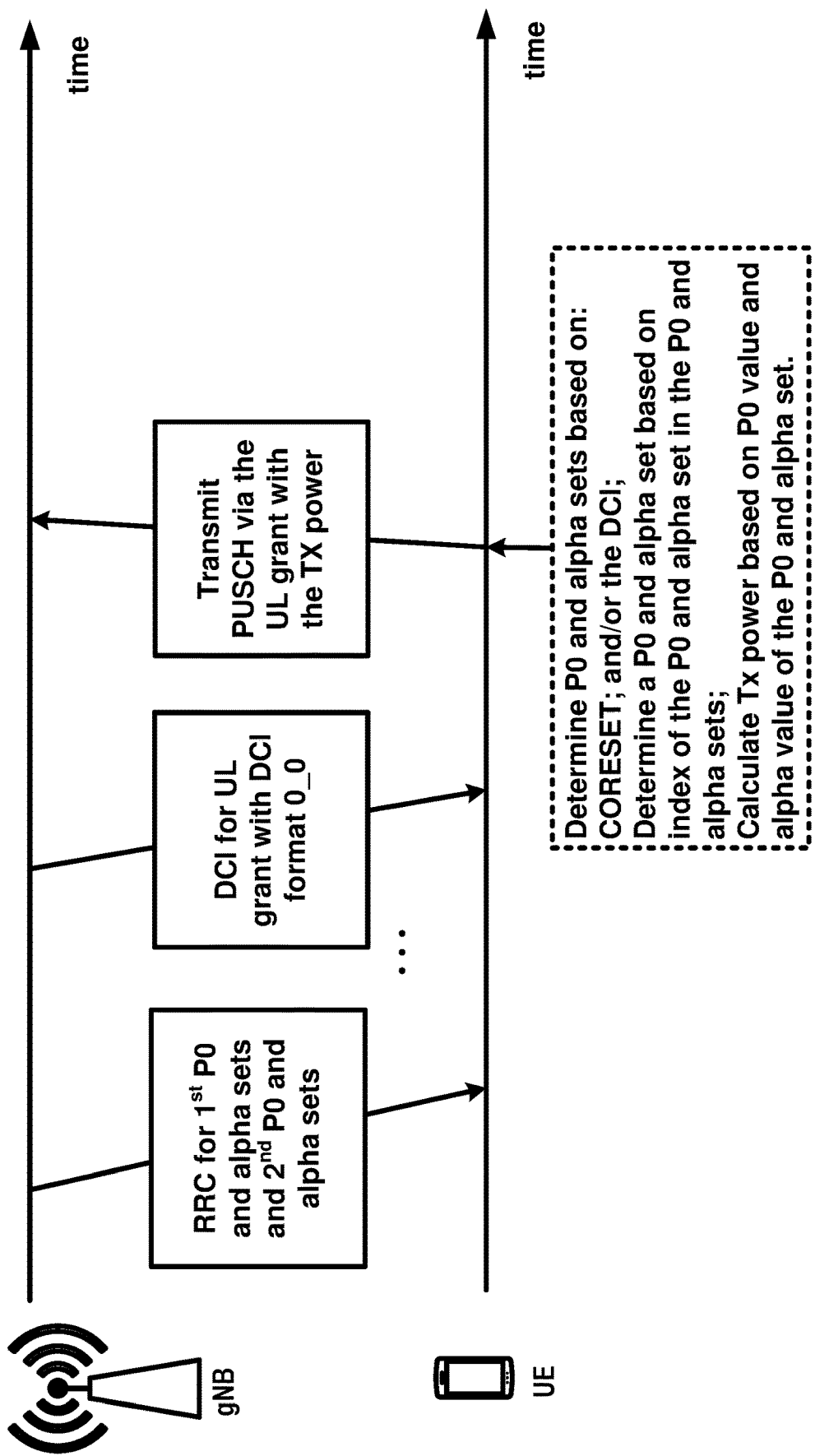
FIG. 34 is an example of transmission power determination of PUSCH transmission as per an aspect of an embodiment of the present disclosure.

FIG. 34 is an example of transmission power determination of PUSCH transmission. In an example, a base station may transmit to a wireless device one or more RRC messages (e.g., PUSCH-PowerControl, PUSCH-Config, or BWP-UplinkDedicated) comprising configuration parameters of a first plurality of P0 and alpha sets and a second plurality of P0 and alpha sets. In an example, the first plurality of P0 and alpha sets may be associated with a first panel. In an example, the second plurality of P0 and alpha sets may be associated with a second panel. In an example, the first plurality of P0 and alpha sets may be identified by a first ID of a first panel. In an example, the second plurality of P0 and alpha sets may be identified by a second ID of a second panel. The first ID of the first panel may comprise a first panel ID, a first CORESET ID (or a first CORESET pool index), a first SRI ID (or a first SRI group ID), and/or a first TCI index (or a first TCI group index). The second ID of the second panel may comprise a second panel ID, a second CORESET ID (or a second CORESET pool index), a second SRI ID (or a second SRI group ID), and/or a second TCI index (or a second TCI group index).

In an example, each P0 and alpha set of the first or the second plurality of P0 and alpha sets may be identified by a P0 and alpha set ID (or index). Each P0 and alpha set may comprise a P0 value and an alpha value. In an example, the P0 value may be used to determine $P_{O\_UE\_PUSCH,b,f,c}(j)$ In an example, the alpha value may be used to determine $\alpha_{b,f,c}(j)$. A total number of the first plurality of P0 and alpha sets and the second plurality of P0 and alpha sets may be a positive integer (e.g., less than or equal to 30, or 60).

In an example, the wireless device may receive a DCI with DCI format 0_0 indicating an uplink grant, or with DCI format 0_1 and spatial relation information configuration not activated for PUCCH transmission. In response to receiving the DCI, the wireless device may determine a plurality of P0 and alpha sets, either the first plurality of P0 and alpha sets or the second plurality of P0 and alpha sets, may be used for transmission power calculation, based on at least one of: a panel ID; a CORESET; a current active panel; and/or one or more parameters of the DCI. In an example, if the DCI indicates the uplink grant of the PUSCH on a panel of multiple panels, the wireless device may determine the plurality of P0 and alpha sets associated with the panel. In an example, if the wireless device receives the DCI via a PDCCH in a CORESET, the wireless device may determine the plurality of P0 and alpha sets based on the plurality of P0 and alpha sets being associated with the CORESET. In an example, if a current active panel is a first panel, the wireless device may determine the plurality of P0 and alpha sets based on the plurality of P0 and alpha sets being associated with the first panel. In an example, if the DCI comprises one or more parameters indicating a panel, the wireless device may determine the plurality of P0 and alpha sets based on the plurality of P0 and alpha sets being associated with the panel.

In an example, based on the plurality of P0 and alpha sets determined based on a panel ID; a CORESET; a current active panel; and/or one or more parameters of the DCI, the wireless device may determine a P0 and alpha set in the plurality of P0 and alpha sets, the P0 and alpha set having a lowest P0 and alpha set index, or the P0 and alpha set of a first entry of the plurality of P0 and alpha sets.

In an example, based on the P0 and alpha set, the wireless device may determine a transmission power as:

$$P_{PUSCH,b,f,c}(i, j, q_d, l) =$$

$$\min\left\{\begin{array}{l}P_{CMAX,f,c}(i),\\P_{O\_PUSCH,b,f,c}(j) + 10\ log_{10}(2^\mu \cdot M_{RB,b,f,c}^{PUSCH}(i)) +\\\alpha_{b,f,c}(j) \cdot PL_{b,f,c}(q_d) + \Delta_{TF,b,f,c}(i) + f_{b,f,c}(i, l)\end{array}\right\}$$

In an example, $P_{O\_UE\_PUSCH,b,f,c}(j)$ may be indicated by a P0 value of the P0 and alpha set. $\alpha_{b,f,c}(j)$ may be indicated by an alpha value of the P0 and alpha set. In an example, based on the calculated transmission power, the wireless device may transmit an uplink TB with the uplink grant with the transmission power.

In an example, a wireless device receives from a base station one or more RRC messages comprising power control parameters grouped into a first power control parameter group and a second power control parameter group. Each of the power control parameters, identified by a power control parameter index, comprise an initial open loop power value (e.g., P0). The wireless device receives a DCI having a first DCI format (e.g., DCI format 0_0), via a control resource set. The DCI indicates an uplink grant of a PUSCH resource. The wireless device selects, based on the control resource set for the DCI and the DCI having the first DCI format, a power control parameter group from the first power control parameter group and the second power control parameter group. The wireless device determines a first power control parameter, with a lowest power control parameter index, from the selected power control parameter group. The wireless device transmits an uplink signal via the uplink grant of the PUSCH with a transmission power determined based on the initial open loop power value of the first power control parameter.

According to an example embodiment, each of the power control parameters comprises a power compensation factor value (e.g., alpha). The wireless device determines the transmission power based on a first power compensation factor value of the first power control parameter.

Figure 35:
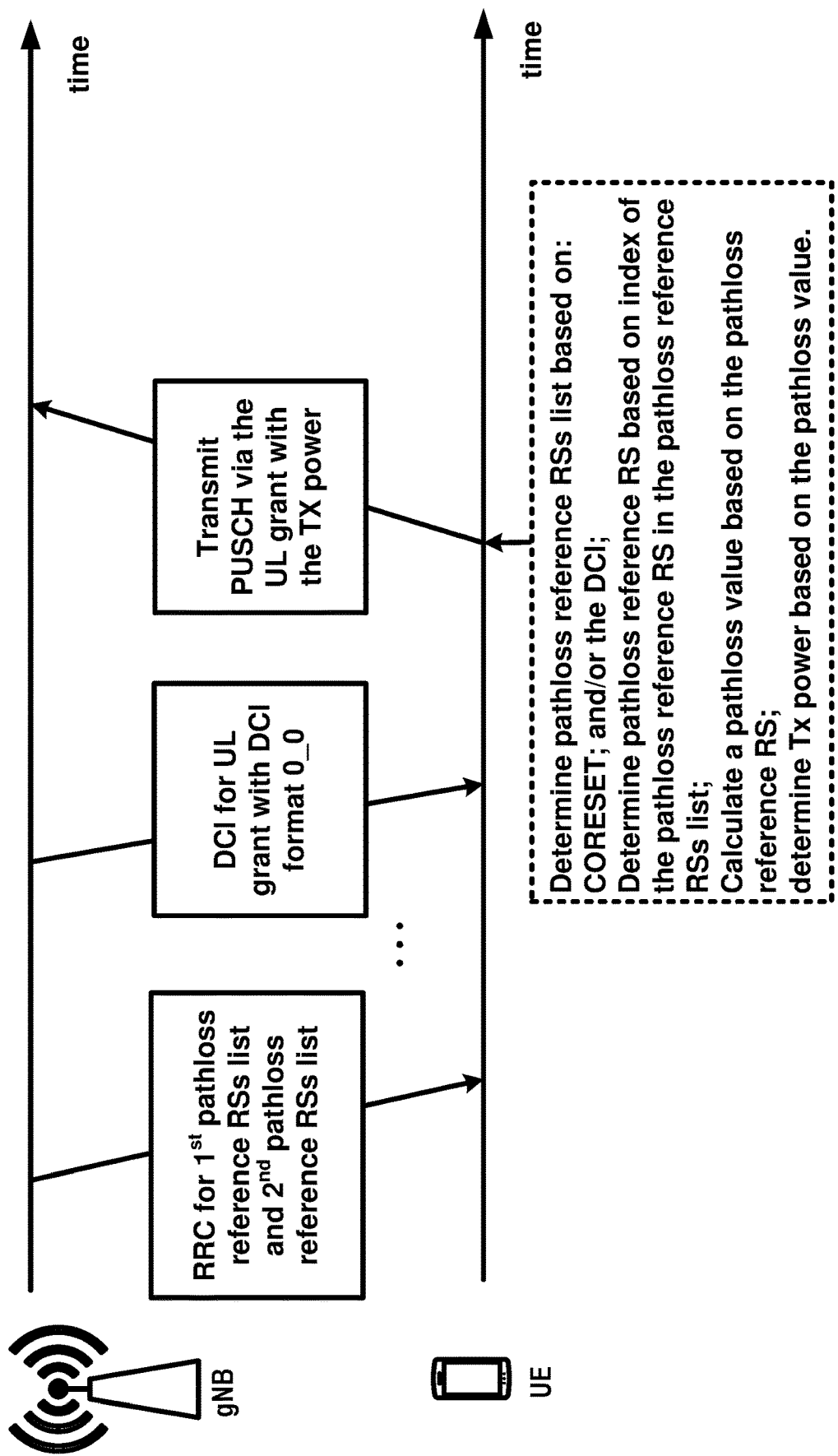
FIG. 35 is an example of transmission power determination of PUSCH transmission as per an aspect of an embodiment of the present disclosure.

FIG. 35 is an example of transmission power determination of PUSCH transmission as per an aspect of an embodiment of the present disclosure. In an example, In an example, a base station may transmit to a wireless device one or more RRC messages (e.g., PUSCH-PowerControl, PUSCH-Config, or BWP-UplinkDedicated) comprising configuration parameters of a first plurality of pathloss reference RSs and a second plurality of pathloss reference RSs. In an example, the first plurality of pathloss reference RSs may be associated with a first panel. In an example, the second plurality of pathloss reference RSs may be associated with a second panel. In an example, the first plurality of pathloss reference RSs may be identified by (or associated with) a first ID of a first panel. In an example, the second plurality of pathloss reference RSs may be identified by (or associated with) a second ID of a second panel. The first ID of the first panel may comprise a first panel ID, a first CORESET ID (or a first CORESET pool index), a first SRI ID (or a first SRI group ID), and/or a first TCI index (or a first TCI group index). The second ID of the second panel may comprise a second panel ID, a second CORESET ID (or a second CORESET pool index), a second SRI ID (or a second SRI group ID), and/or a second TCI index (or a second TCI group index).

In an example, each pathloss reference RS of the first or the second plurality of pathloss reference RS s may be identified by a pathloss reference RS ID (or index). Each pathloss reference RS may comprise an SSB indicated by an SSB index or CSI-RS indicated by a CSI-RS index. In an example, the pathloss reference RS may be used to determine $PL_{b,f,c}(q_d)$. A total number of the first plurality of pathloss reference RSs and the second plurality of pathloss reference RSs may be a positive integer (e.g., less than or equal to 30, or 60).

In an example, the wireless device may receive a DCI with DCI format 0_0 indicating an uplink grant, or with DCI format 0_1 when spatial relation information configuration is not activated for PUCCH transmission. In response to receiving the DCI, the wireless device may determine a plurality of pathloss reference RSs, either the first plurality of pathloss reference RSs or the second plurality of pathloss reference RSs, may be used for transmission power calculation, based on at least one of: a panel ID; a CORESET; a current active panel; and/or one or more parameters of the DCI. In an example, if the DCI indicates the uplink grant of the PUSCH on a panel of multiple panels, the wireless device may determine the plurality of pathloss reference RSs associated with the panel. In an example, if the wireless device receives the DCI on a CORESET, the wireless device may determine the plurality of pathloss reference RS s based on the plurality of pathloss reference RS s being associated with the CORESET. In an example, if a current active panel is a first panel, the wireless device may determine the plurality of pathloss reference RSs based on the plurality of pathloss reference RSs being associated with the first panel. In an example, if the DCI comprises one or more parameters indicating a panel, the wireless device may determine the plurality of pathloss reference RS s based on the plurality of pathloss reference RS s being associated with the panel.

In an example, after or in response to the plurality of pathloss reference RSs being determined based on a panel ID; a CORESET; a current active panel; and/or one or more parameters of the DCI, the wireless device may determine a pathloss reference RS in the plurality of pathloss reference RSs, the pathloss reference RS with a pathloss reference RS ID equal to zero.

In an example, based on the pathloss reference RS, the wireless device may determine a transmission power as:

$$P_{PUSCH,b,f,c}(i, j, q_d, l) =$$

$$\min\left\{\begin{array}{l}P_{CMAX,f,c}(i),\\P_{O\_PUSCH,b,f,c}(j) + 10\ log_{10}(2^\mu \cdot M_{RB,b,f,c}^{PUSCH}(i)) +\\\alpha_{b,f,c}(j) \cdot PL_{b,f,c}(q_d) + \Delta_{TF,b,f,c}(i) + f_{b,f,c}(i, l)\end{array}\right\}$$

In an example, $PL_{b,f,c}(q_d)$ may be a downlink pathloss estimate in dB calculated by the wireless device using a reference signal indicated by the pathloss reference RS. In an example, $PL_{f,c}(q_d)$=referenceSignalPower−higher layer filtered RSRP, where referenceSignalPower may be provided by higher layers (RRC messages) and RSRP may be measured on the pathloss reference RS. In an example, based on the calculated transmission power, the wireless device may transmit an uplink TB with the uplink grant with the transmission power.

Figure 36:
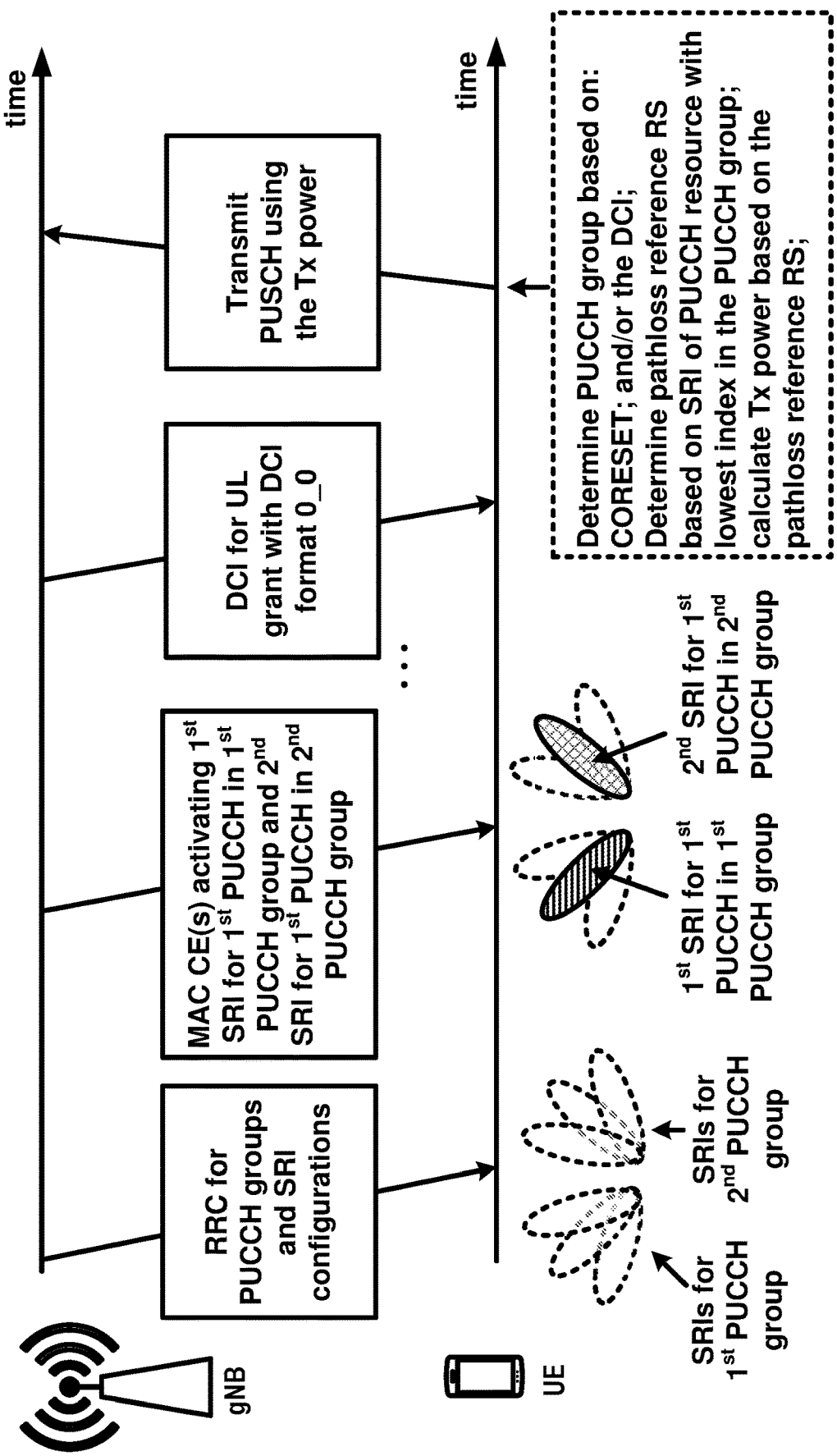
FIG. 36 is an example of transmission power determination of PUSCH transmission as per an aspect of an embodiment of the present disclosure.

FIG. 36 is an example of transmission power determination of PUSCH transmission as per an aspect of an embodiment of the present disclosure. In an example, a base station may transmit to a wireless device one or more RRC messages comprising configuration parameters of PUCCH resource groups (e.g., $1^{st}$ PUCCH group and $2^{nd}$ PUCCH group in FIG. 36) and spatial relation information configurations. In an example, each PUCCH resource group may be associated with a panel of a plurality of panels, or a CORESET. In example, a PUCCH resource group may be identified by a group ID. The group ID may indicate a panel of a plurality of panels. A PUCCH resource group may comprise a plurality of PUCCH resources. A PUCCH resource of the plurality of PUCCH resources may be identified by a PUCCH resource index (or ID). In an example, in each PUCCH resource group of the PUCCH resource groups, a PUCCH resource with a lowest PUCCH resource index may be referred to as a default PUCCH resource in the each PUCCH resource group. In an example, the spatial relation information configurations may comprise a plurality of spatial relation information configurations for spatial setting of PUCCH transmission. In an example, the plurality of spatial relation information configurations may be grouped in a plurality of spatial relation information configurations groups, each spatial relation information configuration group being associated with a PUCCH resource group, and/or a panel. For example, as shown in FIG. 36, a first spatial relation information configuration group (e.g., $1^{st}$ SRIs in FIG. 36) may be associated with a first PUCCH resource group (e.g., $1^{st}$ PUCCH group in FIG. 36). A second spatial relation information configuration group (e.g., $2^{nd}$ SRIs in FIG. 36) may be associated with a second PUCCH resource group (e.g., $2^{nd}$ PUCCH group in FIG. 36). Each spatial relation information configuration group may comprise a list of spatial relation information configurations. Each spatial relation information configuration may be identified by a spatial relation information configuration index (or ID). Parameters of each spatial relation information configuration may comprise a serving cell ID; a reference resource signal index; a PUCCH pathloss reference RS indicator; a P0 value for PUCCH transmission; and/or a close loop power control identifier. The reference signal index may comprise an SSB index, a CSI-RS index or an SRS index of an uplink BWP. In an example, a spatial relation information configuration of PUCCH may indicate spatial setting of the PUCCH transmission. The spatial relation information configuration of PUCCH may indicate power control parameters.

As shown in FIG. 36, the base station may transmit to the wireless device one or more MAC CE activating a first spatial relation information configuration (e.g., $1^{st}$ SRI in FIG. 36) for a first PUCCH resource (e.g., $1^{st}$ PUCCH in FIG. 36) in a first PUCCH resource group (e.g., $1^{st}$ PUCCH group in FIG. 36) and a second spatial relation information configuration (e.g., $2^{nd}$ SRI in FIG. 36) for a first PUCCH resource (e.g., $1^{st}$ PUCCH in FIG. 36) in a second PUCCH resource group (e.g., $2^{nd}$ PUCCH group in FIG. 36). In an example, the first PUCCH resource of the first PUCCH resource group may be a PUCCH resource with a lowest PUCCH resource index (e.g., a default PUCCH resource) in the first PUCCH resource group. In an example, the first PUCCH resource of the second PUCCH resource group may be a PUCCH resource with a lowest PUCCH resource index (e.g., a default PUCCH resource) in the second PUCCH resource group. In an example, the first spatial relation information configuration may be one from the first spatial relation information configuration group. In an example, the second spatial relation information configuration may be one from the second spatial relation information configuration group. In an example, the base station may transmit one or more second MAC CE(s) activating second spatial relation information configuration(s) for second PUCCH resource(s) in the first PUCCH resource group and third spatial relation information configuration(s) for second PUCCH resource(s) in the second PUCCH resource group.

In an example, when the wireless device transmits UCIs via a panel, the wireless device may determine a PUCCH resource group associated with the panel. The wireless device may determine a PUCCH resource from the PUCCH resource group. The wireless device may determine the PUCCH resource based on payload size of the first UCIs. The wireless device, based on a spatial relation information configuration (e.g., activated by one or more MAC CEs) of the PUCCH resource, may determine a spatial domain transmission filter for the transmission of the UCIs. In an example, if a reference signal resource index of a spatial relation information configuration activated on the PUCCH resource comprises an SSB index, the wireless device may transmit the UCIs on the PUCCH resource with a same spatial domain transmission filter used for reception of an SSB identified by the SSB index. In an example, if the reference signal resource index comprises a CSI-RS index, the wireless device may transmit the UCIs on the PUCCH resource with a same spatial domain transmission filter used for reception of a CSI-RS identified by the CSI-RS index. In an example, if the reference signal resource index comprises an SRS index, the wireless device may transmit the UCIs on the PUCCH resource with a same spatial domain transmission filter used for transmission of an SRS identified by the SRS index.

As shown in FIG. 36, the base station may transmit to the wireless device a DCI with DCI format 0_0 indicating uplink grant of a PUSCH, or with DCI format 0_1 when spatial relation information configuration is not activated for PUCCH transmission. The DCI with DCI format 0_0 may not comprise an SRS resource indicator. In response to receiving the DCI, the wireless device may determine a PUCCH resource group from the PUCCH resource groups based on at least one of: a PUCCH resource group ID; a CORESET; a current active panel; and/or one or more parameters of the DCI. In an example, if the DCI indicates the uplink grant of the PUSCH on a panel of multiple panels, the wireless device may determine the PUCCH resource group based on the PUCCH resource group ID being associated with the panel. In an example, if the wireless device receives the DCI on a CORESET, the wireless device may determine the PUCCH resource group based on the PUCCH resource group being associated with the CORESET. In an example, if a current active panel is a first panel, the wireless device may determine the PUCCH resource group based on the PUCCH resource group being associated with the first panel. In an example, if the DCI comprises one or more parameters indicating a panel, the wireless device may determine the PUCCH resource group based on the PUCCH resource group being associated with the panel.

In an example, after or in response to determining a PUCCH resource group based on a PUCCH resource group ID; a CORESET; a current active panel; and/or one or more parameters of the DCI, the wireless device may determine a pathloss reference RS as a RS indicated in a spatial relation information configuration of a PUCCH with a lowest PUCCH resource index in the PUCCH resource group. In an example, based on the pathloss reference RS, the wireless device may determine a transmission power as:

$P_{PUSCH,b,f,c}(i, j, q_d, l) =$ $\min \begin{Bmatrix} P_{CMAX,f,c}(i), \\ P_{O\_PUSCH,b,f,c}(j) + 10\ log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix}$ In an example, $PL_{b,f,c}(q_d)$ may be a downlink pathloss estimate in dB calculated by the wireless device using a reference signal indicated by the pathloss reference RS. In an example, $PL_{f,c}(q_d)$=referenceSignalPower–higher layer filtered RSRP, where referenceSignalPower may be provided by higher layers (RRC messages) and RSRP may be measured on the pathloss reference RS. In an example, based on the calculated transmission power, the wireless device may transmit an uplink TB with the uplink grant with the transmission power.

Figure 37:
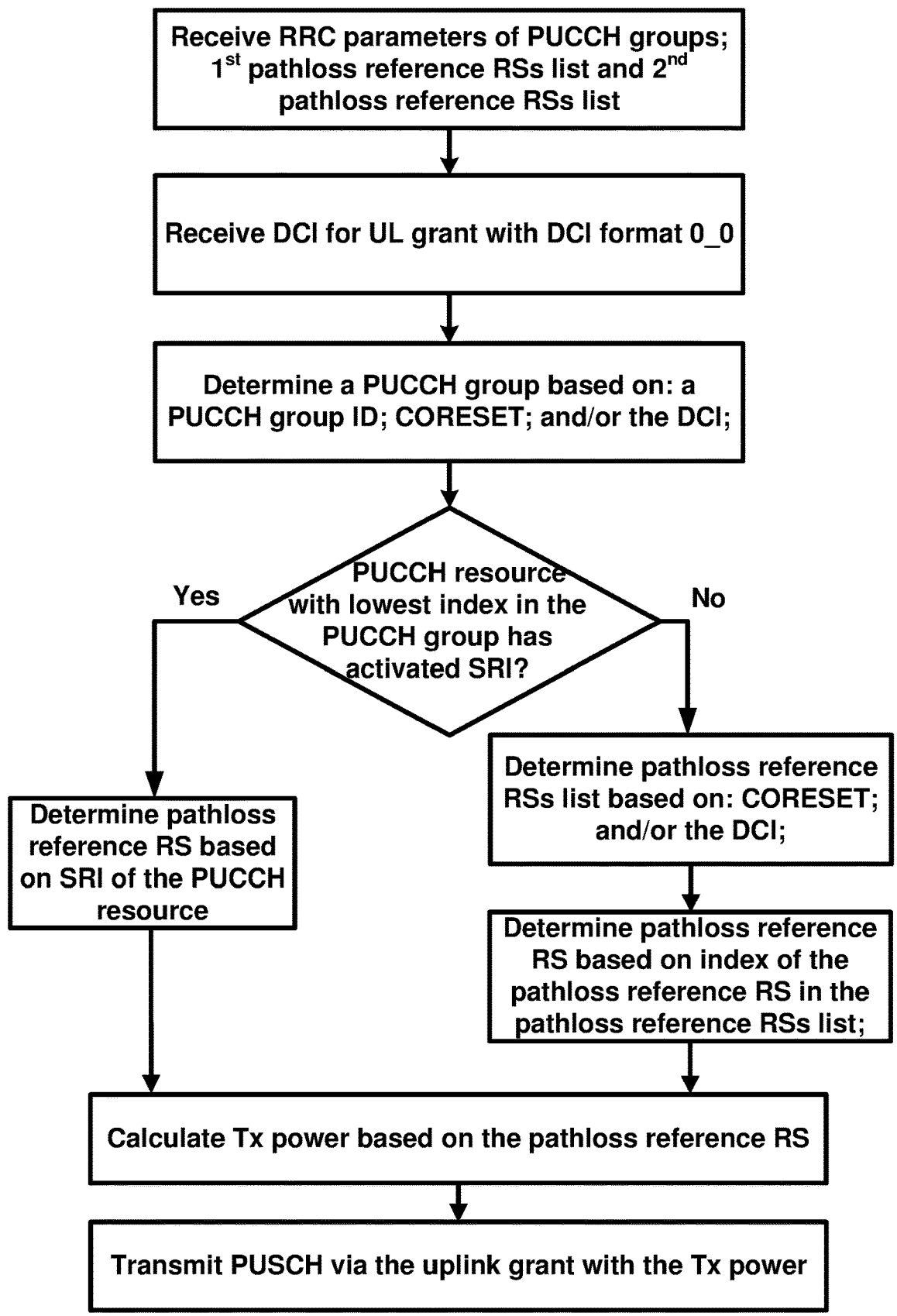
FIG. 37 is a flowchart of a transmission power determination of PUSCH transmission as per an aspect of an example embodiment of the present disclosure.

FIG. 37 is an example of flowchart of a transmission power determination of PUSCH transmission as per an aspect of an embodiment of the present disclosure. In an example, a wireless device may receive one or more RRC messages comprising configuration parameters of PUCCH resource groups, first pathloss reference RS list and second pathloss reference RS list. The one or more RRC messages may be transmitted by implementing one or more examples of FIG. 27, and/or FIG. 32. In an example, a first PUCCH resource group of the PUCCH resource groups may be identified by a first PUCCH group ID, associated with a first panel of multiple panels. A second PUCCH resource group of the PUCCH resource groups may be identified by a second PUCCH group ID, associated with a second panel of multiple panels. In an example, the first pathloss reference RS list may be associated with a first panel of multiple panels. The second pathloss reference RS list may be associated with a second panel of multiple panels.

In an example, as shown in FIG. 37, the wireless device may receive a DCI with DCI format 0_0. In an example, the wireless device may receive the DCI with DCI format 0_1 when a spatial relation information configuration for PUCCH transmission is not activated (e.g., by MAC CE). In response to receiving the DCI, the wireless device may determine a PUCCH resource group from the PUCCH resource groups based on a PUCCH resource group ID; a CORESET and/or the DCI. In an example, the determining the PUCCH resource group may be implemented by one or more example embodiments of FIG. 27.

As shown in FIG. 37, after or in response to the PUCCH resource group determined based on PUCCH resource group ID; a CORESET and/or the DCI, the wireless device may determine whether a default PUCCH resource (e.g., a PUCCH resource with lowest PUCCH resource index) in the PUCCH resource group has a (activated by MAC CE) spatial relation information configuration. In response to the default PUCCH resource having the activated spatial relation information configuration, the wireless device may determine a pathloss reference RS as a RS indicated in the spatial relation information configuration of the default PUCCH resource in the PUCCH resource group. The wireless device may calculate a transmission power based on the pathloss reference RS. The wireless device may transmit uplink TB via an uplink grant with the transmission power.

As shown in FIG. 37, the default PUCCH resource in the PUCCH resource group may not have a (activated by MAC CE) spatial relation information configuration. In response to the default PUCCH resource not having the activated spatial relation information configuration, the wireless device may determine a pathloss reference RS list from the first pathloss reference RSs list and the second pathloss reference RSs list based on a CORESET and/or the DCI. The determining the pathloss reference RS list may be implemented by example embodiments of FIG. 34.

In an example, after or in response to determining the pathloss reference RSs list based on the CORESET and/or the DCI, the wireless device may determine a pathloss reference RS from the pathloss reference RSs list, where the pathloss reference RS has a pathloss reference RS ID equal to zero. In an example, the wireless device may calculate a transmission power based on the pathloss reference RS. The wireless device may transmit uplink TB via an uplink grant with the transmission power.

In an example, a wireless device receives from a base station one or more RRC messages comprising configuration parameters of PUCCH resources of a cell, the PUCCH resources being grouped into a first PUCCH resource group and a second PUCCH resource group. The wireless device receives, via a control resource set, a DCI having a first DCI format (e.g., DCI format 0_0) and indicating a PUSCH resource. The wireless device selects a PUCCH resource group from the first PUCCH resource group and the second PUCCH resource group based on the control resource set of the DCI. The wireless device determines a pathloss reference signal associated with a first PUCCH with a lowest PUCCH resource index, among one or more PUCCH resources in the selected PUCCH group. The wireless device transmits an uplink signal via the PUSCH resource with a transmission power determined based on the pathloss reference signal for the first PUCCH.

In an example, a wireless device may receive one or more radio resource control messages comprising configuration parameters of a first panel and a second panel. The configuration parameters may indicate a first physical uplink control channel (PUCCH) resource on the first panel and a second PUCCH resource on the second panel. The wireless device may receive a downlink control information with a fallback downlink control information format (or DCI format 0_0). The downlink control information may indicate an uplink grant on a panel. The panel may be one of the first panel and the second panel. The wireless device may determine, based on the panel, a PUCCH resource is one of the first PUCCH resource and the second PUCCH resource. The wireless device may transmit, based on the downlink control information and a spatial relation info associated with the PUCCH resource, an uplink transport block via the uplink grant.

In an example, a wireless device may receive one or more radio resource control messages comprising configuration parameters of a first panel and a second panel. The configuration parameters may indicate a first physical uplink control channel (PUCCH) resource on the first panel and a second PUCCH resource on the second panel. The wireless device may receive, via a downlink control channel on a control resource set, a downlink control information with a fallback downlink control information format. The downlink control information may indicate an uplink grant. The wireless device may determine, based on the control resource set, a panel is one of the first panel and the second panel. The wireless device may determine, based on the panel, a PUCCH resource is one of the first PUCCH resource and the second PUCCH resource. The wireless device may transmit, based on the downlink control information and a spatial relation info associated with the PUCCH resource, an uplink transport block via the uplink grant.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
receiving, by a wireless device, power control parameters of a physical uplink shared channel (PUSCH) of a bandwidth part of a cell, wherein:
the power control parameters indicate first power values and second power values; and
each power value of the first power values and the second power values is associated with a respective index;
receiving downlink control information (DCI) indicating a transmission via the PUSCH;
determining, based on the DCI, one of the first power values or the second power values as determined power values for transmission of a transport block; and
transmitting, via the PUSCH, the transport block with a transmission power based on a power value with a lowest index among indexes associated with the determined power values.

2. The method of claim 1, wherein each power value of the first power values and the second power values is an initial target received power of the PUSCH for a base station.

3. The method of claim 2, comprising determining the transmission power further based on a pathloss value.

4. The method of claim 1, wherein a DCI format of the DCI does not comprise a sounding reference signal resource indicator (SRI) field when a length of the SRI field is zero.

5. The method of claim 1, further comprising receiving configuration parameters of a plurality of control resource sets.

6. The method of claim 5, wherein the plurality of control resource sets are grouped into a plurality of control resource set groups, and wherein each of the plurality of control resource set groups being identified with a control resource set pool index.

7. The method of claim 6, wherein a control resource set group is associated with a transmission and reception point (TRP) of a plurality of TRPs of a base station.

8. The method of claim 1, wherein:
the first power values are associated with a first panel of a plurality of panels for transmission of the transport block via the PUSCH; and
the second power values are associated with a second panel of the plurality of panels for transmission of the transport block via the PUSCH.

9. The method of claim 8, further comprising selecting the first power values, from the first power values and the second power values, for the transmission of the transport block, via the PUSCH, based on the transmission of the transport block, via the PUSCH, being associated with the first panel of the plurality of panels.

10. The method of claim 8, further comprising transmitting, via the first panel of the plurality of panels, the transport block with the transmission power determined based on the first power values associated with the first panel.

11. A wireless device comprising:
one or more processors;
memory storing instructions that, when executed by the one or more processors, cause the wireless device to:
receive power control parameters of a physical uplink shared channel (PUSCH) of a bandwidth part of a cell, wherein:
the power control parameters indicate first power values and second power values; and
each power value of the first power values and the second power values is associated with a respective index;
receive downlink control information (DCI) indicating a transmission via the PUSCH;
determine, based on the DCI, one of the first power values or the second power values as determined power values for transmission of a transport block; and
transmit, via the PUSCH, the transport block with a transmission power based on a power value with a lowest index among indexes associated with the determined power values.

12. The wireless device of claim 11, wherein each power value of the first power values and the second power values is an initial target received power of the PUSCH for a base station.

13. The wireless device of claim 12, wherein the instructions, when executed by the one or more processors, further cause the wireless device to determine the transmission power further based on a pathloss value.

14. The wireless device of claim 11, wherein a DCI format of the DCI does not comprise a sounding reference signal resource indicator (SRI) field when a length of the SRI field is zero.

15. The wireless device of claim 11, wherein the instructions, when executed by the one or more processors, further cause the wireless device to receive configuration parameters of a plurality of control resource sets.

16. The wireless device of claim 15, wherein the plurality of control resource sets are grouped into a plurality of control resource set groups, and wherein each of the plurality of control resource set groups being identified with a control resource set pool index.

17. The wireless device of claim 16, wherein a control resource set group is associated with a transmission and reception point (TRP) of a plurality of TRPs of a base station.

18. The wireless device of claim 11, wherein:
the first power values are associated with a first panel of a plurality of panels for transmission of the transport block via the PUSCH; and
the second power values are associated with a second panel of the plurality of panels for transmission of the transport block via the PUSCH.

19. The wireless device of claim 18, wherein the instructions, when executed by the one or more processors, further cause the wireless device to select the first power values, from the first power values and the second power values, for the transmission of the transport block, via the PUSCH, based on the transmission of the transport block, via the PUSCH, being associated with the first panel of the plurality of panels.

20. The wireless device of claim 18, wherein the instructions, when executed by the one or more processors, further cause the wireless device to transmit, via the first panel of the plurality of panels, the transport block with the transmission power determined based on the first power values associated with the first panel.

* * * * *